United States Patent
Hoerger et al.

(10) Patent No.: US 8,724,251 B2
(45) Date of Patent: May 13, 2014

(54) METHOD AND SYSTEM FOR PROVIDING TAPE-FORMAT COMPATIBILITY BETWEEN VARIOUS TYPES OF TAPE HEADS

(75) Inventors: Carl R. Hoerger, Boise, ID (US); John D. Hampton, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 110 days.

(21) Appl. No.: 13/579,481

(22) PCT Filed: Mar. 9, 2010

(86) PCT No.: PCT/US2010/026622
§ 371 (c)(1),
(2), (4) Date: Aug. 16, 2012

(87) PCT Pub. No.: WO2011/112181
PCT Pub. Date: Sep. 15, 2011

(65) Prior Publication Data
US 2012/0307399 A1    Dec. 6, 2012

(51) Int. Cl.
*G11B 5/78* (2006.01)

(52) U.S. Cl.
USPC ............................. 360/75; 360/134; 360/55

(58) Field of Classification Search
CPC .......... G11B 5/00813; G11B 5/00817; G11B 5/00821; G11B 5/00878; G11B 2020/1238; G11B 2220/956; G11B 20/1201; G11B 5/0086; G11B 5/09; G11B 5/00826; G11B 5/3958; G11B 5/3977
USPC ........ 360/55, 75, 34, 77.15, 70, 77.14, 73.04, 360/53, 63, 69; 386/E9.009, 248, 345; 348/472, 473
See application file for complete search history.

(56) References Cited

U.S. PATENT DOCUMENTS

| | | | |
|---|---|---|---|
| 4,558,380 A | | 12/1985 | Porter |
| 5,329,360 A | * | 7/1994 | Gillard et al. ............... 348/472 |
| 5,394,277 A | * | 2/1995 | Pahr et al. .................... 360/53 |
| RE38,868 E | * | 11/2005 | Lee et al. .................... 386/248 |
| 7,570,450 B2 | | 8/2009 | Koeppe |
| 2003/0053241 A1 | | 3/2003 | Misawa |

OTHER PUBLICATIONS

Hoerger et al, PCT/US2010/026622 IB 326 International Preliminary Report on Patentability, Sep. 20, 2012, 7 pages.

* cited by examiner

*Primary Examiner* — Ali Neyzari

(57) ABSTRACT

Certain embodiments of the present invention are directed to magnetic-tape drives that employ data-set-multiplexing magnetic-tape formats in order to achieve compatibility in magnetic-tape formats with respect to a variety of different magnetic-tape-drive tape-head configurations and dimensions. While previous and current magnetic-tape drives employ magnetic-tape formats that feature linear sequences of data sets along the tracks that are read or written during a single pass, or wrap, magnetic-tape drives of the present invention feature magnetic tape that contains data formatted according to a data-set-multiplexing magnetic-tape format, the data-set-multiplexing magnetic-tape format including, for each multiple-track wrap within a band, two or more parallel sequences of data sets written to the multiple tracks of the multiple-track wrap.

20 Claims, 46 Drawing Sheets

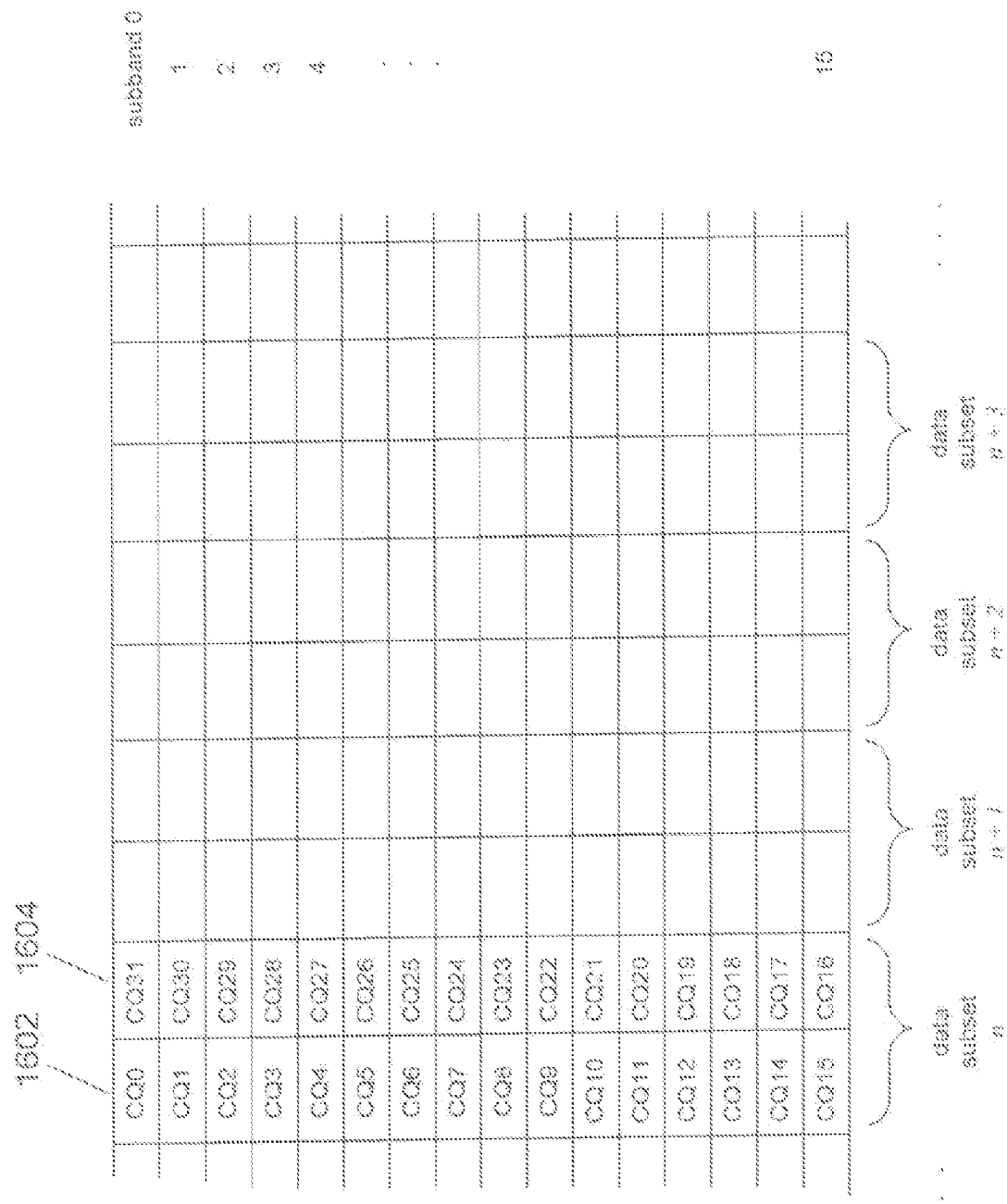

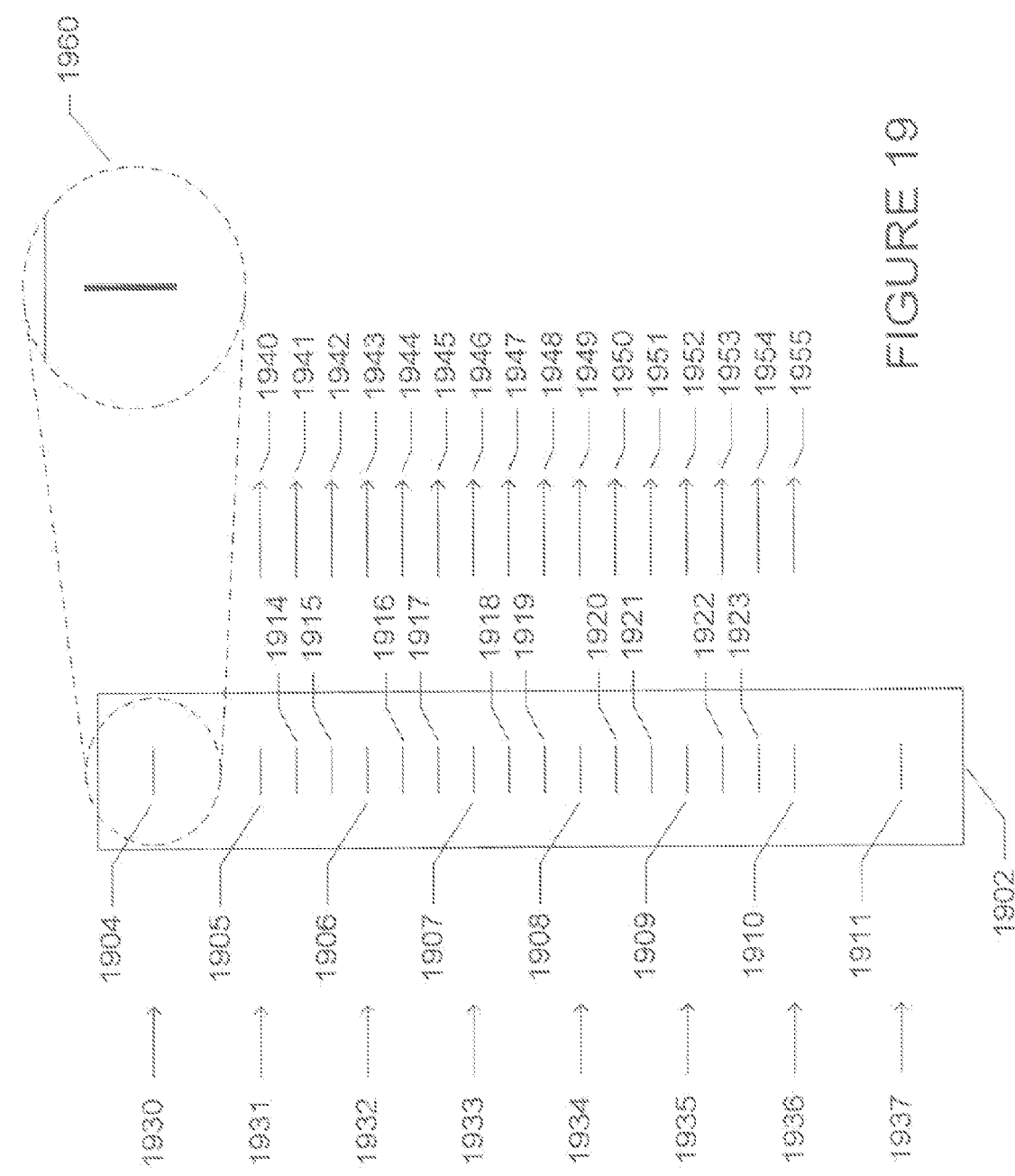

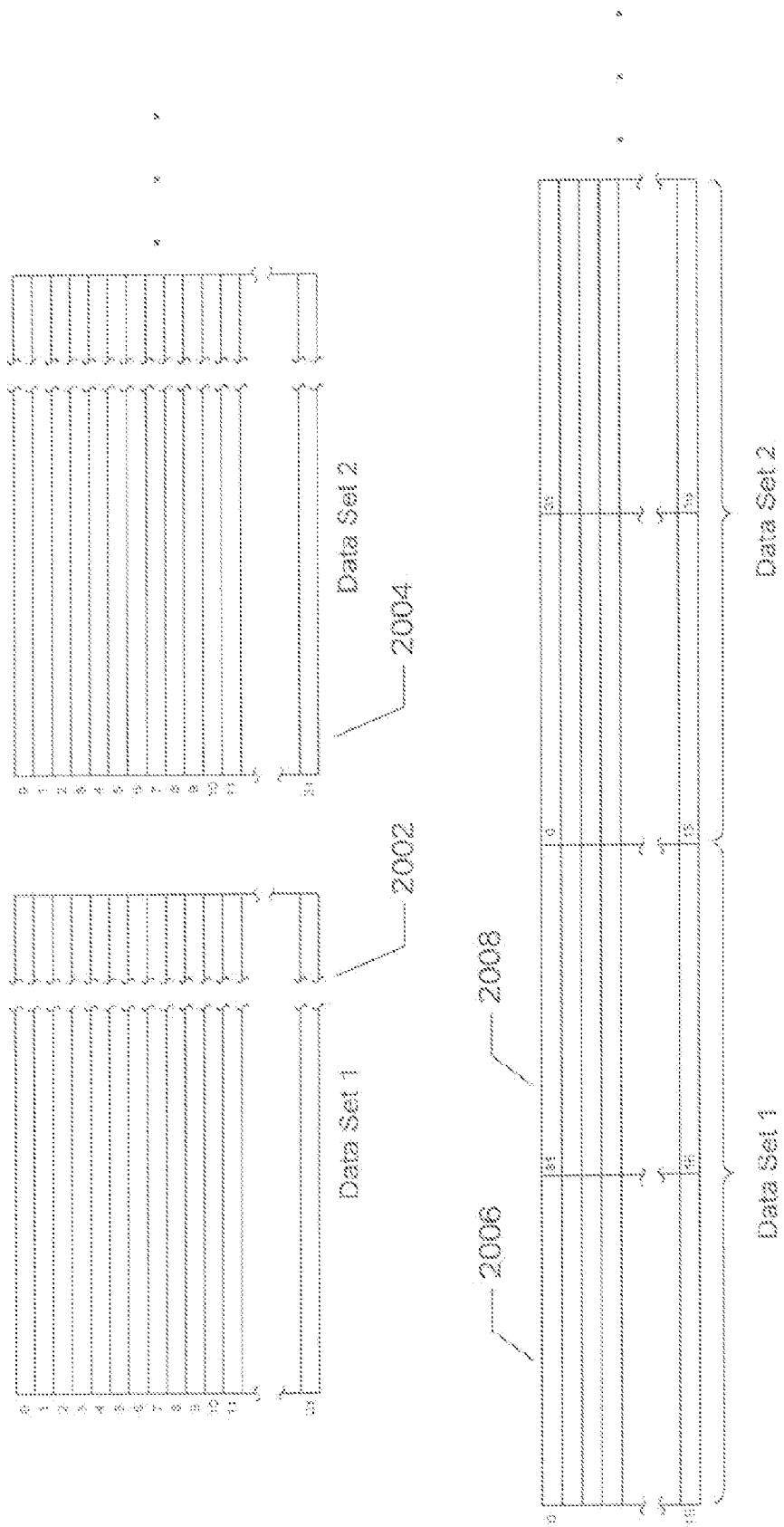

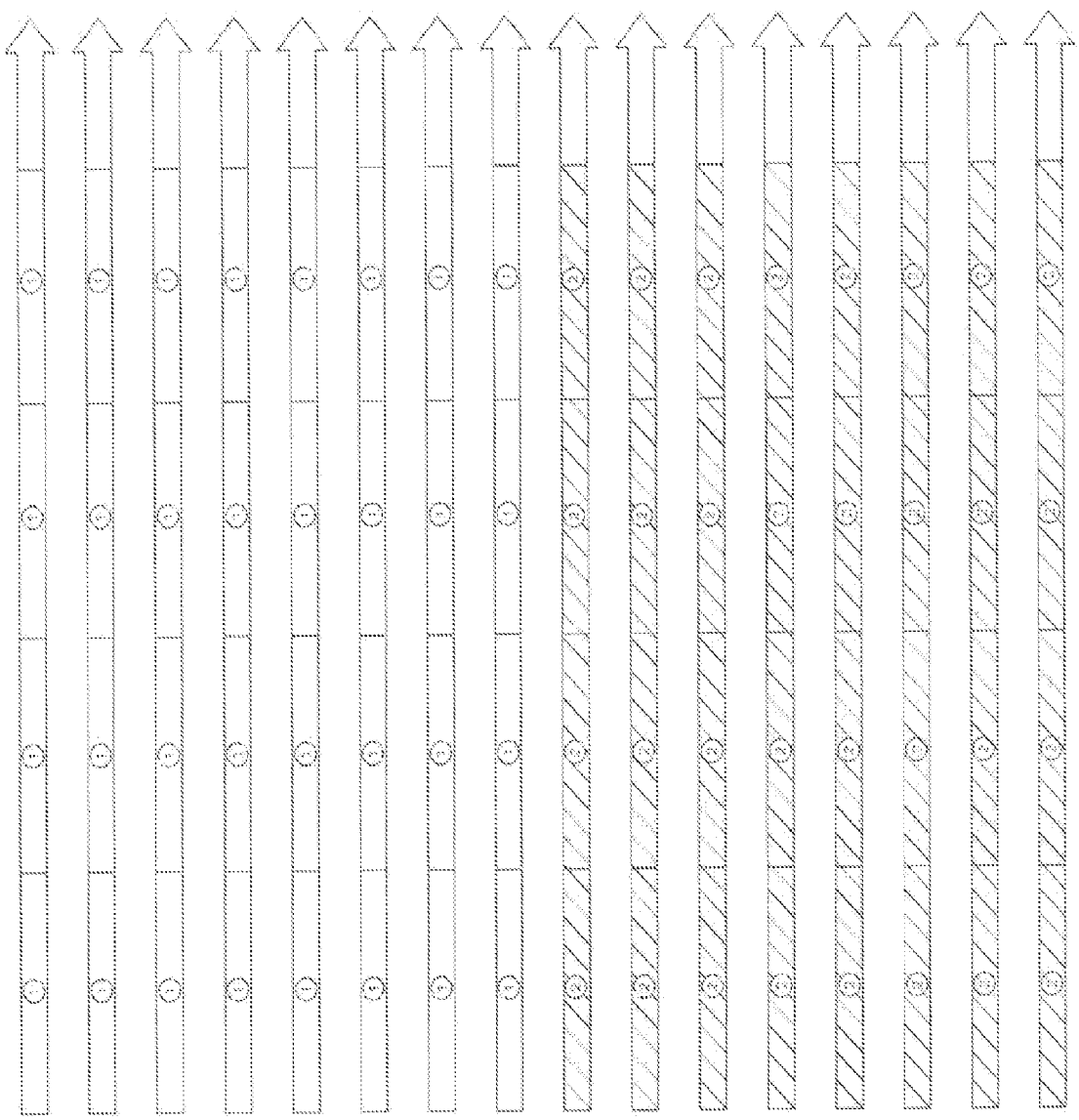

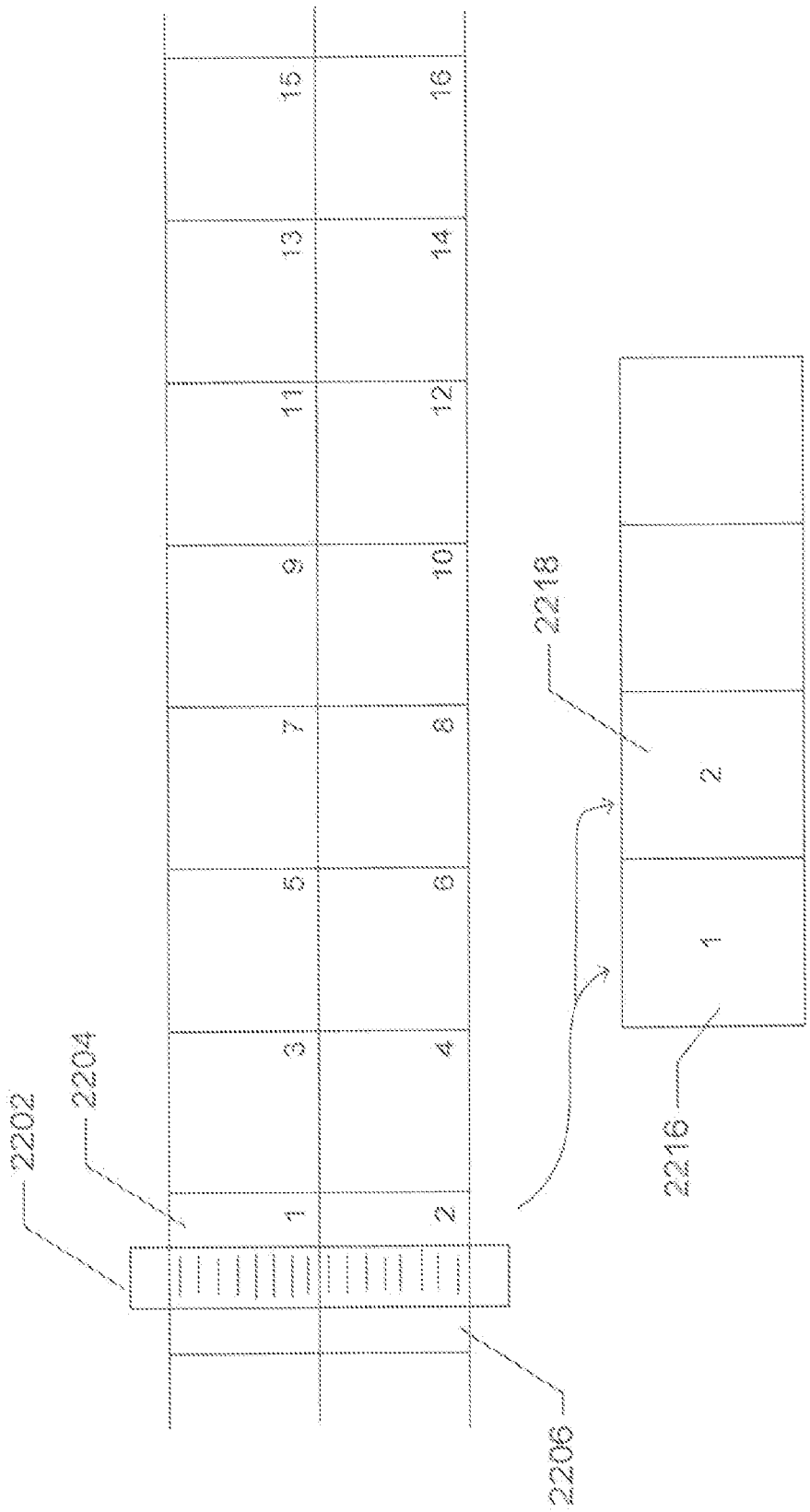

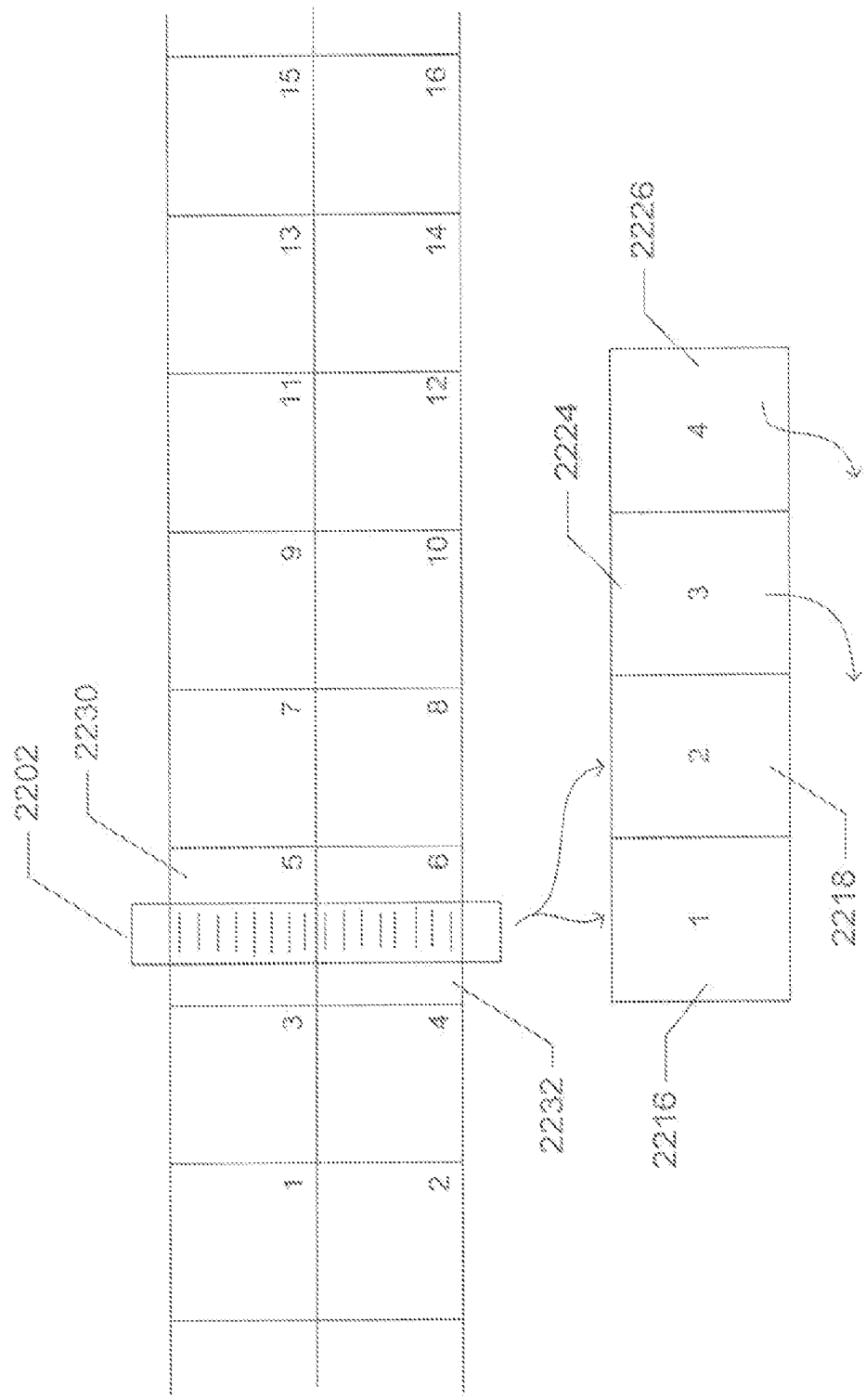

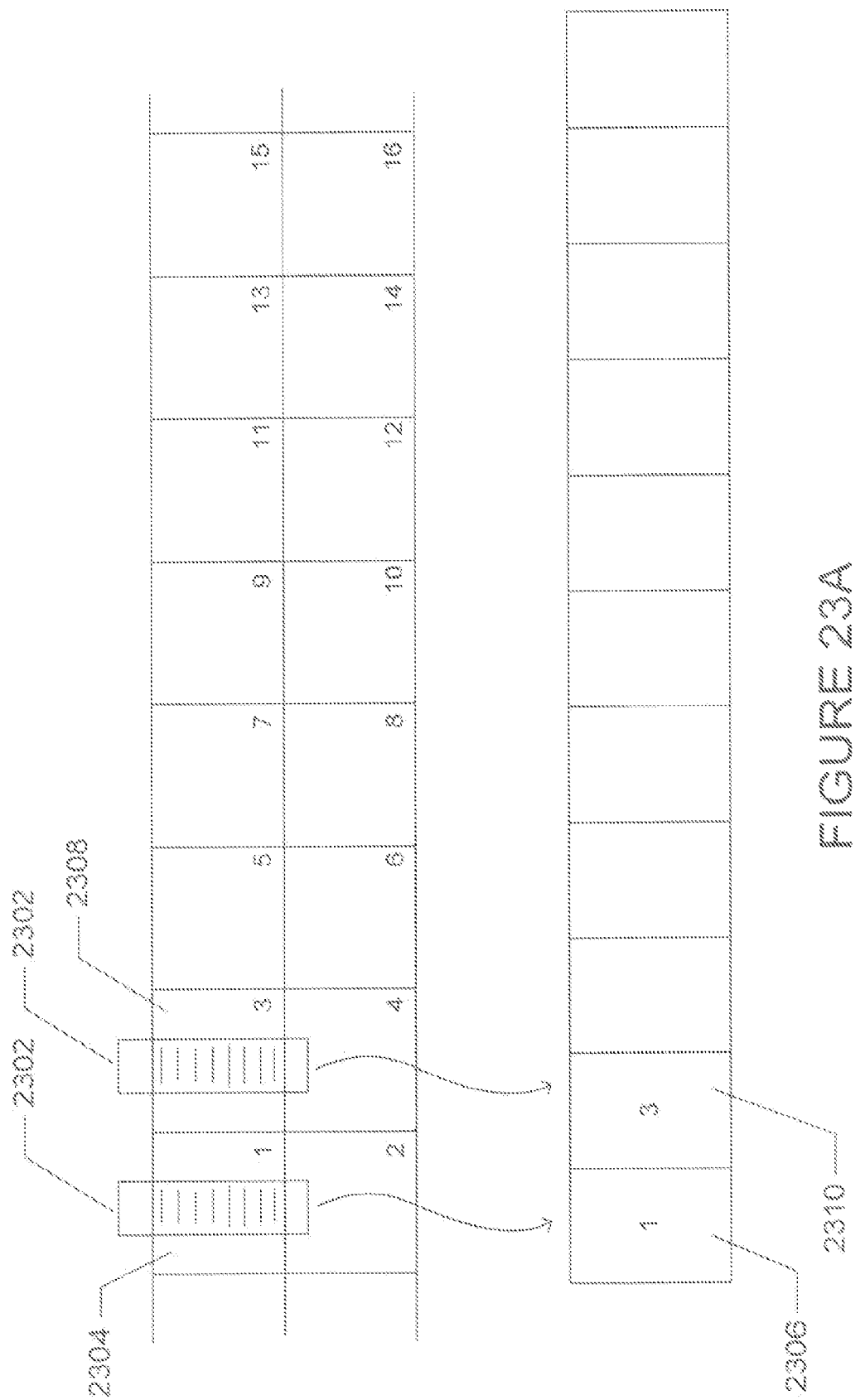

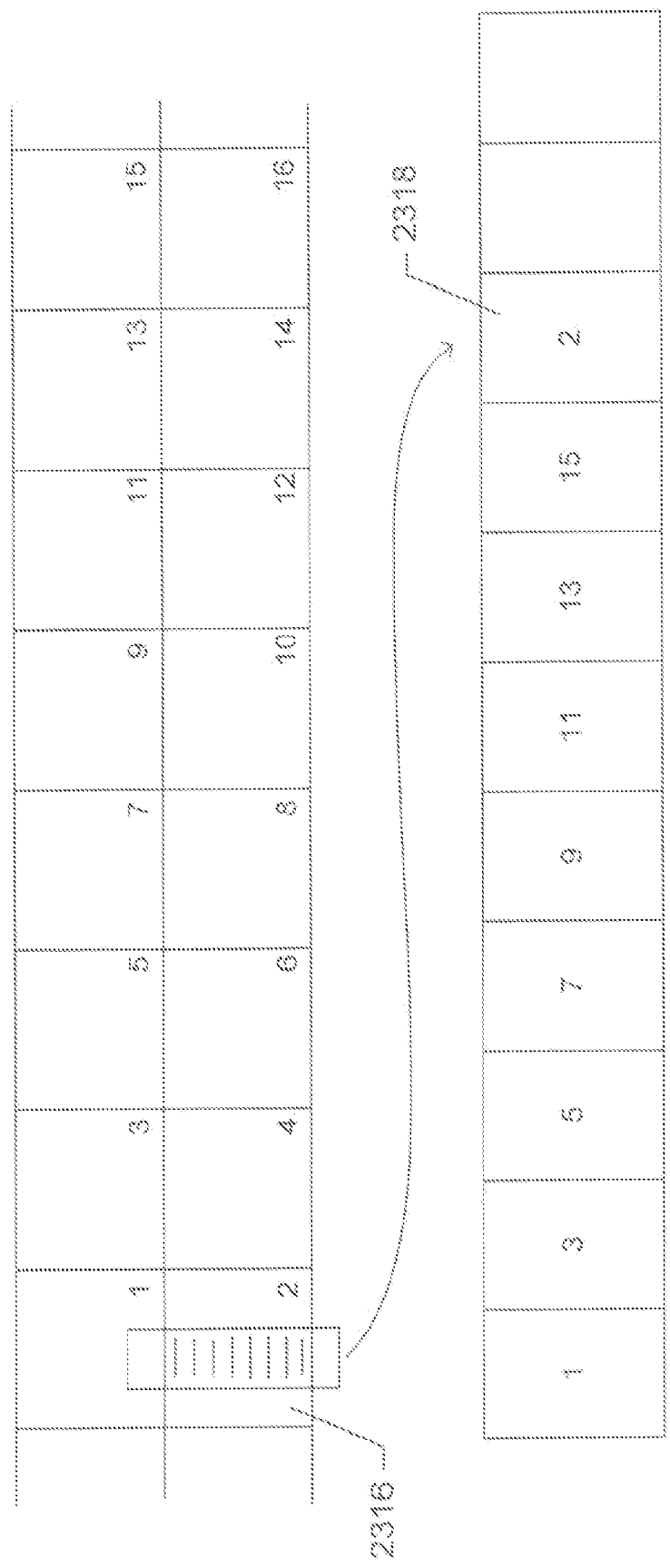

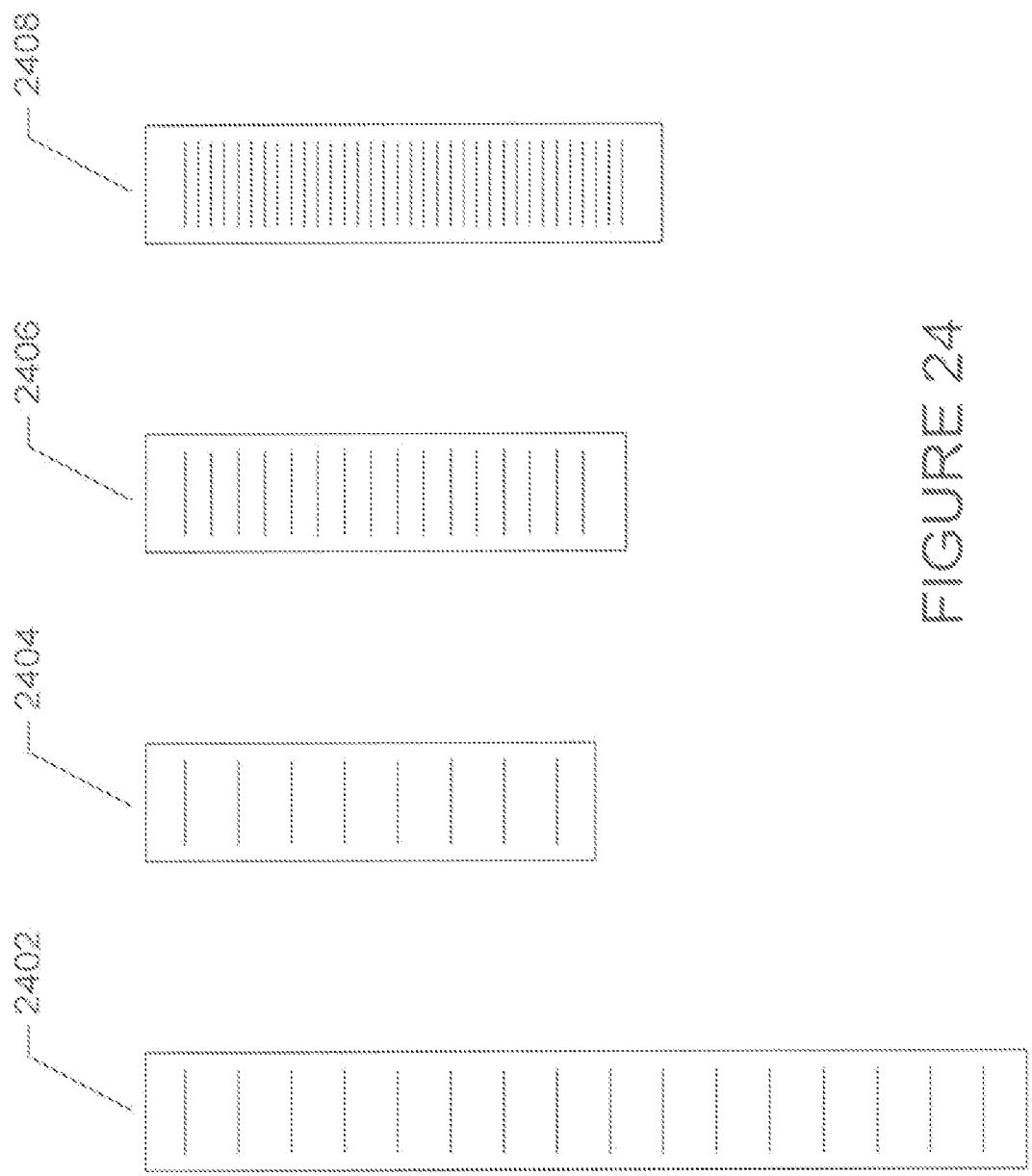

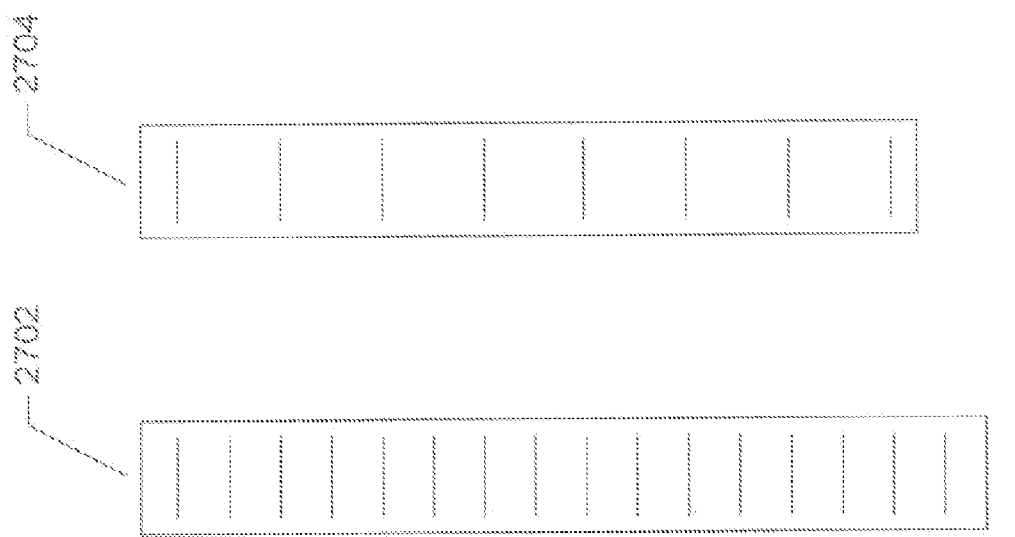

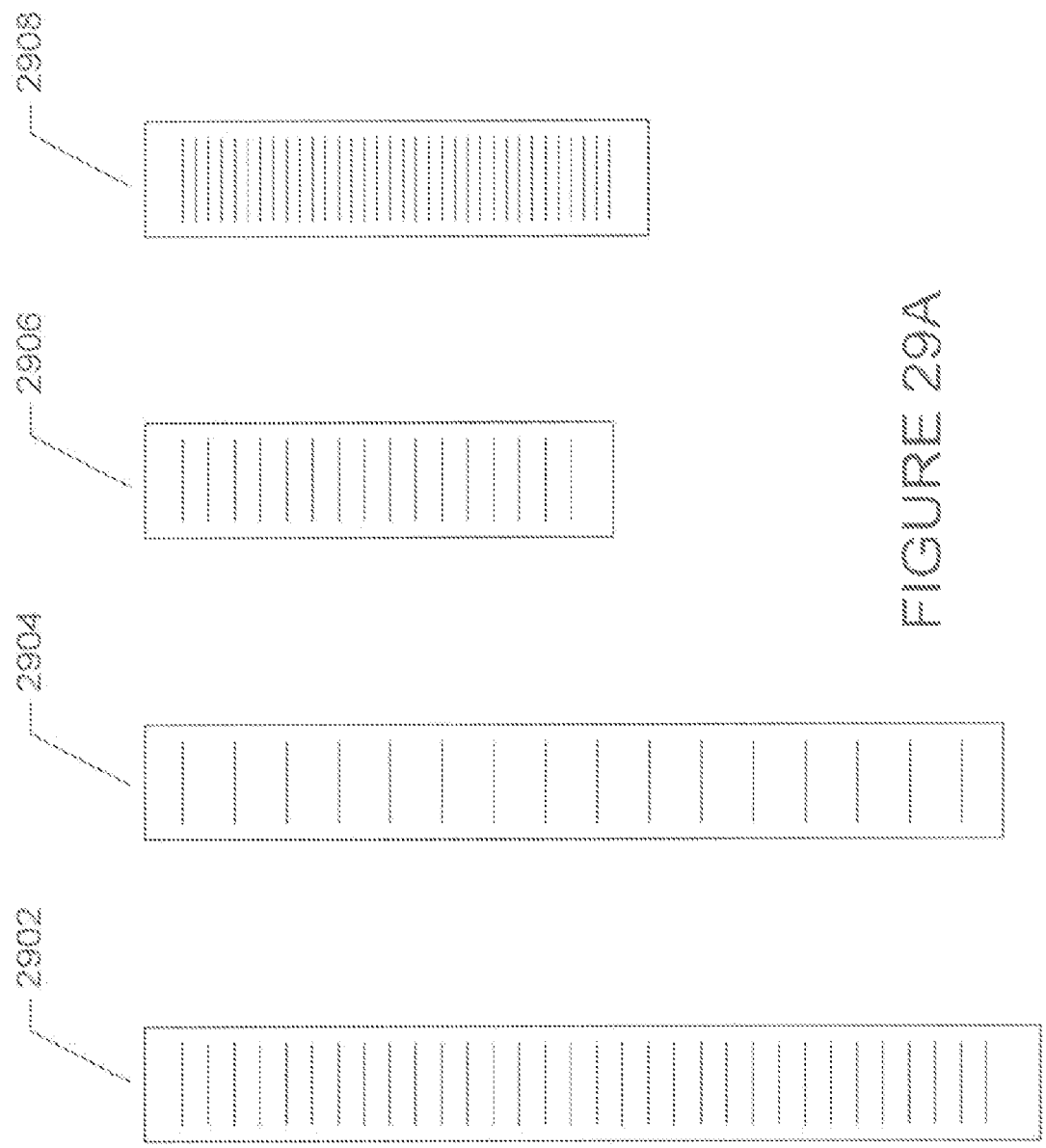

FIGURE 30B

METHOD AND SYSTEM FOR PROVIDING TAPE-FORMAT COMPATIBILITY BETWEEN VARIOUS TYPES OF TAPE HEADS

TECHNICAL FIELD

The present invention is related generally to tape-drive technology.

BACKGROUND

While the present invention is generally applicable to a variety of different types of magnetic-tape storage devices, embodiments are discussed, below, in the context of the linear tape-open ("LTO") magnetic-tape storage technology developed in the late 1990's as an open-standards alternative to proprietary magnetic-tape technologies. The LTO magnetic-tape storage technology is based on ½" magnetic tape stored in a single-reel cartridge that is inserted into, and removed from, an LTO magnetic-tape drive. LTO magnetic-tape drives feature high rates of data transfer and LTO tape cartridges provide very large storage capacities. The LTO magnetic-tape storage devices find widespread use in a variety of data-archiving and data-backup applications.

The LTO magnetic-tape storage technology has evolved through four generations of magnetic-tape formats and magnetic-tape-drive implementations, referred to as "LTO-1," "LTO-2," "LTO-3," and "LTO-4." Additional LTO-5, LTO-6, and LTO-7 generations are currently in various stages of development. LTO-1 tape cartridges hold up to 100 gigabytes ("GB") of data, with a maximum data-transfer rate of 15 megabytes ("MB") per second. LTO-1 magnetic-tape format provides 384 data tracks, eight pairs of read/write element pairs per tape head, and a linear data density of 4880 bits/mm. LTO-4 magnetic-tape storage technology provides for storage of up to 800 GB per magnetic-rape cartridge and a maximum data-transfer rate of 120 MB per second. The LTO-4 magnetic-tape format provides 896 data tracks and 16 read/write element pairs per head, and provides a linear data density of 13,520 bits/mm. Each successive LTO generation provides a significantly higher track density by using additional numbers of increasingly narrower data tracks, correspondingly narrower read/write tape-head elements. Occasionally, as was the case with LTO 3, a greater number of read/write tape-head elements per tape head are included in the tape head, to allow for simultaneous access to a greater number of data tracks and higher data transfer rate for a given tape speed. In addition, the widths of data hands and corresponding distances between adjacent tape-head read/write elements are decreased, to ameliorate the effects of tape transverse dimensional instability ("TDS").

Backward compatibility of newer-generation tape drives with older-generation magnetic tapes is an expected and commercially necessary feature of tape drives. In general, a tape drive of generation n needs to be write-compatible at least the generation n−1 magnetic-tape format and needs to be read-compatible with the generation n−1 magnetic-tape format and generation n−2 magnetic-tape format. Over the first four LTO generations, the backward-compatibility issues have been handled primarily by developing increasing narrower read/write elements within tape heads, by increasing the number of read/write elements within tape heads, and by appropriate modifications to internal magnetic-tape-drive components, including the servo controller, micro-controller routines, and internal signal paths.

Greater changes in magnetic-tape format are anticipated for future LTO generations. These magnetic-tape format changes may be sufficiently significant to preclude backward compatibility by only narrowing read/write elements and increasing the number of read/write elements within tape heads. Various complex tape-head implementations that include generation-specific read/write elements as well as read/write elements compatible with different magnetic-tape formats have been proposed. These proposed tape-head configurations are, in certain cases, nonetheless burdened with compatibility issues or represent constraints on the magnetic-tape format that prevent obtaining desired increases in data density and decreases in data-track widths. Thus, researchers and developers in the field of magnetic-tape-drive technologies continue to seek methods and systems in which data densities are increased and data-track widths decreased while maintaining magnetic-tape-format compatibilities over a range of magnetic-tape-drive generations.

BRIEF DESCRIPTION OF THE DRAWINGS

In order that the present invention might be well understood, various embodiments of the present invention are next provided, by way of example only, with reference to the accompanying drawings, in which:

FIG. 16 illustrates writing of data subsets to a physical magnetic tape.

FIG. 19 provides an example of a backward-compatible tape-head configuration.

FIGS. 20A-B illustrate the current, single-linear-sequence-based placement of data sets onto the magnetic-tape medium.

FIG. 21B provides an alternative representation of the data-set-multiplexing magnetic-tape format illustrated in FIG. 21A that represents one embodiment of the present invention, using the same illustration conventions as used for FIG. 20B.

FIGS. 22A-C illustrate reading of a magnetic tape formatted according to the magnetic-tape format that represents one embodiment of the present invention, illustrated in FIGS. 21A-B, by a 16-read/write-element tape head that represents a newer-generation tape head.

FIGS. 23A-F illustrate reading of the data-set-multiplexing magnetic-tape format of the present invention, discussed with reference to FIGS. 21A-22C, by an older-generation eight read/write-element tape head, according to one embodiment of the present invention.

FIG. 24 illustrates several of the various different tape-head configurations compatible with the data-set-multiplexing magnetic-tape format that represents one embodiment of the present invention illustrated in FIGS. 21A-8 and discussed with reference to FIGS. 22A-23F.

FIGS. 27A-B illustrate art alternative data-set-multiplexing format useful for providing compatibility between a 16-read/write-element tape head and an eight-read/write-element tape head of approximately equal dimensions, according to one embodiment of the present invention.

FIG. 28 provides a different, alternative data-set-multiplexing magnetic-tape format that provides compatibility between the various tape heads shown in FIG. 24, according to one embodiment of the present invention.

FIGS. 29A-B illustrate an additional 32-track data-set-multiplexing magnetic-tape format that provides reading compatibility among the four different tape heads shown in FIG. 29A, according to one embodiment of the present invention.

FIGS. 30A-B illustrate, using the same illustration conventions used FIGS. 29A-B and 27A-B, yet an additional data-set-multiplexing data format that provides read compatibility among six different tape-head configurations shown in FIG. 30A, according to one embodiment of the present invention.

DETAILED DESCRIPTION

Certain embodiments of the present invention are directed to magnetic-tape formats that provide read/write compatibility among multiple magnetic-tape-drive implementations and generations. Certain embodiments of the present invention are discussed, below, in the context of the LTO magnetic-tape storage technology, although embodiments of the present invention are applicable to a wide variety of different magnetic-tape storage technologies.

Figure 1:
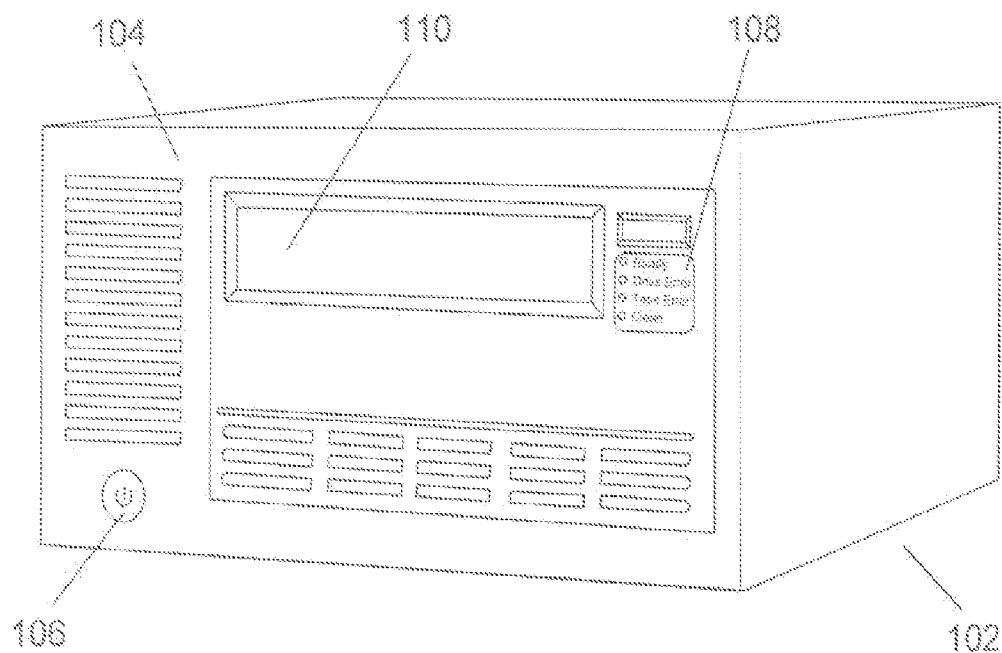
FIG. 1 shows an exterior view of a magnetic-tape drive that reads and writes data magnetic tape stored within a magnetic-tape cartridge.
Figure 2:
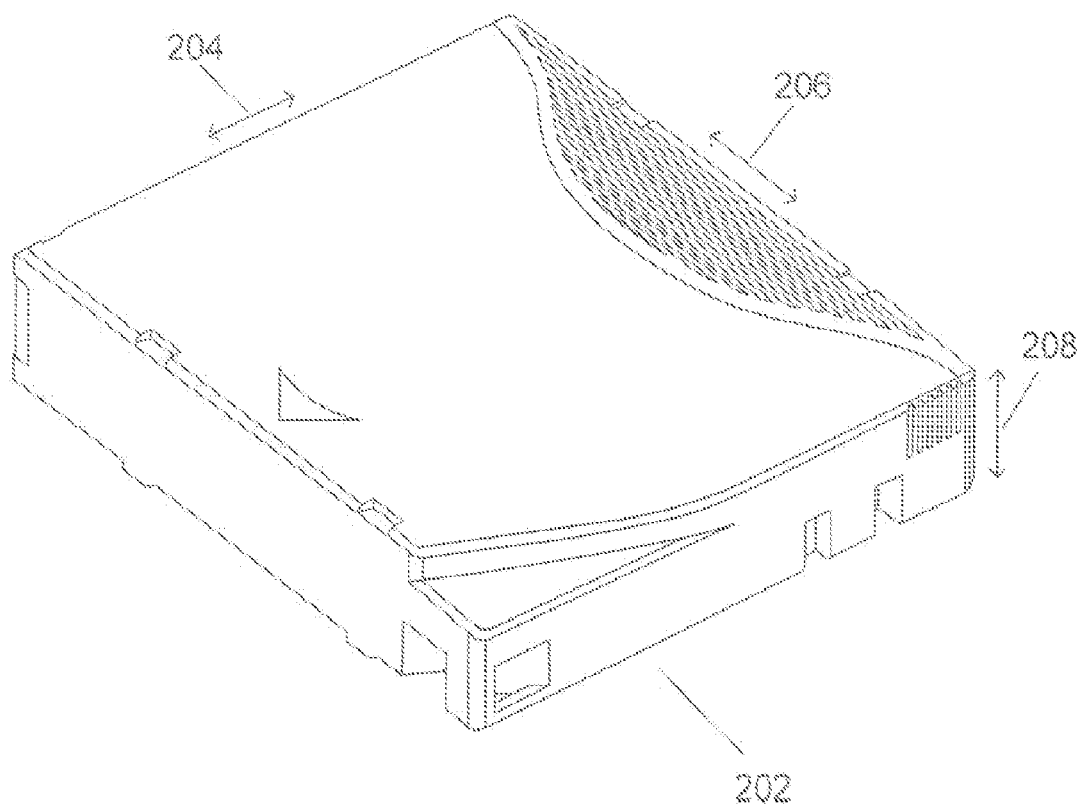
FIG. 2 shows an exterior view of a magnetic-tape cartridge.
Figure 3:
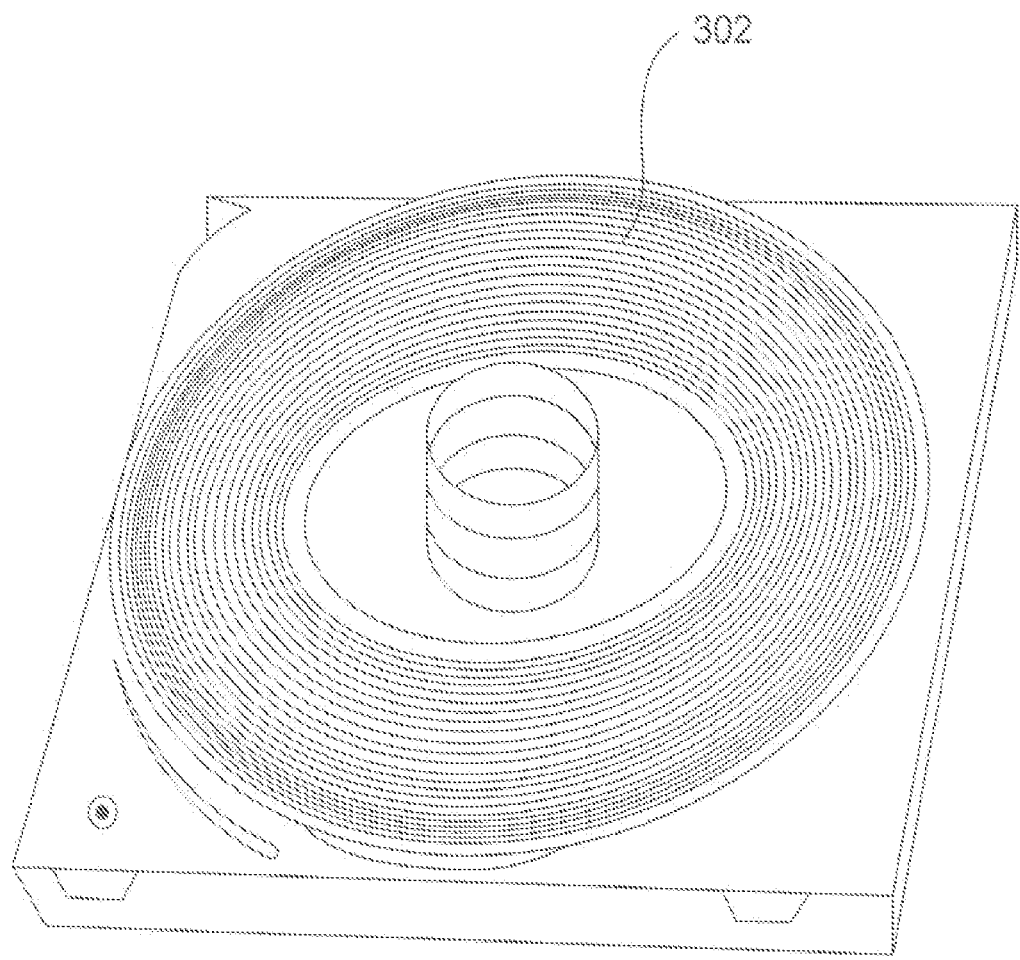
FIG. 3 shows magnetic-tape cartridge from which the top portion of the plastic housing has been removed to reveal a magnetic tape spooled within the cartridge.
Figure 4:
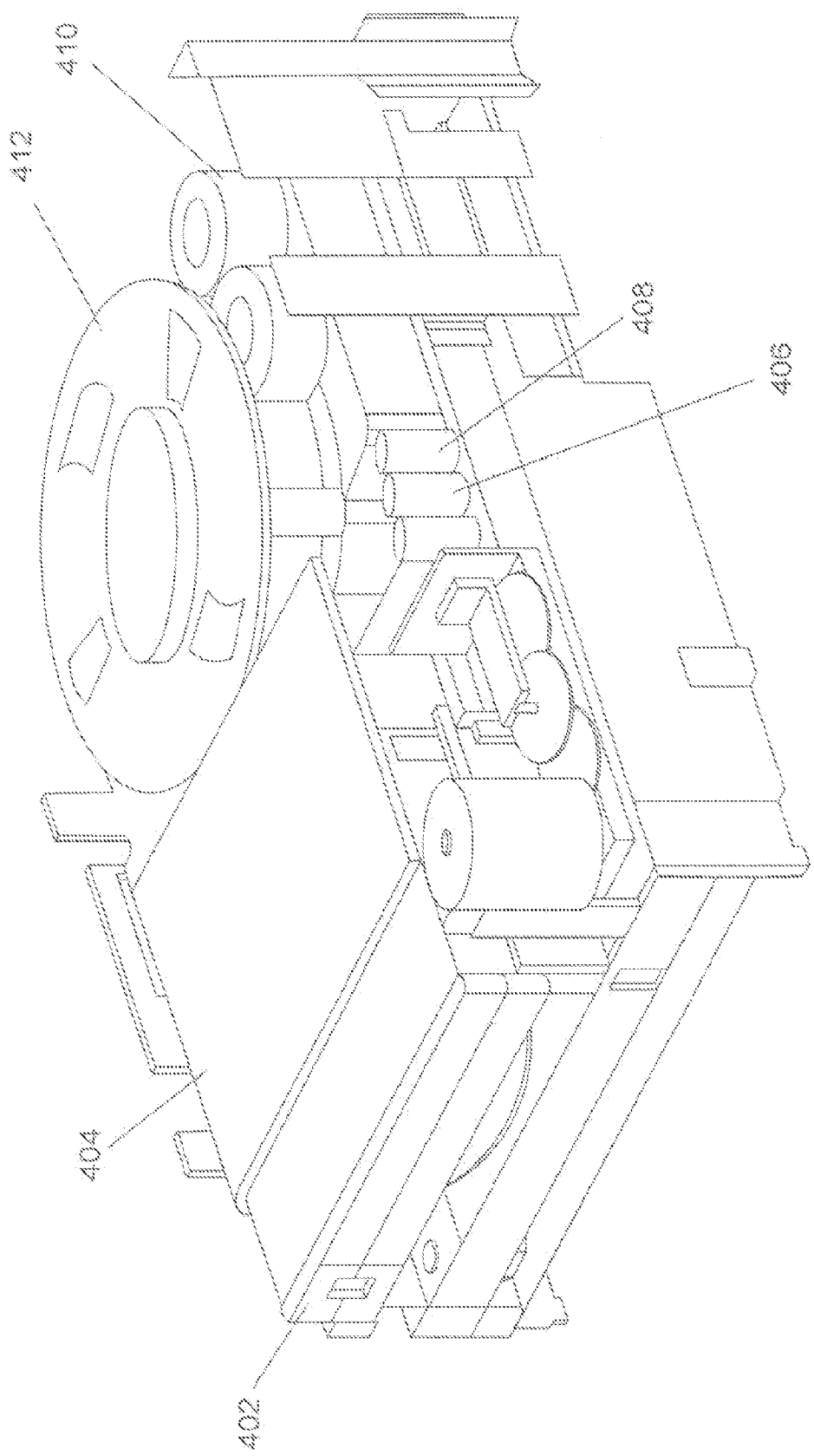
FIG. 4 shows the internal components of a magnetic-tape drive.

FIG. 1 shows an exterior view of a magnetic-tape drive that reads and writes data to a magnetic tape stored within a magnetic-tape cartridge. The magnetic-tape drive 102 includes a front panel 104 with a power button 106, a small light-emitting-diode ("LED") display panel 108, and an aperture 110 into which magnetic-tape cartridges are inserted and from which magnetic-tape cartridges are removed. FIG. 2 shows an exterior view of a magnetic-tape cartridge. An LTO-4 magnetic-tape cartridge 202 has a length 204 of 10.2 centimeters, a width 206 of 10.54 centimeters, and a height 208 of 2.15 centimeter. FIG. 3 shows a magnetic-tape cartridge from which the top portion of the plastic housing has been removed to reveal a magnetic tape spooled within the cartridge. A single tape 302 of up to 820 meters in length is wound about a single spool. FIG. 4 shows the internal components of a magnetic-tape drive. The cartridge 402 is loaded into a loader tray 404 by a motorized loading mechanism. When a cartridge is loaded, the cartridge housing is opened and the tape leader is extracted and fed past a leader block 406, around a first guide roller 408, over a tape head (not shown in FIG. 4), past a second guide roller 410, and into to a take-up reel 412. As discussed in greater detail below, a tape is written in serpentine fashion in multiple passes, each pass involving spooling the tape from the cartridge to the take-up reel, in a forward direction, or spooling the tape from the take-up reel back to the cartridge, in a reverse direction. An LTO-4 generation tape, for example, is fully written in 28 cycles, each cycle comprising writing of 16 data tracks in the forward direction from the beginning of a user-data region to the end of the user-data region and writing of 16 data tracks in the reverse direction from the end of the user-data region to the beginning of the user-data region.

Figure 5:
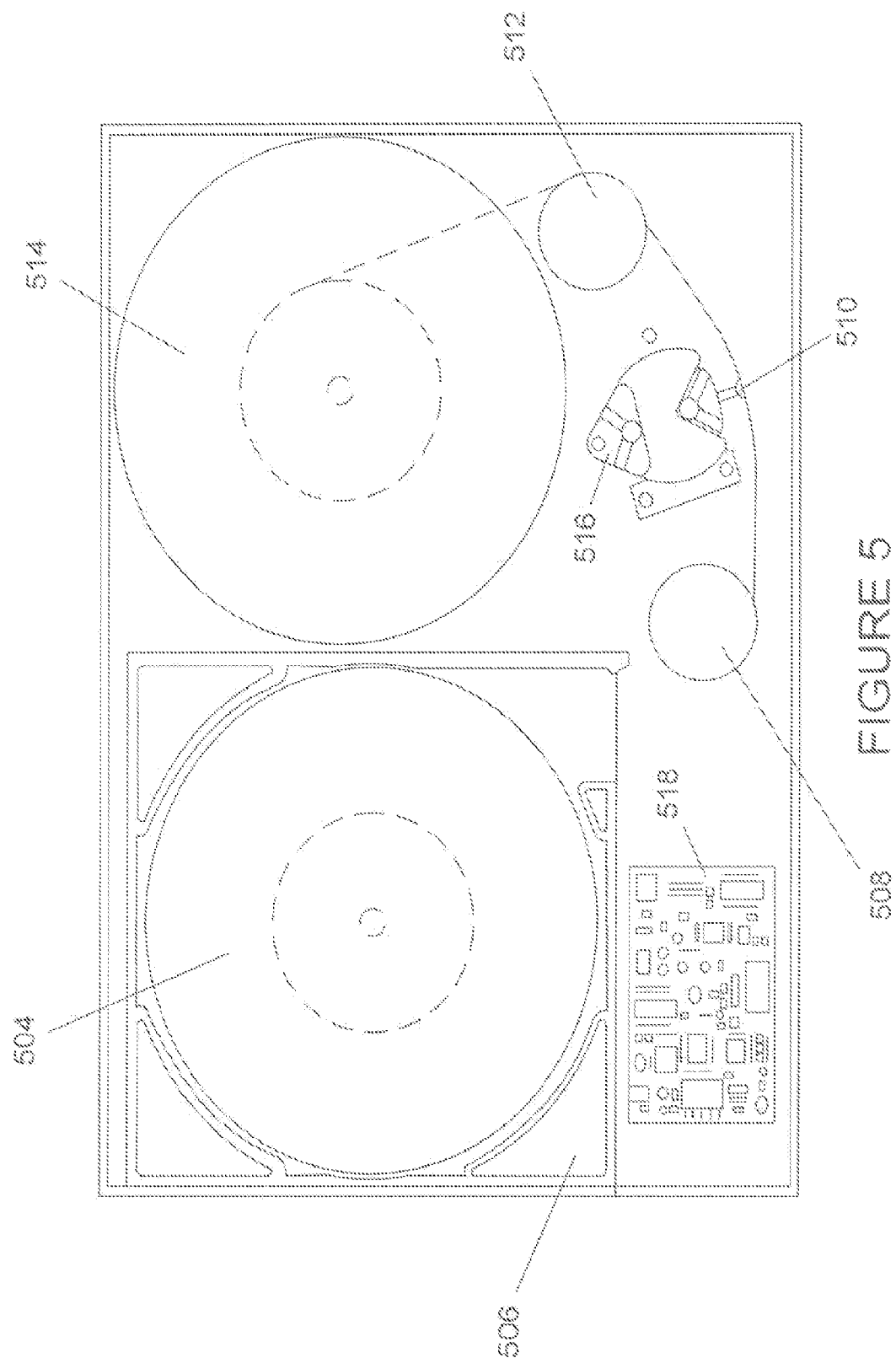
FIG. 5 shows the tape path within a magnetic-tape cartridge.

FIG. 5 shows the tape path within a magnetic-tape cartridge. The magnetic tape is initially wound on the supply reel 504 within the magnetic-tape cartridge 506. When loaded into the magnetic-tape drive, a mechanical mechanism opens the cartridge, grasps a leader pin mounted to the leader portion of the magnetic tape, and threads the tape around a first guide roller 508, over the tape head 510, and around a second guide roller 512 to the take-up reel 514. As discussed in greater detail, below, the tape bead 510 includes an array of read/write elements that write data to, and read data from, the magnetic tape. The tape head 510 is moved in a vertical direction, normal to the plane of the drawing, by an actuator 516 in order to access different sets of tracks for reading and writing. The actuator 516 is, in turn, controlled by a tape-drive controller 518 that includes one or more processors, electronic memory, and logic circuitry for receiving data from an external host computer system, processing the data into data sets, writing the data sets to the magnetic tape by electromechanical control of the tape head 510, reading data sets from the magnetic tape by electromechanical control of the tape head 510, and processing the data sets to retrieve the host data that is returned to the host computer system.

Figure 6:
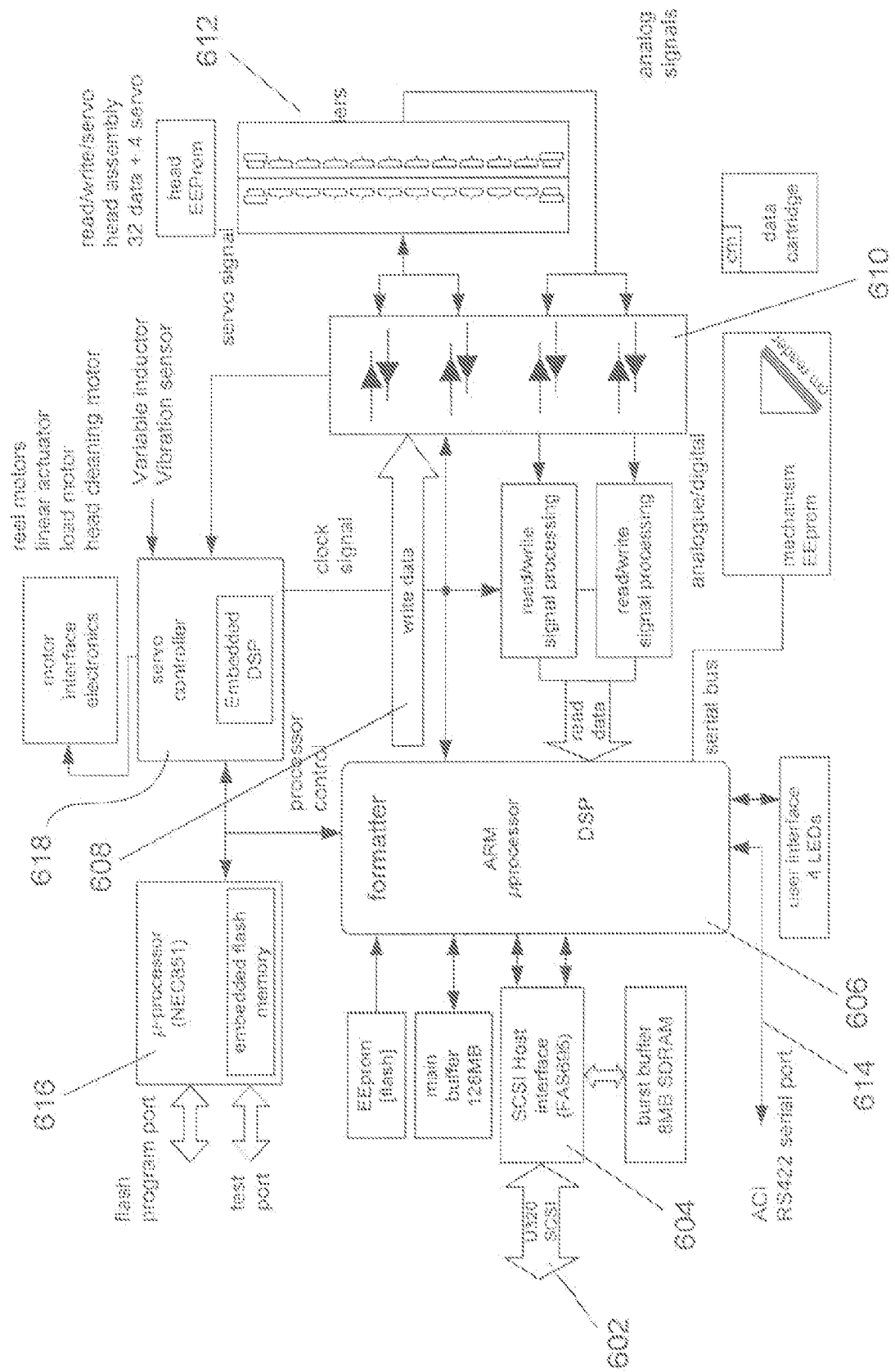
FIG. 6 provides a block diagram of the internal components of a magnetic-tape drive.

FIG. 6 provides a block diagram of the internal components of a magnetic-tape drive. The tape drive is connected to a host computer through a small-computer-system-interface ("SCSI"), Fibre Channel ("FC"), or Serial Attached SCSI ("SAS") communications medium 602 and the appropriate host interface 604. Data received from one or more host computers through the communications interface is processed and formatted by a formatter component 606 into codeword quads, discussed below, that are transferred through an internal communications medium 608 to a bank of preamplifiers 610 that emit analog signals to the read/write elements of the tape head 612. The analog signals, within the read/write elements of the tape head, produce localized magnetic fields over small regions of a ferromagnetic layer of the tape, reversibly changing the magnetic state of the regions to store bits of data. Similarly, data is read by the tape head 612 in the form of analog signals generated within the read/write elements by localized magnetic fields within tiny regions of the magnetic tape. The analog signals are passed hack to the bank of preamplifiers 610, the amplified signals then converted to digital signal and passed back to the formatter 606 for processing data sets back into host data that is packed for transmission thorough the communications medium to an external host computer. There is a separate automation control interface 614 that allows the drive to be coordinated for operation within a tape-drive library. Control programs that execute on a microprocessor 616 provide overall control of the magnetic-tape drive, including control of the communications medium, formatter, servo controller 618, and internal data transfer. The servo controller 618 receives signals from servo elements on the tape head and responds to the signals by controlling tape-head positioning actuators, drive motors, and other electromechanical components. The servo-controller feedback system provides precise tracking of data tracks on the magnetic tape despite non-uniformities in the magnetic tape. The speed at which the tape is passed over the tape head is controlled by the microprocessor in order to match the data-input speed through the host interface, when writing data to the magnetic tape, and to match the data-consumption rate of an external host computer through the host interface, when reading data from the magnetic tape.

Figure 7:
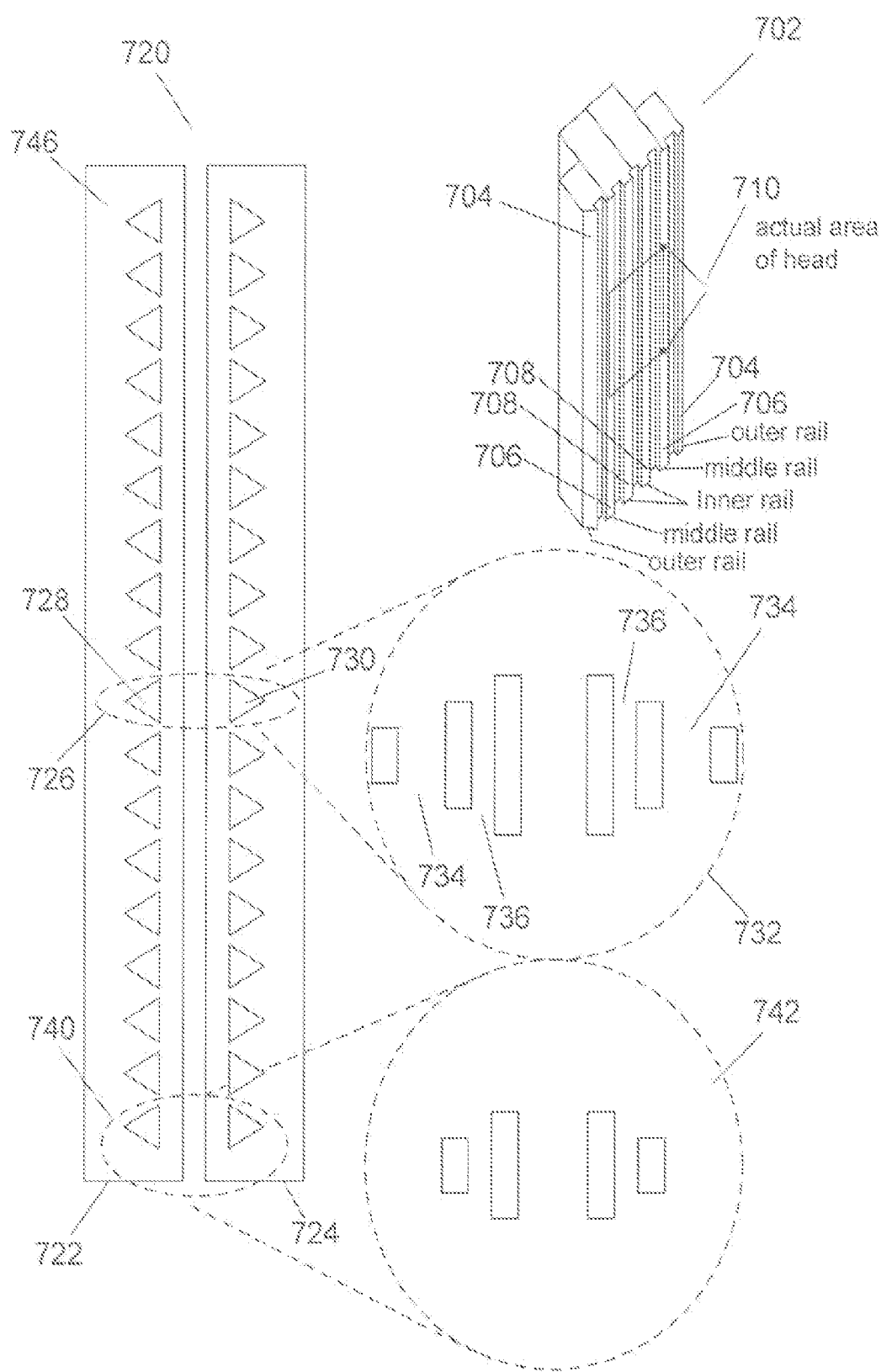
FIG. 7 illustrates a tape head.

FIG. 7 illustrates a tape head. The active components of the tape head 702 are fabricated onto the ceramic substrate of the tape head using photolithography techniques. The active data read and servo head elements are magneto-resistive devices, within the semiconductor tape head, which exhibit variable resistance that depends on the magnetic fields to which the tape-head elements are exposed. Each data read and servo head element requires a small sense current enabling the detection of resistance changes when data is read from a magnetic tape. Each data write element comprises a tiny copper coil which generates a magnetic field when supplied with an electric current, when data is written to a magnetic tape. The surface of the tape head may be corrugated, as shown in FIG. 7, including a pair of rounded outer rails 704, a pair of middle rails 706, and a pair of inner rails 708. The active portion of the tape head 710 comprises the central portion of the two inner rails. The active portion of the tape head 720 is represented in FIG. 7 as two vertical arrays of tape-head elements. The first vertical array 722 is fabricated on the left-hand middle rail, and the second array of vertical element 724 is fabricated on the right-hand middle rail. In an LTO-4 generation tape head, the tape-head elements are horizontally aligned to form tape-head-element pairs. There are two types of tape-head element pairs. A read/write tape-head-element pair 726 includes a left-hand read/write element 728 and a right-hand read/write element 730. A closer view 732 of the read/write element pair 726 shows that each read/write element includes a WRITE gap 734 and a READ gap 736. A servo tape-head-element pair 740 consists of a pair of READ elements, shown in a closer view 742 in FIG. 7. When the magnetic tape moves past the tape head in a left-to-right direction, the left-hand read/write elements of each pair of read/write elements, positioned within the left-hand vertical array 722, write data to the magnetic, tape that is then immediately read, for error-detection purposes, by the corresponding right-hand read/write elements of each read/write element pair, positioned within the right-hand vertical column 724. When the magnetic tape passes over the tape head in the opposite direction, the operational roles of the read/write elements in each read/write element pair is reversed. Two servo tape-head-element pairs 740 and 746 read information from two servo hands within a formatted magnetic tape, as discussed below, and the 16 read/write element pairs, including read/write-element pair 726, each writes data to and/or reads data from a different data track.

Figure 8:
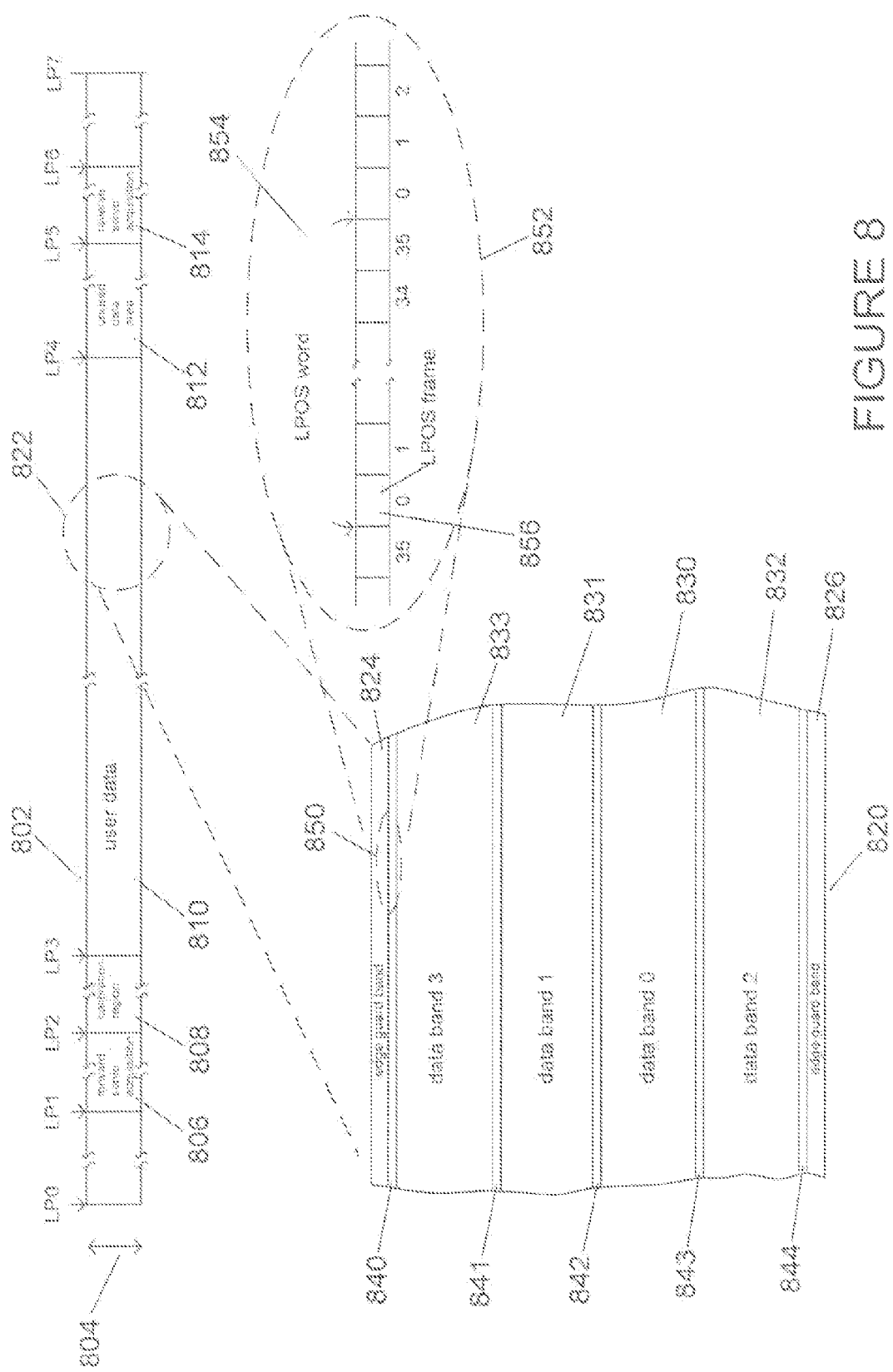
FIG. 8 shows the structure and formatting of a magnetic tape.

FIG. 8 shows the structure and formatting of a magnetic tape. The magnetic tape 802, according to the LTO-4 magnetic-tape technology standard, is 12.65 mm wide 804 and up to 820 meters long. The magnetic tape comprises a has substrate, such as polyethylene terephthalate, coated with a layer of ferromagnetic material dispersed in a suitable binder. A tape is divided into seven logical regions by the seven logical points LP0, LP1, . . . , LP7 shown above tape 802 in FIG. 8. These regions include a forward servo acquisition region 806, a calibration region 808, a user data region 810, an unused data region 812, which may have 0 length, depending on configuration of the magnetic tape, and a reverse servo acquisition region 814. An LTO-4 generation tape, a portion of which is shown in closer view 822 in FIG. 8, is horizontally divided into top 824 and bottom 826 edge-guard bands and four data hands 830-833 interleaved between five servo bands 840-844. Each servo band comprises a sequence of longitudinal-position ("LPOS") words. In FIG. 8, a small portion 850 of servo band 840 is shown in a closer view 852. Each LPOS word 854 comprises 36 LPOS frames, such as LPOS frame 856. Each LPOS word encodes a synchronization mark, a longitudinal-position value, and optional manufacture data. Each LPOS frame encodes one bit of data. The servo bands are written as part of magnetic-tape manufacture.

Figure 9A:
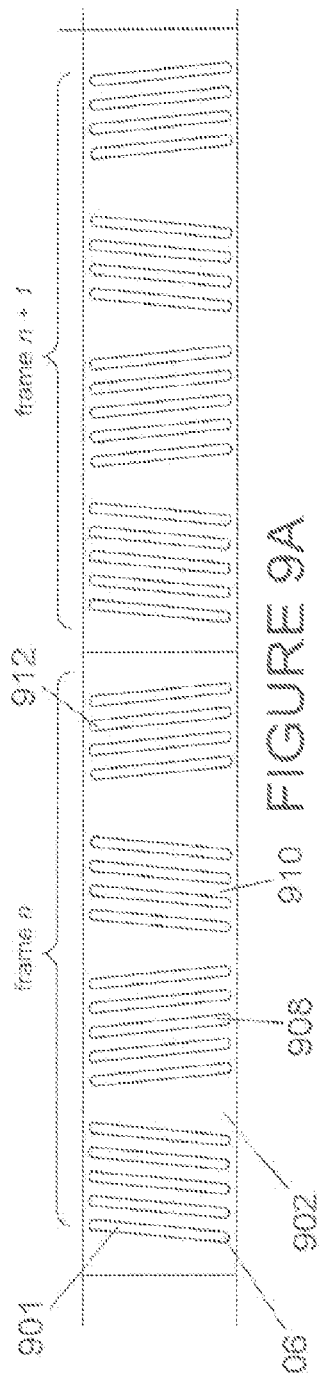
FIGS. 9A-C illustrate the contents of longitudinal position frames.
Figure 9B:
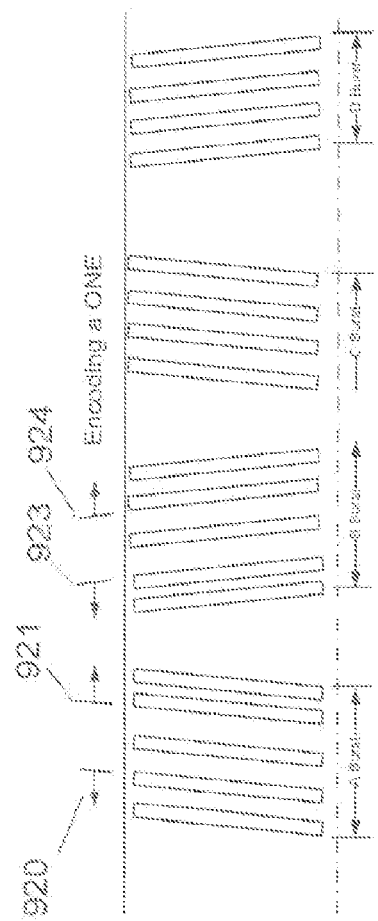
Figure 9C:
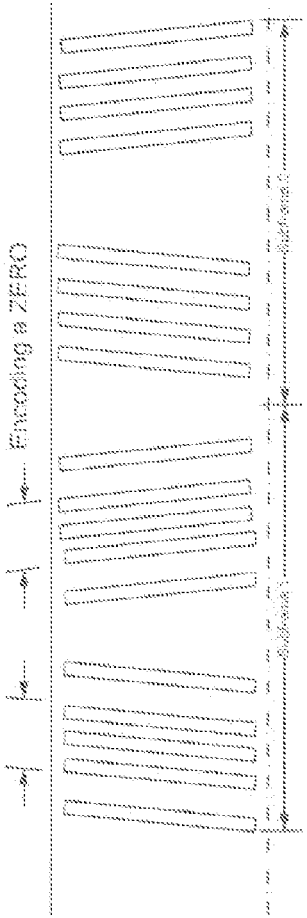

FIGS. 9A-C illustrate the contents of longitudinal position frames. FIG. 9A shows two contiguous LPOS frames within an LPOS word. Each frame, such as frame 902, includes four groups of slanted stripes, such as stripe 904. The four groups of stripes include an A group 906, a B group 908, a C group 910, and a D group 912, A binary "1" value is encoded, as shown in FIG. 9B, within the A and B sets of stripes by moving the second stripe in both the A and B sets towards the first stripe and the fourth stripe in bath the A and B sets towards the fifth stripe, as indicated by the arrows 920-923 above those stripes in FIG. 9B. A binary "0" value is encoded by moving the stripes in the opposite direction, as shown in FIG. 9C. The stripes are magnetized regions on the surface of tape. The stripes are slanted so that the interstripe spacing varies in a direction perpendicular to the edges of the tape. This variation in interstripe spacing is used by the servo controller to infer a position of the tape head with respect to a vertical axis superimposed over the servo band. As discussed in detail, below, an LTO-4 servo controller can position the tape head accurately in 14 different vertical positions corresponding to the 14 different tracks within each sub-band of a data band, discussed below, by reference to the servo bands between which the data band is interleaved.

Returning to FIG. 8, the data band 830-833 of an LTO-4 magnetic tape are interleaved between five servo bands 840-844. A tape is written by writing data to each of the four data bands in sequential order. In other words, data band 0 (830) is written first, followed by data band 1 (831), data band 2 (832), and finally data band 3 (833).

Figure 10:
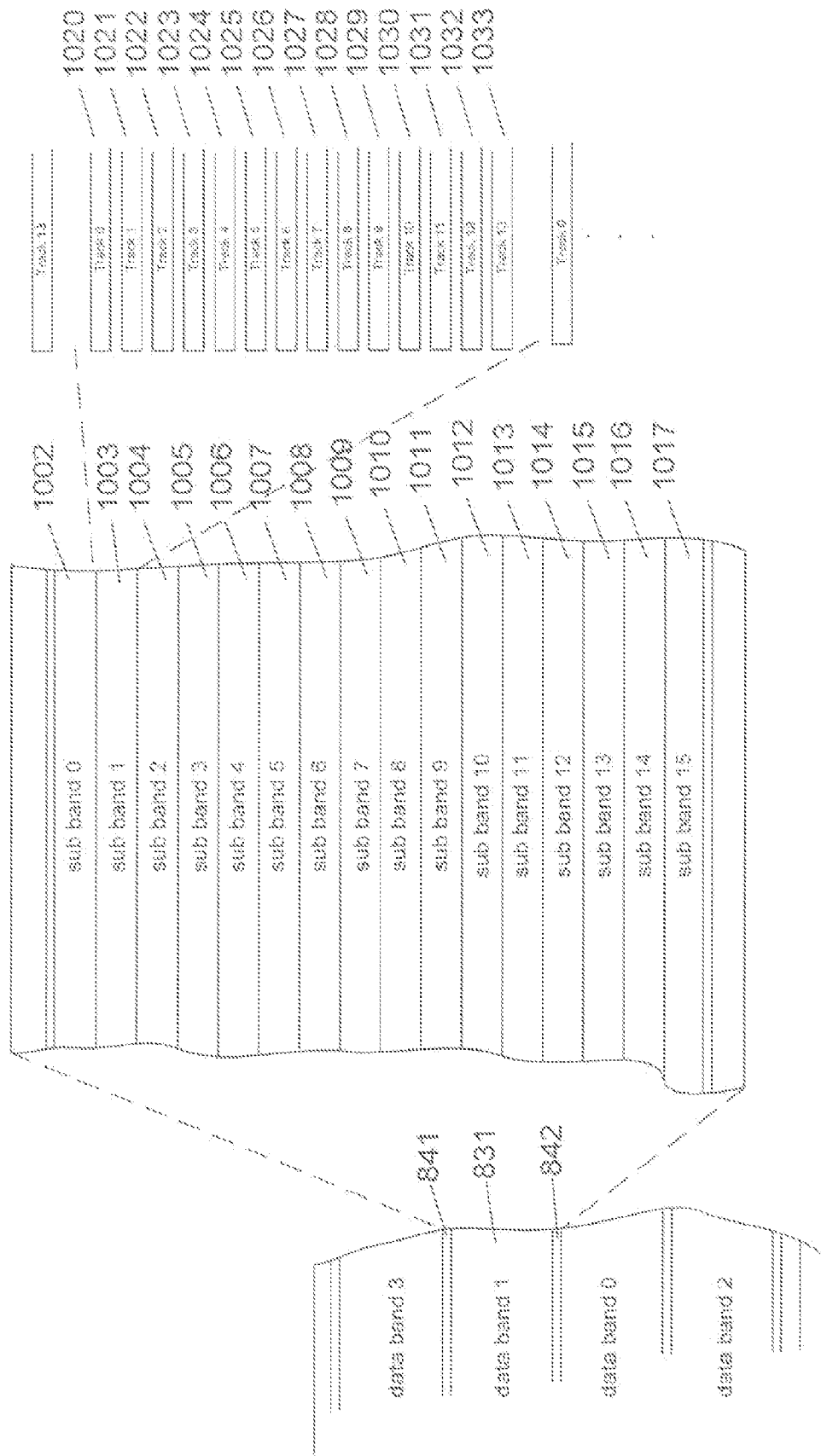
FIG. 10 shows the format structure of a data band.

FIG. 10 shows the format structure of a data band. As shown in FIG. 10, a data band 831, bounded on each side by servo bands 841 and 842, is divided into 16 sub-bands 1002-1017. As shown in FIG. 10, each sub-band, such as sub-band 1003, is, in turn, divided into 14 different data tracks 1020-1033. Returning to FIG. 7, when a tape head is positioned over a data band, such as data band 831, in order to read data from, or write data to, the data band, the two servo tape-head element pairs 722 and 746 are positioned over the bounding servo bands, such as servo bands 841 and 842, and each read/write element pair is positioned over a different sub-band. In other words, each of the 16 sub-bands 1002-1017 corresponds to a different read/write element of the tape head. When data is being written to, or read from, the tape, all 16 read/write element pairs are active, and data is actively written to, or read from, all 16 sub-bands within a data band. There are 14 different positions in a data band that the tape head can assume, corresponding to the 14 different data tracks 1020-1033 within each sub-band of the data band.

Figure 11:
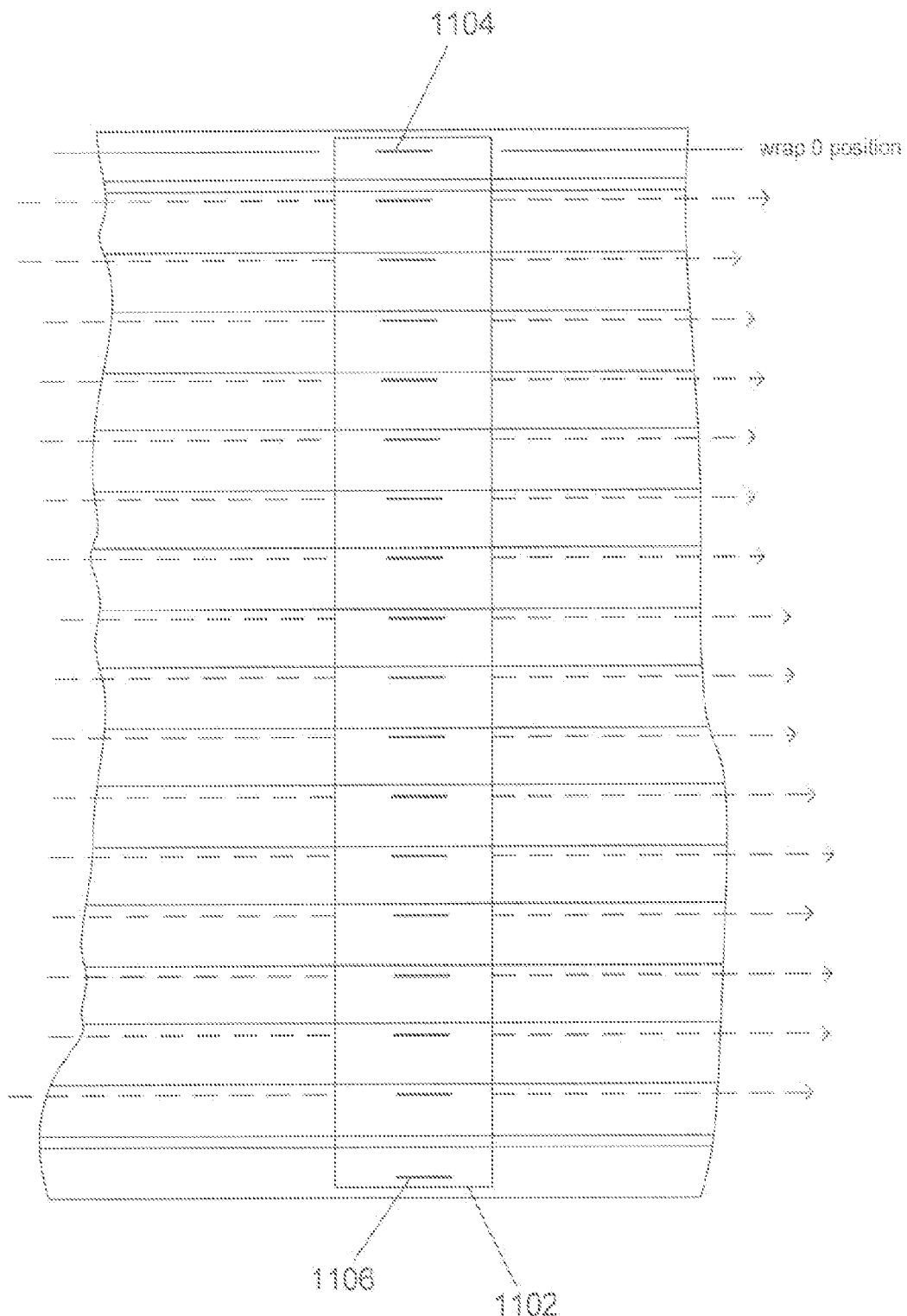
FIG. 11 illustrates a magnetic-tape head positioned over a data band and two bounding servo bands of an LTO-4 generation magnetic tape.

FIG. 11 illustrates a magnetic-tape head positioned over a data band and two bounding servo bands of an LTO-4 generation magnetic tape. The tape head 1102 is represented as a rectangle with 18 horizontal line segments, such as horizontal line segment 1104, representing the 18 different tape-head element pairs. The tape head is positioned to read or write the first data track, track 0 (1020 in FIG. 10), of each of the 16 sub-bands (1002-1017 in FIG. 10) of one data band (831 in FIG. 10) of an LTO-4 generation magnetic tape. As discussed above, positioning of the tape head relative to the data tracks is controlled by the servo controller, which senses the vertical position of the tape head within the servo band using data provided by servo tape-head elements 1104 and 1106. As discussed above, the frequencies of the analog signals produced by the servo tape-head elements is related to the distances between the slanted stripes within LPOS frames at the current tape-head position.

Figure 12A:
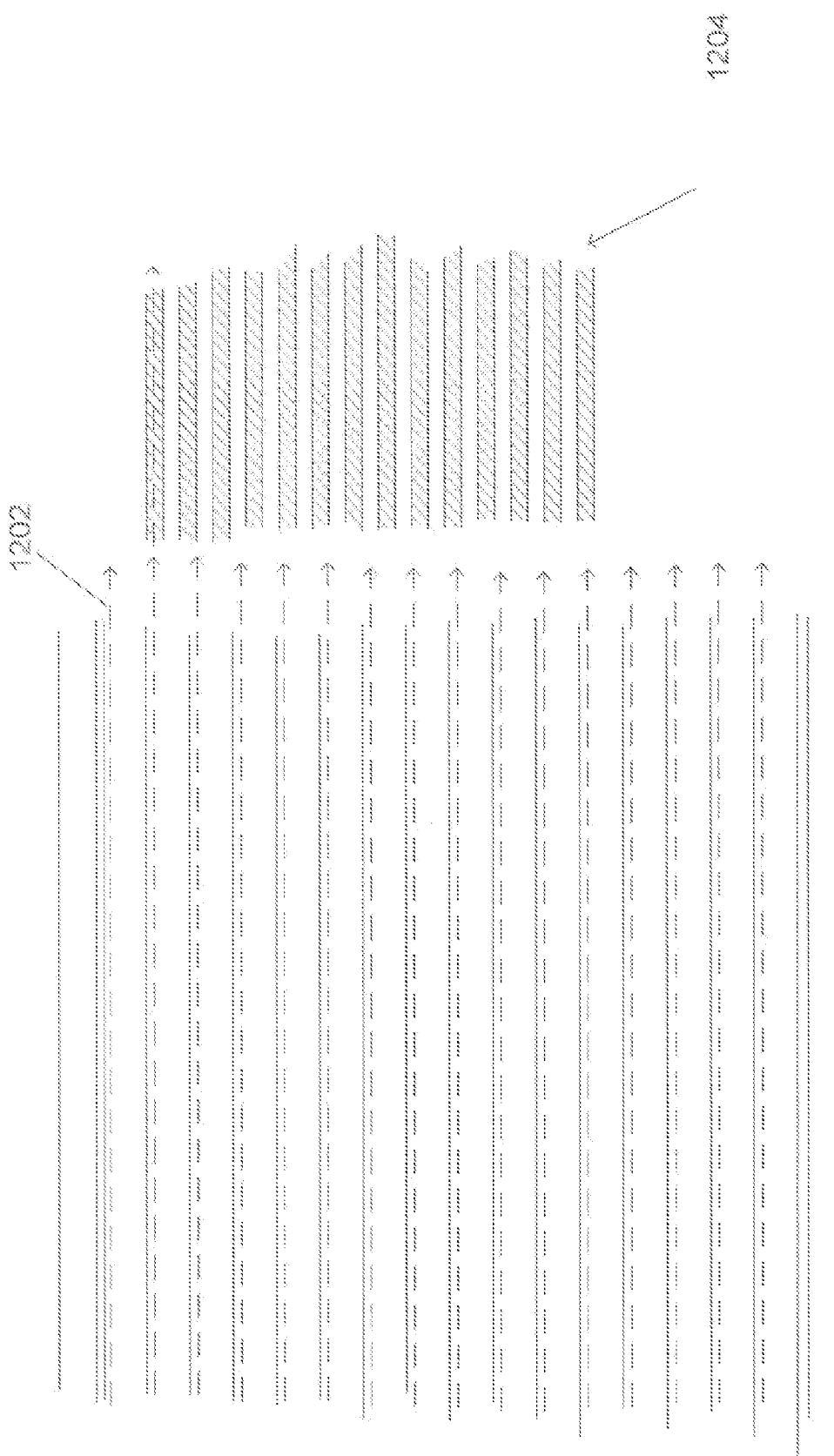
FIGS. 12A-B illustrate writing of the first two tracks of each sub-band within a data band of an LTO-4 generation magnetic tape.
Figure 12B:
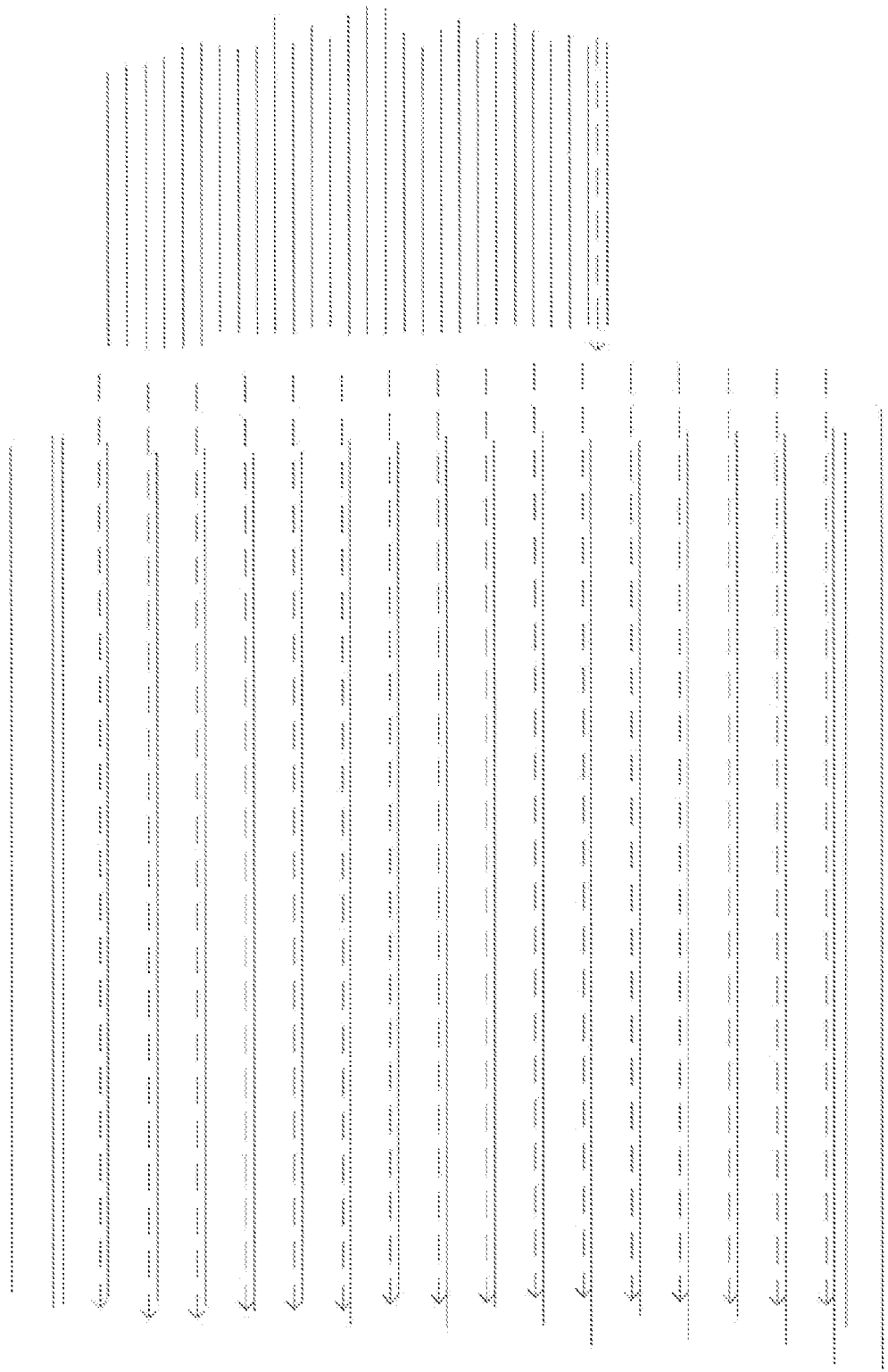

FIGS. 12A-B illustrate writing of the first two tracks of each sub-band within as data band of an LTO-4 generation magnetic tape. In FIG. 12A, the magnetic tape is moved in a forward direction, from cartridge to take-up reel, over the tape head, positioned as shown in FIG. 11, so that each read/write tape-head element pair is aligned with the first track, track 0, within each sub-band. Thus, in FIG. 12A, the dashed lines, such as dashed line 1202, represent the trajectory, or path, of the tape with respect to a read/write element pair of the tape head. The entire length of the data portion of the tape is written, in the forward direction, with the tape head positioned as shown in FIG. 11 to complete a first forward-direction pass of the tape. Thus 16 data tracks (data track 0 in each of the 16 sub-bands) are written from beginning to end in a single pass, also referred to as "wrap 0." In the following discussion and in the claims, tracks read or written during a wrap that lie in adjacent sub-bands are referred to as being "logically adjacent." In FIGS. 12A-13, the position of a read/write tape-head element pair is also shown with respect to the 14 data tracks 1204 of a sub-data band. When there is more data to be written, data writing continues, as shown in FIG. 12B, in a second, reverse-direction pass, with the magnetic tape wound from the take-up reel back to the cartridge spool. In this case, the tape head is repositioned so that each read/write element pair is positioned over the final track, track 13 (1033 in FIG. 10) of each data sub-band, as shown in FIG. 12B. In the second, reverse-direction pass, data track 13 of all 16 data sub-bands is written in the reserve direction from the end of the user-data area to the beginning of the user-data area, as shown in FIG. 12B. This second, reverse-direction pass constitutes a second wrap, or wrap 1.

Figure 13:
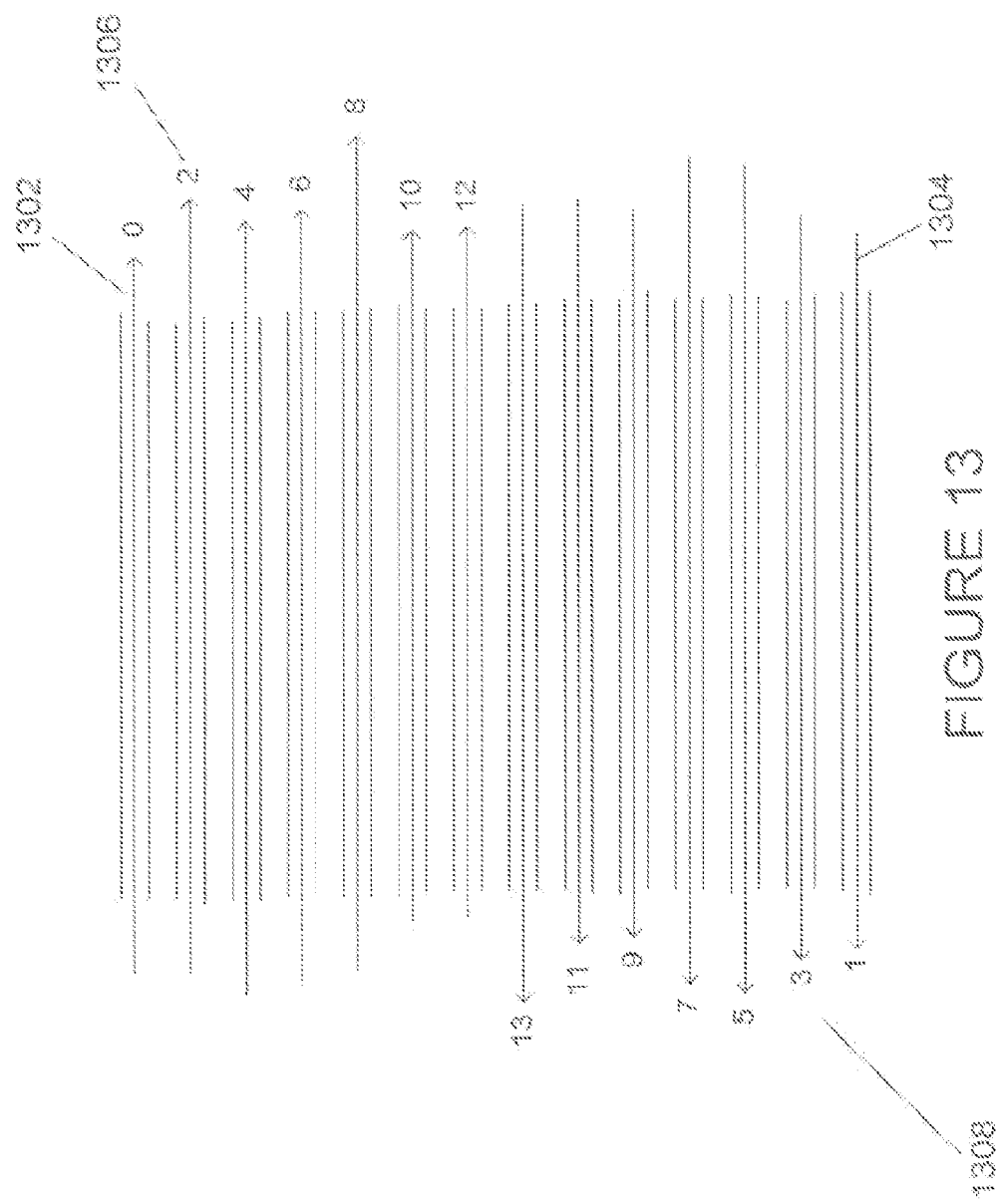
FIG. 13 illustrates the 14 wraps associated with each data band.

FIG. 13 illustrates the 14 wraps associated with each data band. As discussed with reference to FIGS. 12A-B, wrap 0 1302 includes data track 0 of each data sub-band of data band 0, accessed in the forward direction. Wrap 1 1304 includes data track 13 of each data sub-band of data band 0, accessed in the reverse direction. Wrap 2 1306 includes data track 1 of each data sub-band of data band 0, accessed in the forward diction, and wrap 3 130 includes data track 12 of each data sub-band of data band 0, accessed in the reverse direction. The wraps continue, in serpentine order, from the outer tracks to the interior tracks of each data sub-band. Because there are four data bands within an LTO-4 generation magnetic tape, there are a total of 4×14=56 wraps, or unidirectional passes over the tape, and the total of 4×14×16=896 data tracks.

Figure 14:
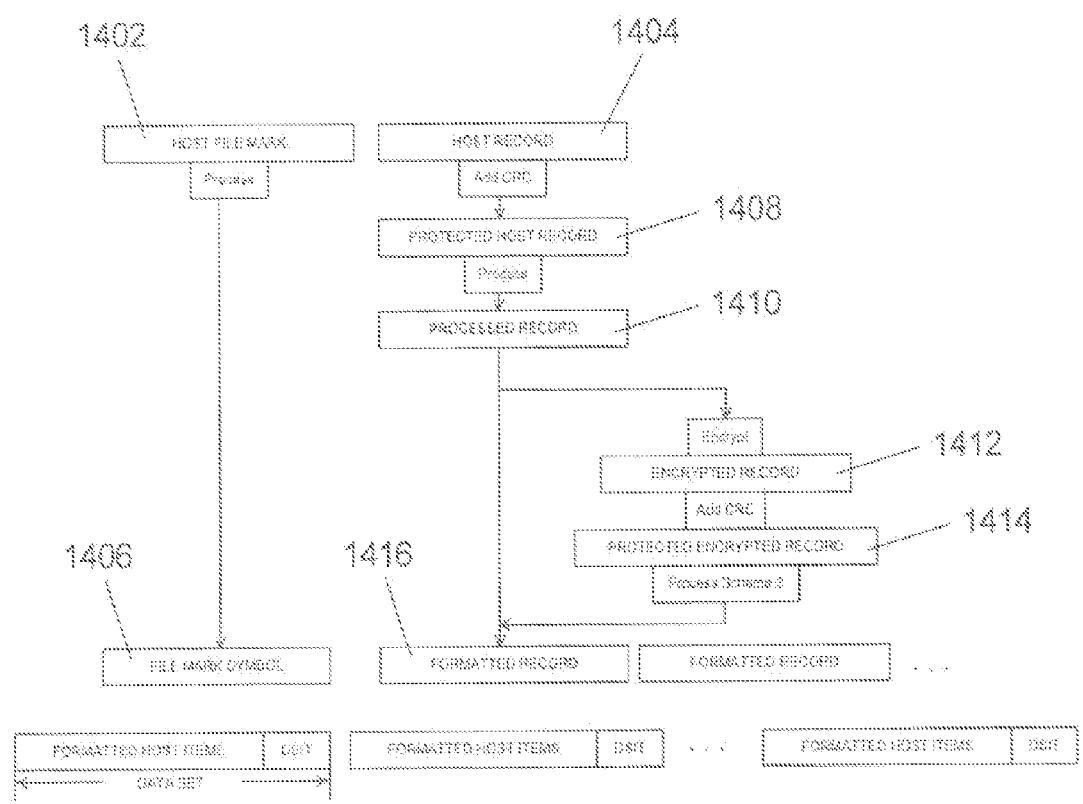
FIG. 14 illustrates formatting of host data for writing to tape.

FIG. 14 illustrates formatting of host data for writing to tape. Host data is essentially formatted into a symbol stream, each symbol represented by a byte. These bytes are then encoded by application of an error-correcting-code ("ECC") into an encoded-symbol-stream matrix which is then written across the sub-bands of a data band. Host file marks 1402 and host data records 1404 are received through the communications medium from host computers. A received host file mark 1402 is processed into a file-mark symbol 1406 for inclusion into a data set. A four-byte CRC is computed for each received host data record and added to the host data record to produce a protected host record 140. A data-compression method is applied to the protected host record to produce a processed record 1440. The processed record 1410 can be optionally encrypted to produce an encrypted record 1412, to which an additional four-byte CRC is appended to produce a protected encrypted record 1414. The protected encrypted record 1414 is pro to produce a formatted record 1416. When no encryption is applied, the processed record 1410 is used as the formatted record 1416. Formatted records are added to the formatted symbol stream. The formatted symbol stream is partitioned into data sets, each data set comprising 1,589,300 bytes of user data to which a 460-byte data set information table ("DSIT") is added. Each data set, in turn, is partitioned into 64 data subsets, each containing 24,840 bytes of user data.

Figure 15:
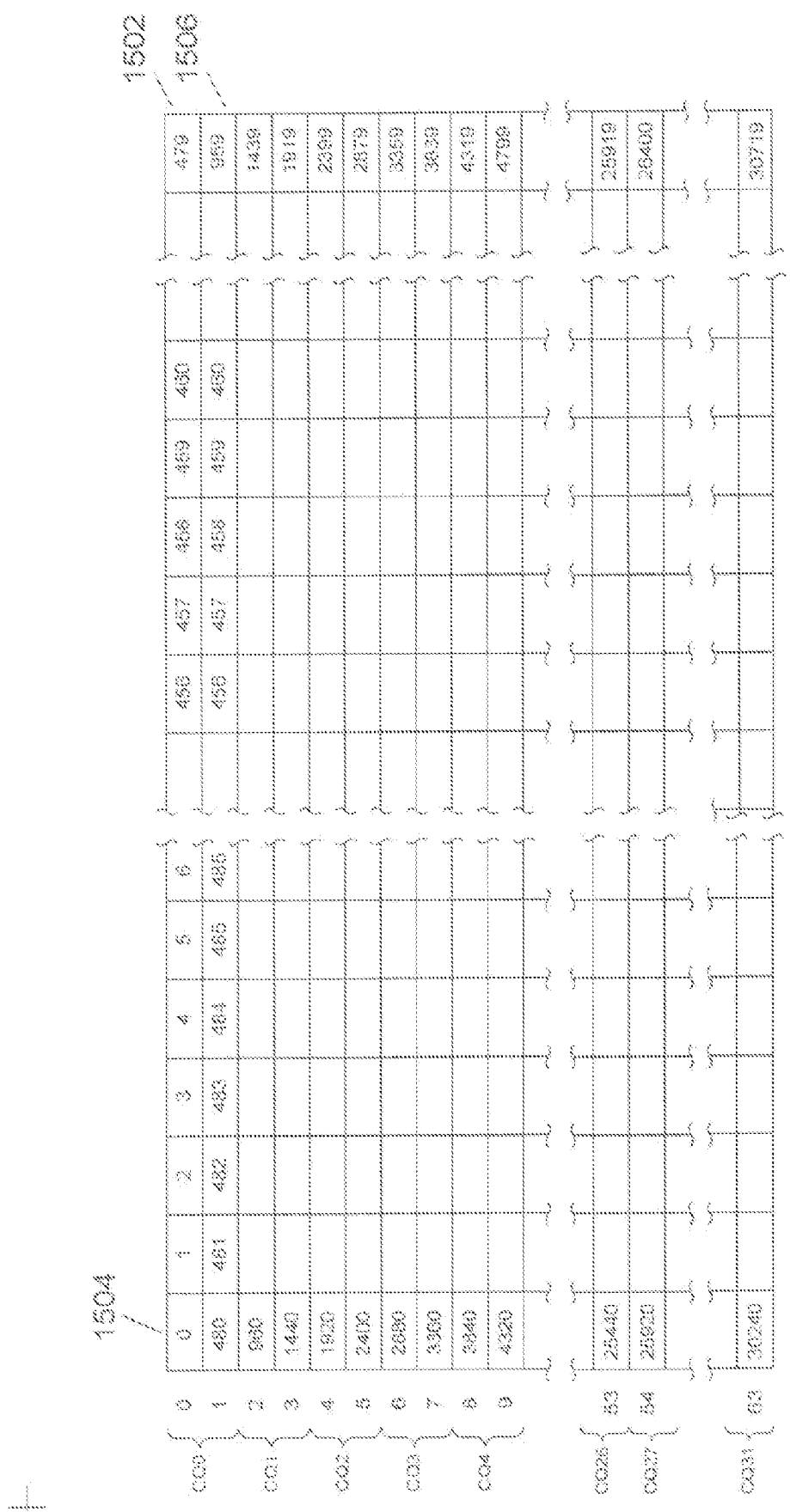
FIG. 15 shows a 64×480 byte table that contains a sub-data and additional parity-check bytes generated by application of two different error-correcting codes.

Each data sub-set is processed to form a matrix of code words. A first ECC encoding method is applied to each group of 460 bytes to produce 20 bytes of parity information that are added to the 460 bytes of user data to form a 480-byte pair of 240-byte ECC-1 codewords. Fifty-four ECC-1 codeword pairs are aligned to produce a 54×480-byte matrix. A second error-correcting code is applied to each column of this matrix to produce an ECC-2 code word combining 54 bytes of clear text and 10 parity-check bytes. Thus, each column of the 54×480 matrix is extended by 10 bytes to produce a final 64×480 byte table. FIG. 15 shows a 64×480 byte table that contains a data subset and additional parity-check bytes generated by application of two different error-correcting codes. Each row of the table, such as row 0 (1502), comprises two ECC-1 code words, including 460 bytes of clear-text user information and 20 parity-check bytes. Each column of the table, such as column 1504, contains 54 bytes of clear-text user data and 10 additional bytes of ECC-2 parity-check data, together forming an ECC-2 code word. Each pair of rows in the table, such as the pair of rows 1502 and 1506, together form a codeword quad ("CQ"). There are 32 CQs within a data subset, as shown in FIG. 15. As data is being written to tape, each read/write element pair of the tape head writes a CQ to each sub-band of a data band. Thus, in two write operations, a data subset is written across all 16 sub-bands of a band.

FIG. 16 illustrates writing of data subsets to a physical magnetic tape. The 16 horizontal rows in FIG. 16 correspond to 16 data sub-bands, each corresponding to a single read/write element of a tape head. At any given point in time, 16 CQs are written by the 16 read/write tape-head elements of as tape head to the tape across all 16 sub-bands. Thus, as a magnetic tape is being written in the forward direction, the first 16 CQs of a data subset are simultaneously written across all 16 sub-bands, represented by column 1602 in FIG. 16, and, in the next operation, the remaining 16 CQs of the data subset are written simultaneously across all 16 sub-bands, represented by column 1604 in FIG. 16.

Figure 17A:
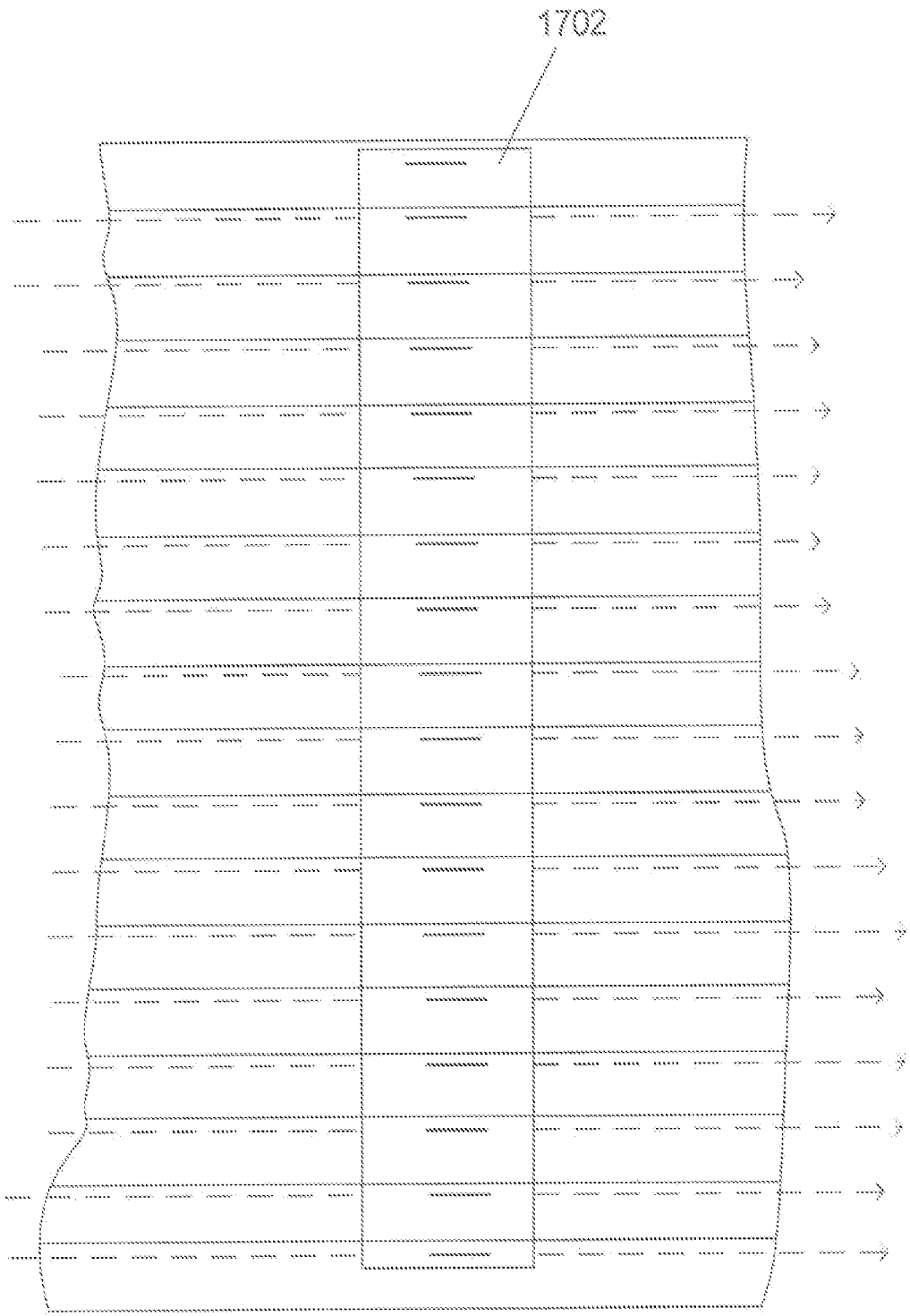
FIGS. 17A-C illustrate tape-head positioning within a data band.
Figure 17B:
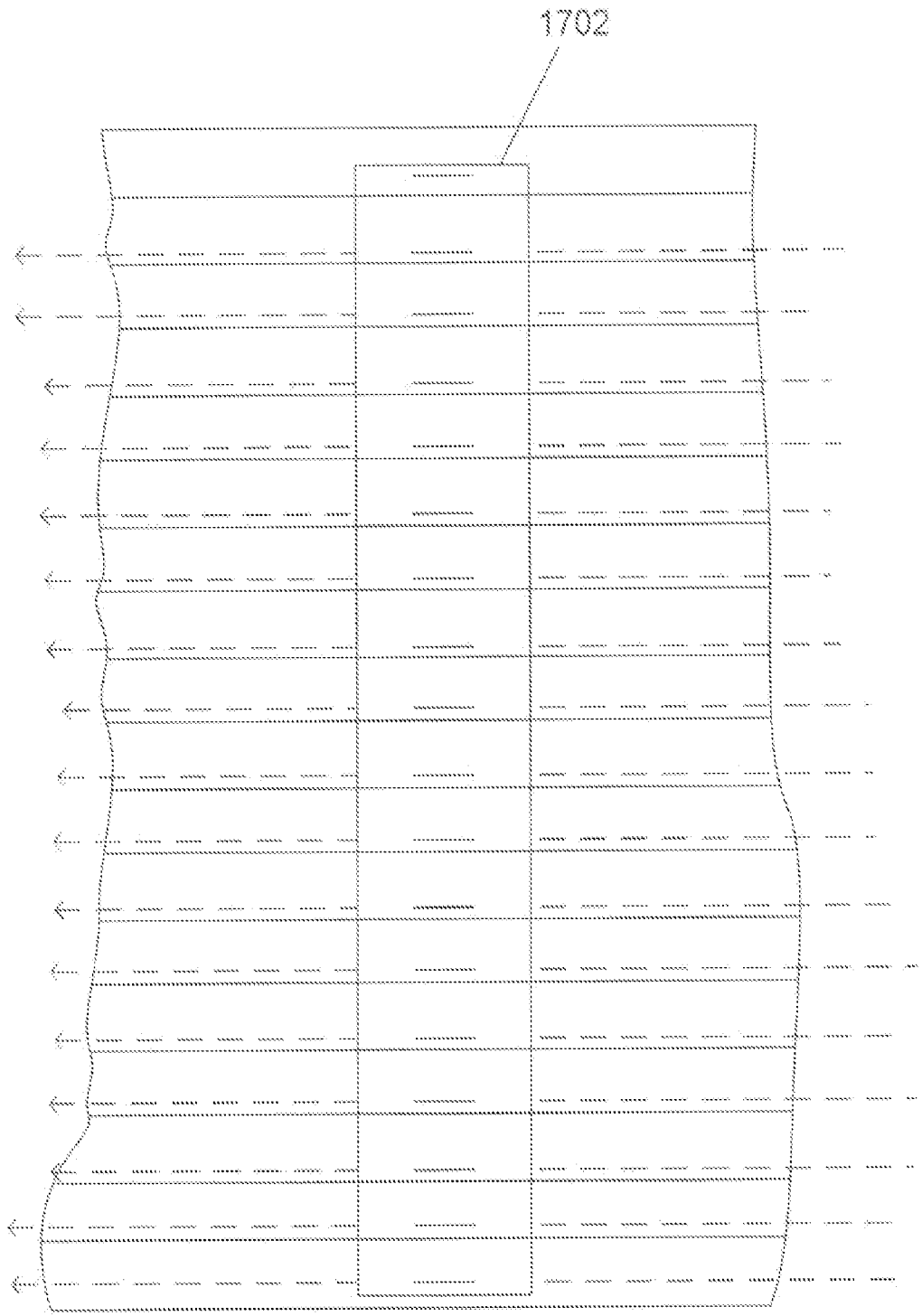
Figure 17C:
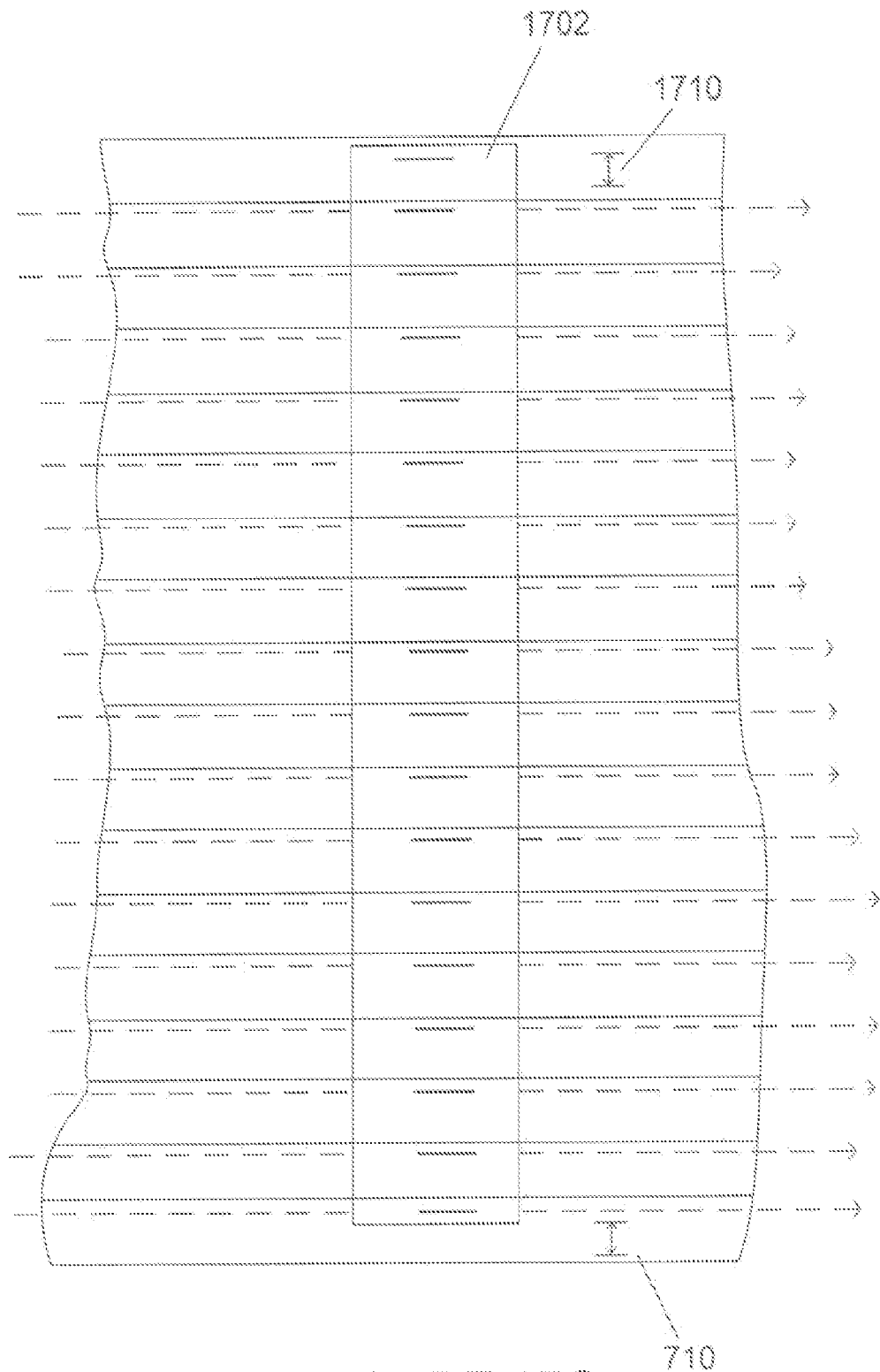

FIGS. 17A-C illustrate tape-head positioning within a data band. In FIG. 17A, the tape head 1702 is positioned to write track 0 of all 16 sub-bands of a data band. In FIG. 17B, the tape head 1702 is positioned to write track 13 of all 16 sub-hands of a data band. In FIG. 17C, the tape head 1702 is positioned to write track 1 of all 16 sub-bands of a data band.

Comparing FIGS. 17A-C, it is clear that, in order to access all 14 wraps within a data band, the tape head needs to move over a range of positions 1710 with respect to the servo band. In other words, there are 14 different tape-bead positions that correspond to the 14 tracks within each data sub-band within the narrow range 1710 of tape-head positions used for accessing a data band.

Figure 18:
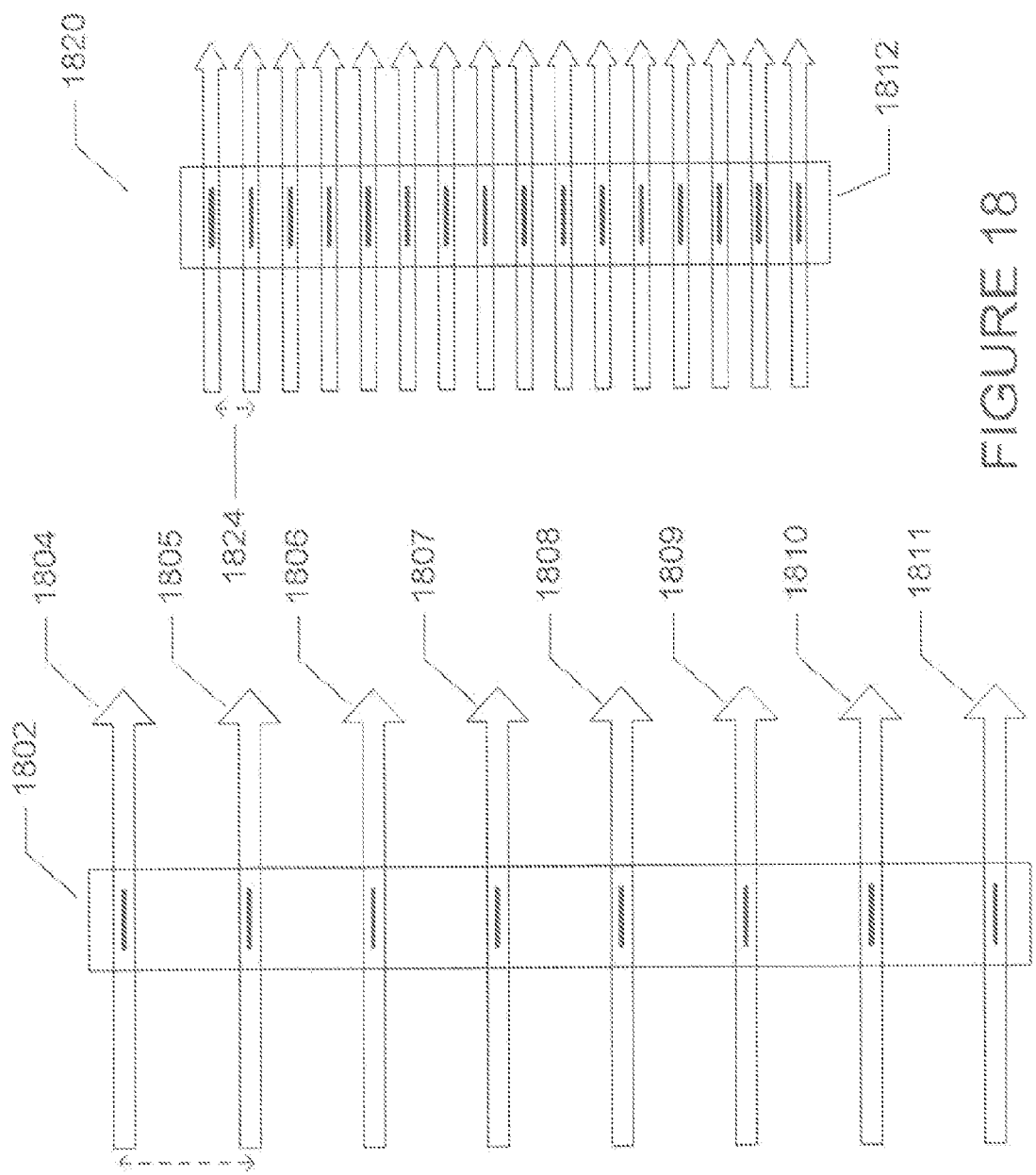
FIG. 18 illustrates an exemplary technology-improvement-driven change in magnetic-tape format and tape-head configuration.

As technology improves, it becomes possible to increase the density of data stored on magnetic tape as well as to decrease the width of tracks and bands of magnetic-tape formats. FIG. 18 illustrates an exemplary technology-improvement-driven change in magnetic-tape format and tape-head configuration. On the left of FIG. 18, an older-generation, eight-read/write-element tape-head 1802 is shown overlying eight tracks encoded in the right-to-left direction, indicated by the arrows at the right-hand ends of the representations of the data tracks 1804-1811. Note that FIG. 18 shows data tracks within a single band, and omits servo tape-head elements and servo hands as well as additional bands above and/or below the illustrated band. This same illustration convention is used in subsequent figures, for simplicity of illustration. The older-generation magnetic-tape format thus includes eight sub-bands in each band, each sub-band containing a fixed number of tracks. The magnetic-tape format is characterized by, among other things, the number of sub-bands and the distance between identically numbered tracks in two adjacent sub-bands 1812. In the right-hand portion of FIG. 18, a newer-generation magnetic-tape format and tape head are illustrated 1820 using the same illustration conventions as used for the older-generation magnetic-tape format and tape head shown on the left-hand portion of FIG. 18. The newer-generation tape head 1822 includes 16 read/write elements, or twice the number of read/write elements as in the older-generation tape head 1802. In addition, the distance between identically numbered tracks in two adjacent sub-bands 1824 is significantly smaller in the newer-generation magnetic-tape format, as is the width of the tracks and corresponding tape-head read/write elements. Decreasing the width of tracks, sub-bands, and bands reduces or ameliorates problems associated with dimensional instabilities of the magnetic-tape medium, and is thus a generally desired improvement in successive generations of magnetic-tape drives. Increasing the number of read/write elements leads to increased data-transfer rates, and decreasing track widths and the distance between sub-bands leads to higher data densities on the magnetic-tape medium. However, the newer generation tape head 1822 clearly is not configured for reading the older-generation magnetic-tape format, since the spacing between read/write elements and the number of read/write elements has been changed.

A variety of different backward-compatible tape heads that provide for transition to higher-capacity, newer-generation magnetic-tape formats while preserving the ability to read older-generation tape formats have been proposed. FIG. 19 provides an example of a backward-compatible tape-head configuration. The backward-compatible tape-head configuration 1902 includes eight read/write elements 1904-1911 spaced appropriately for an older-generation, 8-data-track tape and ten read/write elements 1914-1923 that, along with six of the older-generation read/write elements 1905-1910, are spaced appropriately for a newer-generation 16-data-track tape. The eight read/write elements 1904-1911 are used to read eight older-generation data tracks 1930-1937. Six of the read/write elements 1905-1910 and read/write elements 1914-1923 are used to read 16 newer-generation data tracks 1940-1955. Thus, while reading older-generation magnetic tapes, the eight read/write heads 1904-1911 are used, and the read/write heads 1914-1923 are not used. While reading newer-generation magnetic-tape formats, which feature 16 sub-bands rather than eight sub-bands, all but read/write heads 1904 and 1911 are used. Note that, as shown in the magnified view 1960 of the first read/write element, the read/write elements are generally oriented orthogonally to the direction in which the tape moves across the read/write head, and vertically with respect to the figure. The horizontal orientations of the read/write elements 1904-1911 and 1914-1923 are shown for illustration convenience, so that all 18 read/write elements can be fit within the illustration of the read/write head.

The proposed backward-compatible tape head, shown in FIG. 19, provides a solution to backward-compatibility issues for a particular generational transition, but may be associated with higher production costs and more complex magnetic-tape-drive implementations. Furthermore, should a subsequent generation feature additional sub-bands or an additional increase in data capacity, the tape head shown in FIG. 19 may generally not be able to read the next generation tapes, and the newest-generation magnetic-tape drive may require an even more complex tape head with many additional read/write elements to allow the newest-generation tape head to read magnetic tapes of the preceding two generations.

Figure 20B:
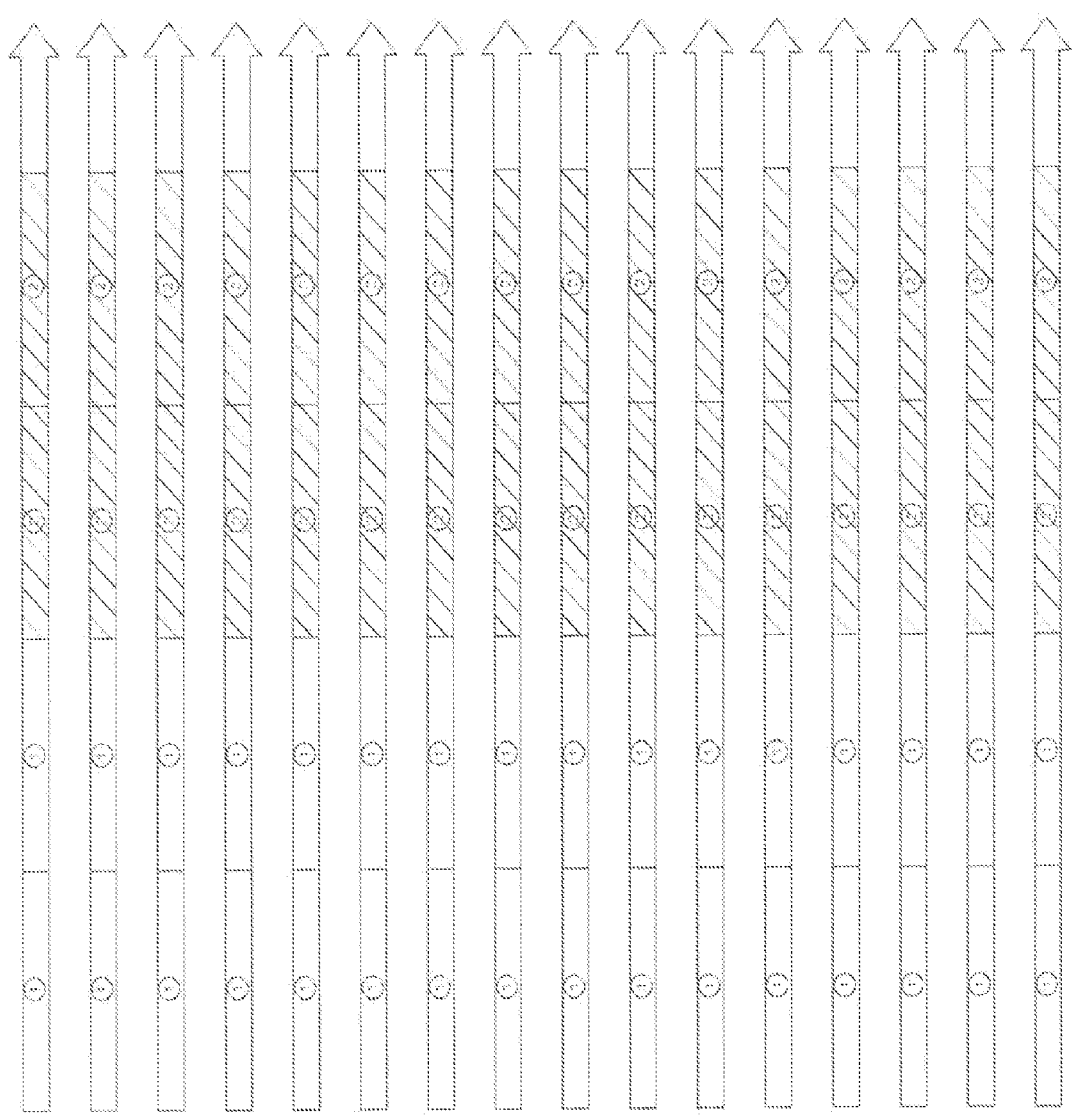

Embodiments of the present invention are based on a different approach to compatibility between various generations and different implementations of magnetic-tape drives. FIGS. 20A-B illustrate the current, single-linear-sequence-based placement of data sets onto the magnetic-tape medium. As discussed above with reference to FIGS. 14-16, LTO data sets comprise 32 code word quads ("CQs"). Each CQ comprises 960 ordered bytes. Data written to a magnetic tape is encoded as a series of data sets, each data set comprising 32 CQs or 960 bytes. In FIG. 20A, the first two data sets 2002 and 2004 via large file or object are shown at the top of the figure. As discussed with reference to FIG. 16, and as shown in the lower portion of FIG. 20A, the data sets are transferred to a magnetic-tape band in two columns, for a 16-sub-band magnetic-tape format, with a first column 2006 including CQs 0-15 and a second column 200 including CQs 14-31. Thus, along the long dimension of the magnetic tape, in the direction of tape motion, data sets are placed in a single linear sequence, with each data set divided into columns that span all of the sub-bands of the magnetic tape when there are fewer than 32 sub-bands per band. In en eight-sub-band magnetic-tape format, a data set may be written to magnetic tape as four successive eight-track columns, while in a 32-sub-band magnetic-tape format, each data set may be written to magnetic tape as a single column of CQs. Again, as discussed in detail above, the columns are placed in identically numbered units, each track contained in a different sub-band, written during a single pass, or wrap, of the magnetic tape. FIG. 20B shows an alternative representation of placement of the data sets onto 16 tracks of a magnetic tape, with the number of the data set shown for each CQ along each track and with the data sets differentiated by cross-hatching. With respect to each pass, or wrap, data from only a single data set is encoded at each linear position of the tape or, in other words, the data sets are placed on the tape in columns of CQs which span all of the tracks read or written in a single pass or wrap.

Figure 21A:
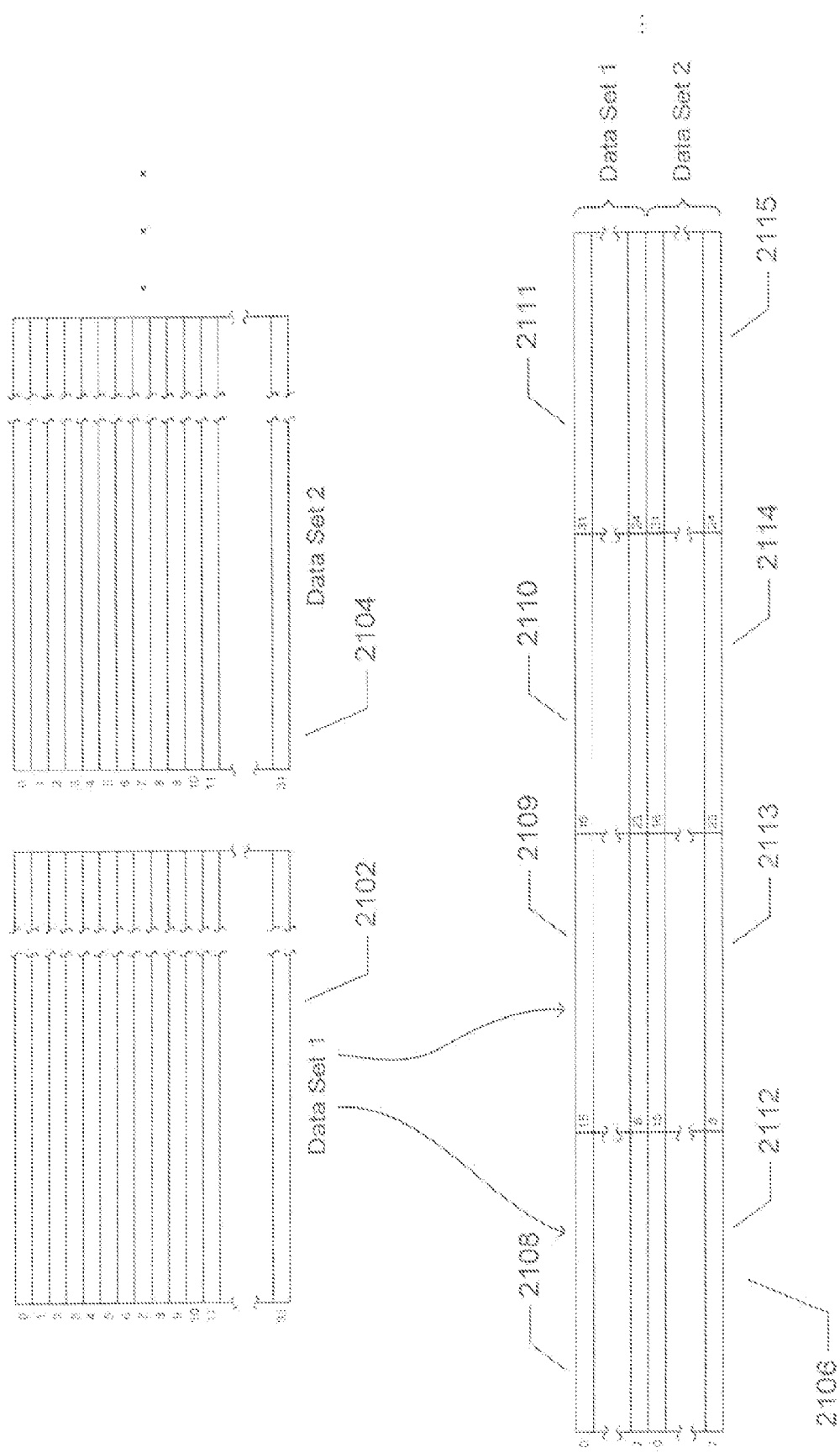
FIG. 21A illustrates a magnetic-tape format that represents one embodiment of the present invention.

FIG. 21A illustrates a magnetic-tape format that represents one embodiment of the present invention. Again, as in FIG. 20A, two 32-CQ data sets 2102 and 2104 are shown at the top of FIG. 21A. However, the data sets are written in parallel, in two parallel linear sequences, to the magnetic tape 2106, rather than as a single linear sequence, as shown in FIG. 20A. To be precise, data set 1 2102 is divided into four eight-CQ columns 2108-2111 that are written, in a first linear sequence, to the top eight tracks of a 16-track wrap within a magnetic-tape band. Data set 2 is divided into four eight-CQ columns 2112-2115 that are written to the bottom eight tracks of a 16-track wrap within the magnetic tape, in a second linear sequence. At any position along the linear length of the data-encoding region of the magnetic tape, eight CQs of one data set and eight CQs of a second data set are written to the top eight tracks and bottom eight tracks, respectively, of each 16-track magnetic-tape wrap. Thus, in the embodiment of the present invention shown in FIG. 21A, data sets are multiplexed in two, parallel, eight-track groupings of the total 16 tracks that underlie 16 read/write heads during a single pass, or wrap. FIG. 21B provides an alternative representation of the data-set-multiplexing magnetic-tape format illustrated in FIG. 21A that represents one embodiment of the present invention, using the same illustration conventions as used for FIG. 20B. Thus, according to embodiments of the present invention, the various magnetic-tape formats that represent embodiments of the present invention differ from currently employed magnetic-tape formats in that, with respect to the tracks that are read or written during a single pass, or wrap, of the tape, data corresponding to two or more data sets are encoded across the tracks of the pass, or wrap in a direction orthogonal to the direction in which the tape moves. The tracks of one pass or wrap are divided into groups of tracks, each of which encodes CQs of a different data set. Magnetic-tape formats of the present invention can therefore be described as providing multiple, parallel sequences of data sets within a number of tracks, each within a different sub-band of a magnetic-tape band, that constitute a pass or wrap, the magnetic-tape formats of the present invention referred to as "data-set-multiplexing" magnetic-tape formats. By contrast, currently employed magnetic-tape formats include encoded CQs of only a single data act at each point along the linear length of a pass or wrap.

Figure 22B:
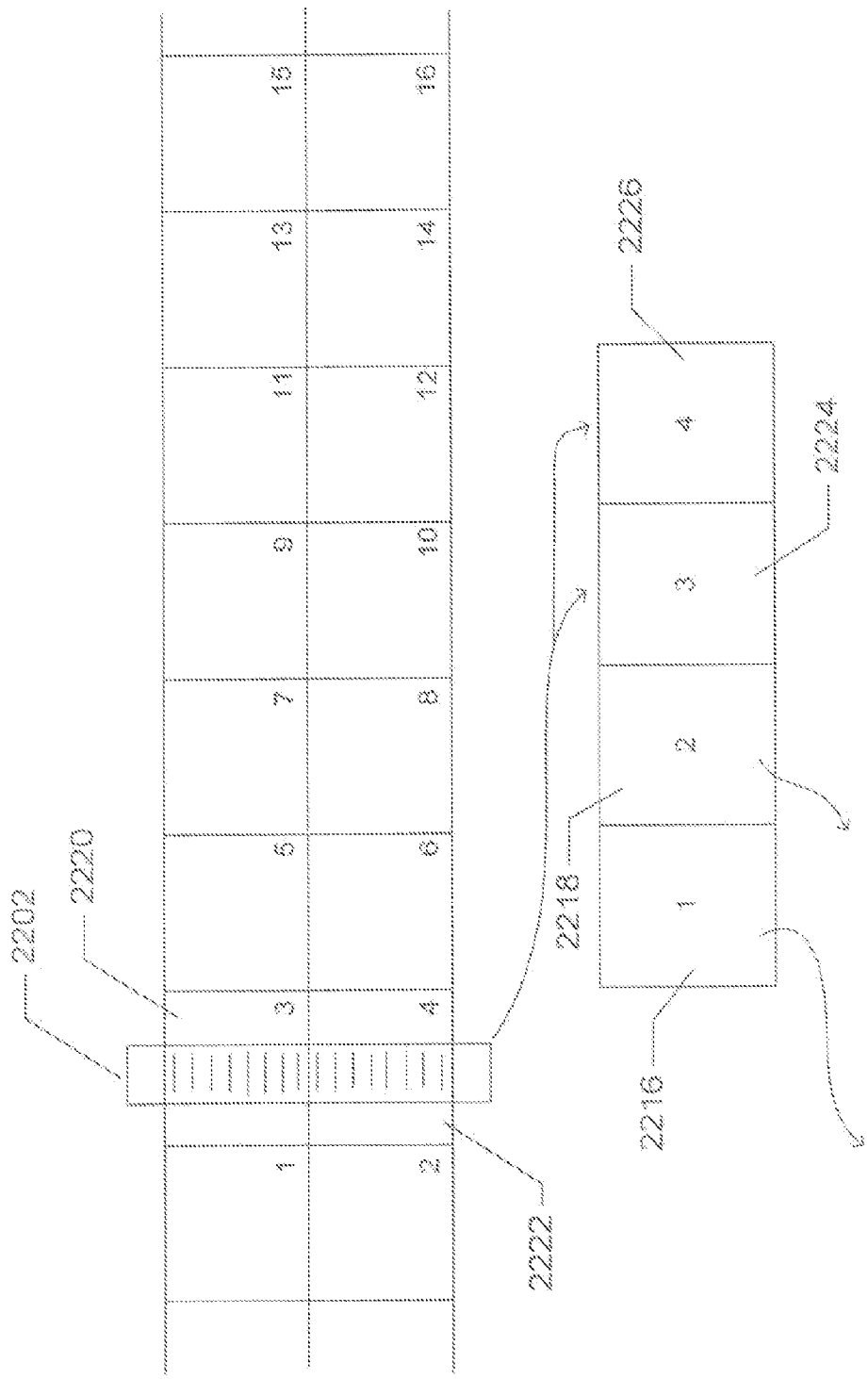

FIGS. 22A-C illustrate reading of a magnetic tape formatted according to the magnetic-tape format that represents one embodiment of the present invention, illustrated in FIGS. 21A-B, by a 16-read/write-element tape head that represents a newer-generation tape head. In FIG. 22A, the tape head 2202 is positioned over encodings of a first 2204 and second 2206 data set of two, parallel sequences of data sets 2208 and 2210. The first linear sequence includes odd-numbered data sets 2208 and the second linear sequence 2210 includes even-numbered data sets. While positioned over the first two data sets, as shown in FIG. 22A, the first eight read/write elements of the tape head read CQs of data set 1 into a first memory buffer 2216 and CQs of the second data set into a second memory buffer 2218. As shown in FIG. 22B, when the reading of the tape progresses to the second pair of data sets, with the tape head 2202 positioned over the encodings of data sets 3 (2220) and 4 (2222), CQs of data set 3 are read into a third memory buffer 2224 and CQs of the fourth data set are read into a fourth memory buffer 2226, while data is extracted from the data sets stored in memory buffers 2216 and 2218 and transmitted to the computer or other computational entity on behalf of which the tape is read. As shown in FIG. 22C, when reading of the magnetic tape progresses to reading of the third pair of data sets, with the tape head 2202 positioned over data sets 5 (2230) and 6 (2232), data sets 5 and 6 are read into memory buffers 2216 and 2218 while data is extracted from the data sets stored in memory buffers 2224 and 2226 and returned to the computational entity on behalf of which the tape is being mad. Thus, for the newer-generation, 16-read/write-element tape head, two pairs of memory buffers are used, in alternating, double-buffering fashion, to receive two data sets while transmitting two previously read data sets to a computational entity.

Figure 23B:
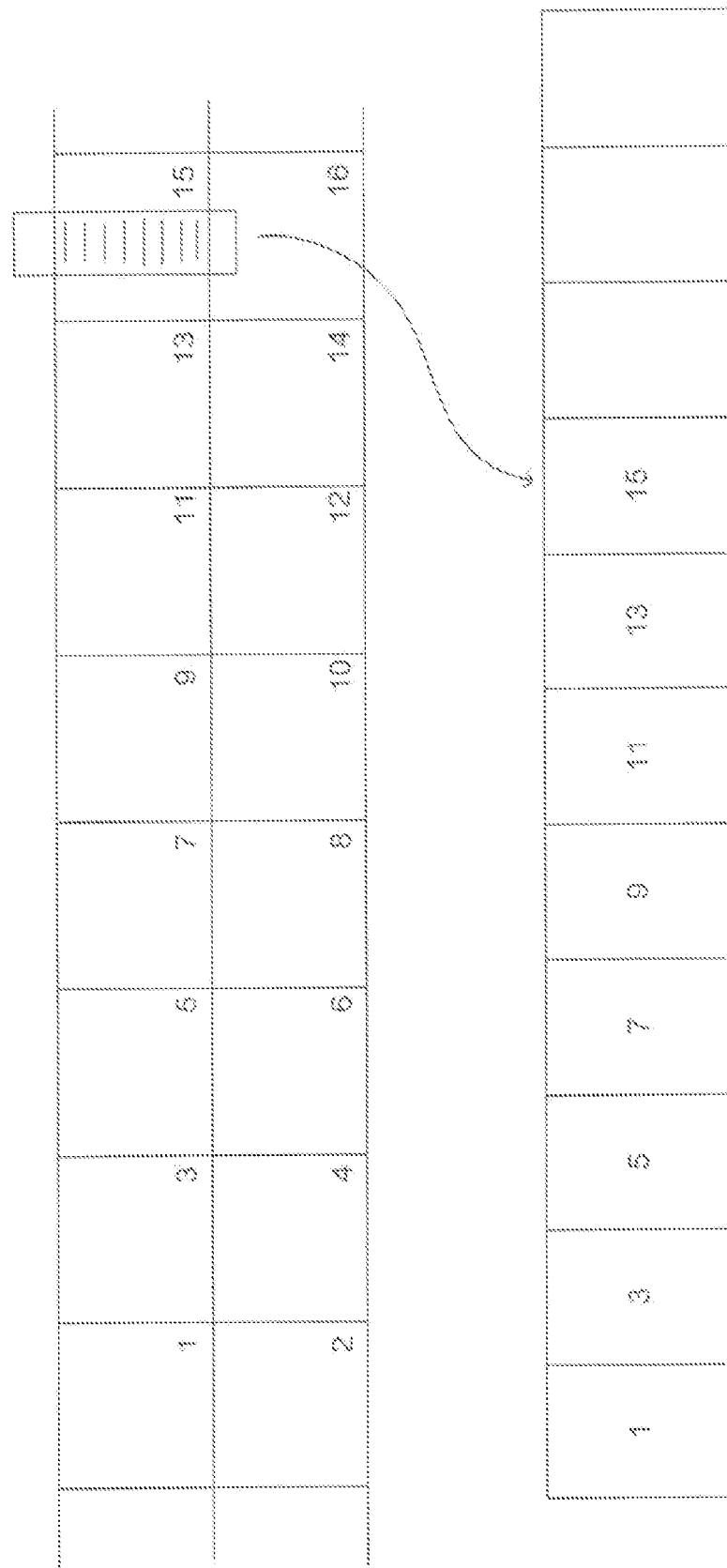
Figure 23D:
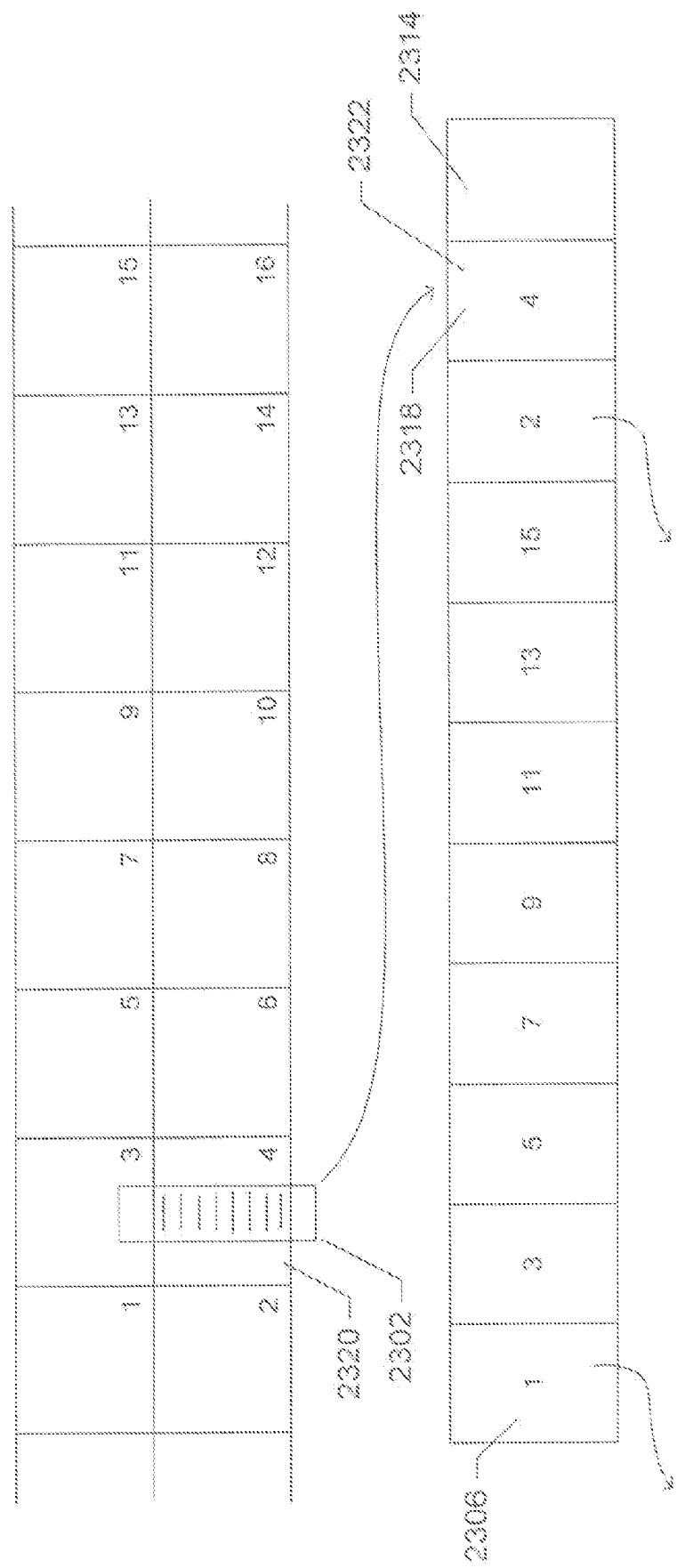
Figure 23E:
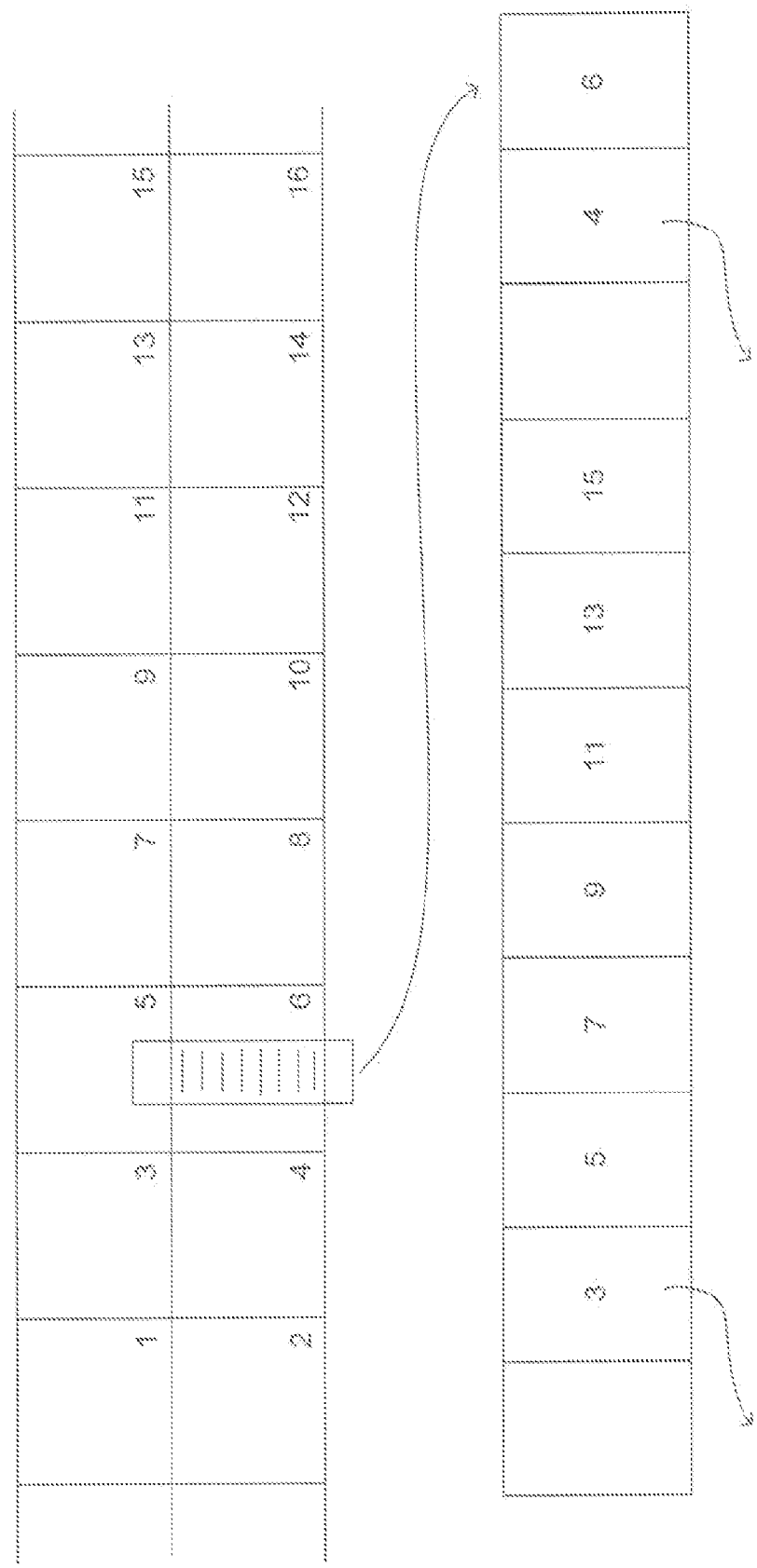
Figure 23F:
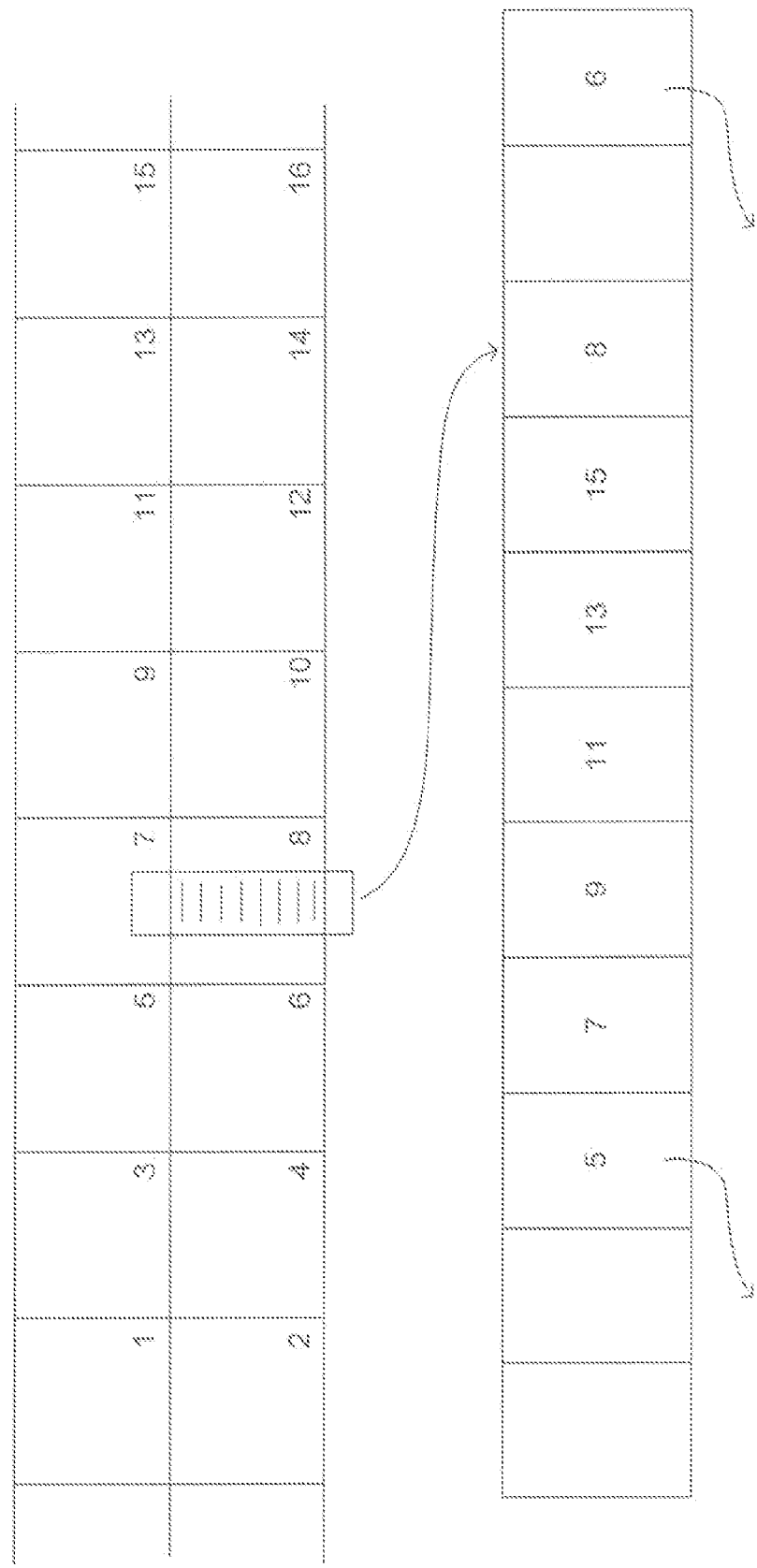

FIGS. 23A-F illustrate reading of the data-set-multiplexing magnetic-tape format of the present invention, discussed with reference to FIGS. 21A-22C, by an older-generation eight read/write-element tape head, according to one embodiment of the present invention. FIGS. 23A-F use the same illustration conventions as used in FIGS. 22A-C. As shown in FIG. 23A, the older-generation, eight-read/write-element tape head 2302 is first positioned over the encoding of data set 1 2304, and data set 1 is read into a first memory buffer 2306. Next, as additionally shown in FIG. 23A, the older-generation tape head 2302 is positioned over the next data set in the first, parallel, linear sequence of data sets, data set 3 (2308), and the third data set is read into a second memory buffer 2310. The tape head continues to read data sets from the first, parallel, linear sequence of data sets to successive memory buffers up through data set 15, as shown in FIG. 23B. Note that, because only the odd-numbered data sets are read in this first sub-pass of the data-encoding region of the tape, data is not currently returned to the computational entity on behalf of which the magnetic tape is being read, since the even-numbered data sets are not yet available, in memory buffers, for return to that computational entity. However, after a number of odd-numbered data sets are read, the tape is reversed and moved back to the position of data set 2, which underlies data set 1, as shown in FIG. 23C, and the second data set 2316 is read into a next memory buffer 2318. Then, as shown in FIG. 23D, the tape is again advanced in a forward direction, so that the older-generation tape head 2302 is positioned over the fourth data set 2320 and the fourth data set is read into a subsequent memory buffer 2322. Concurrently, data is extracted from the first and second data sets, stored in memory buffers 2306 and 2318 and transmitted to the computational entity on behalf of which the tape is being read. As illustrated in FIGS. 23E-F, reading of the even-numbered data sets continues in a second sub-pass over the illustrated region of the data-encoding portion of the magnetic tape, with data extracted from two numerically adjacent, previously read data sets returned to the computational entity while a next even-numbered data set is read from the magnetic tape and stored into a free memory buffer. In the example shown in FIGS. 23A-F, the final three memory buffers 2318, 2322, and 2324 (see FIG. 23D) are used in a round-robin fashion for receiving subsequent even-numbered data sets. In alternative schemes, buffers at the beginning of the set of memory buffers that are freed following transmission of data extracted from the data sets contained in those memory buffers may be reused for storing newly read even-numbered data sets.

The number of odd-numbered data sets read in a sub-pass, or sub-wrap, of a portion of the data-encoding portion of a magnetic tape depends on the amount of memory available for buffering odd-numbered data sets. The greater amount of available memory, the greater number of data sets that can be read in a sub-pass. The greater the number of sets read in a sub-pass, the fewer the number of tape reversals and repositionings that are needed in order to read the two parallel linear sequences of data sets contained in the data-set-multiplexing magnetic-tape format illustrated in FIGS. 23A-F that represents one embodiment of the present invention. Tape reversals and repositionings require additional time, in comparison to continuous one-direction passes or wraps, and thus represent a decrease in the data-transfer rate from magnetic tape to memory. However, reversing of the tape may proceed at a faster rate than reading of data from the tape, so that, when sufficient memory buffers are available, the data-transfer rate for reading a two-parallel-linear-sequence magnetic tape that represents an embodiment of the present invention may exceed 70% of the data-transfer rate possible for a continuous, one-direction pass or wrap.

FIG. 24 illustrates several of the various different tape-head configurations compatible with the data-set-multiplexing magnetic-tape format that represents one embodiment of the present invention illustrated in FIGS. 21A-B and discussed above with reference to FIGS. 22A-23F. The first tape-head configuration 2402 is a 16-read/write-element tape head that can read two data sets at a time, as illustrated in FIGS. 22A-C, using a double-buffering scheme involving two pairs of data-set buffers. The second tape-heed configuration 2404 can be used to read a section of the data-encoding portion of a magnetic tape formatted according to a data-set-multiplexing magnetic-tape format that represents an embodiment of the present invention, illustrated in FIGS. 21A-B, by reading odd-numbered data sets in a first sub-pass and even-number data sets in a second sub-pass, buffering the odd-numbered data sets and two even-numbered data sets in memory, as shown in FIGS. 23A-F. The third tape-head configuration 2406 is a 16-read/write-element tape head with read/write elements spaced at one-half the spacing of read/write elements in the first tape-head configuration 2402. This third tape-head configuration can be used to mad the data sets of the data-set-multiplexing magnetic-tape format by reading from every other read/write element, aligned with eight tracks of one grouping of data tracks that correspond to one of the two parallel linear sequences of data sets in the same manner as the second tape-head configuration 2404. Similarly, the 32-read/write-element tape-head configuration 2408 can be employed by using every fourth read/write element, in the same fashion as tape-head configurations 2406 and 2404. Were the second tape-head configuration 2404 to represent the tape-head configuration of an initial magnetic-tape generation, first-generation tapes can be read by three successive generations represented by tape-head configurations 2402, 2406, and 2408. When the second-generation magnetic-tape drives employ the two-parallel-linear-sequence magnetic-tape format discussed with reference to FIGS. 21A-B, above, then the second-generation tapes can be read by third and fourth generation magnetic-tape drives as well as by the first-generation magnetic-tape drive. Thus, use of data-set-multiplexing magnetic-tape formats that represent embodiments of the present invention can provide both backwards and forwards compatibility for multiple generations of tape drives, without the added implementation and production complexities of the proposed backward-compatible tape-head configurations discussed with reference to FIG. 19.

Figure 25A:
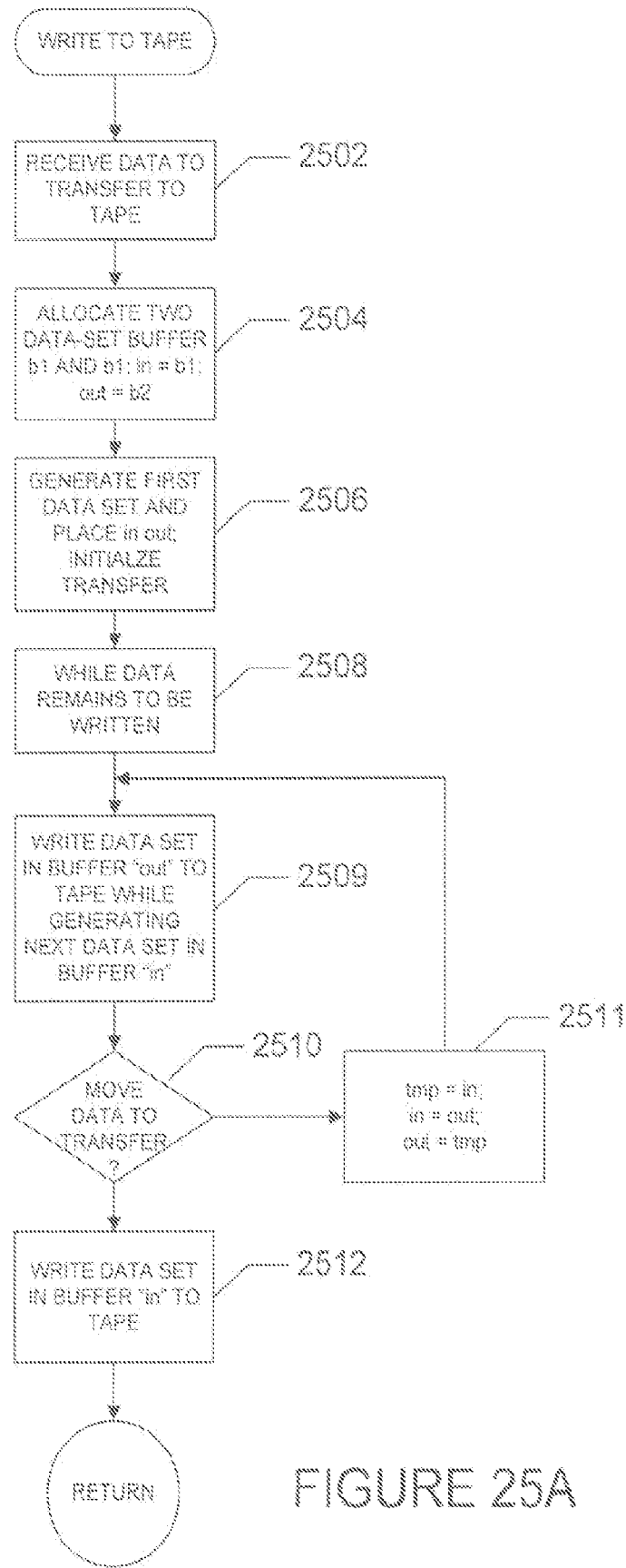
FIGS. 25A-B provide control-flow diagrams that illustrate writing and reading of a single-linear-data-set-sequence magnetic-tape format.
Figure 25B:
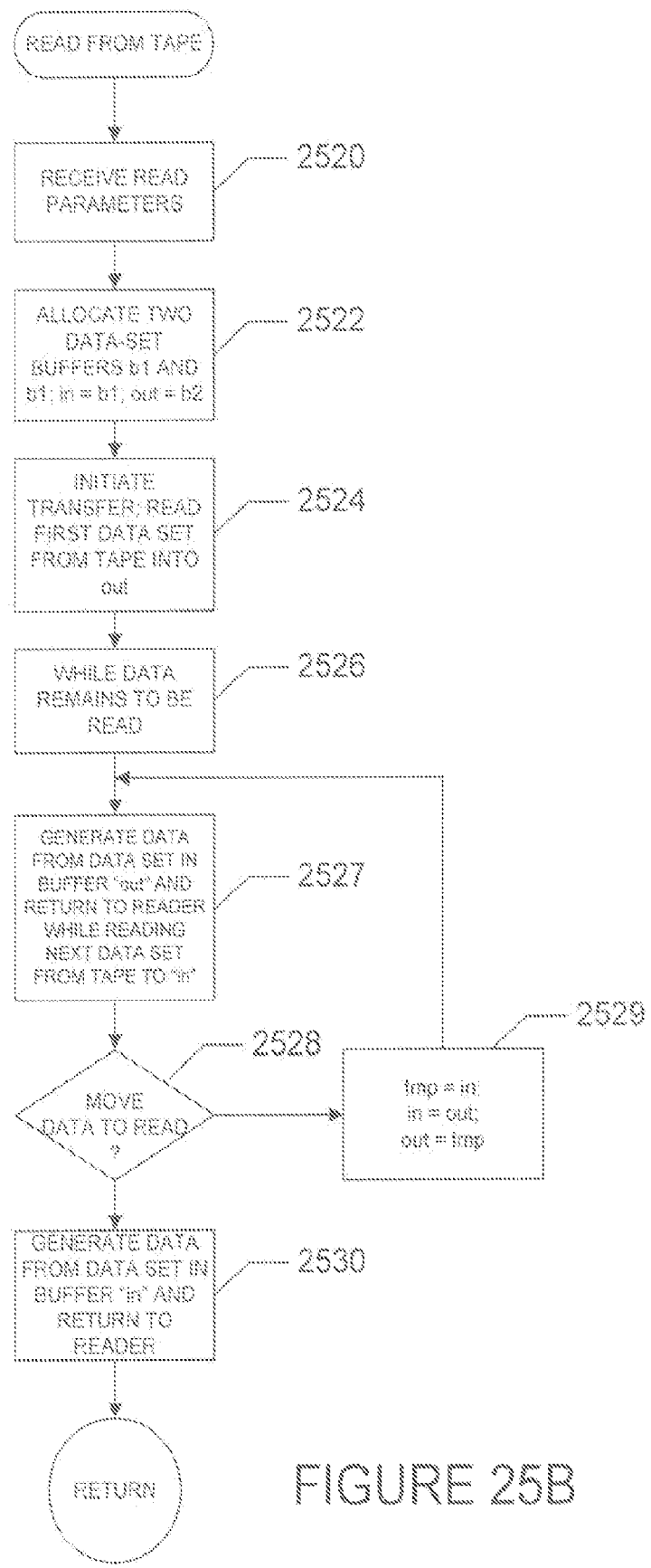

FIGS. 25A-B provide control-flow diagrams that illustrate writing and reading of a single-linear-data-set-sequence magnetic-tape format. FIG. 25A provides a control-flow diagram for the write operation. In step 2502, indication of the data that needs to be transferred to the tape is received, including all relevant parameters that define the write operation. In step 2504, two data-set buffers b1 and b2 are allocated, and local variable "in" is set to reference buffer b1 and local variable "out" is set to reference buffer b2. Note that, in FIG. 25A and in subsequent figures, local variables that reference buffers cart be incremented to reference successive bullets within a linear sequence of buffers, just as C-language and C++-language pointers can be incremented. In step 2506, a first data set is generated and placed in the buffer referenced by local variable "out." In addition, the data-transfer operation to the magnetic tape is initialized. In the while-loop of steps 2508-2511, a double-buffering scheme is used in which the buffers referenced by local variables "in" and "out" are alternated with each iteration. During each iteration, a data set in the memory buffer referenced by local variable "out" is written to tape while a next data set is generated and placed into the buffer referenced by local variable "in," in step 2509. When more data remains to be transferred, as determined in step 2510, the buffers referenced by the local variables "in" and "out" are interchanged, in step 2511, and a next pair of data-set-generation and data-set-transfer operations are carried out in step 2509. Finally, the data set residing in the butler referenced by local variable "in" is written to tape, in step 2512. Writing a single-linear-data-set-sequence magnetic-tape format can therefore be carried out in a single pass, using a simple double-buffering scheme.

FIG. 25B provides a control-flow diagram for reading a single-linear-data-set-sequence magnetic-tape format. As with the above-described write operation, a double-buffering scheme is employed. In step 2520, the read parameters for the read operation are received. In step 2522, two data-set buffers b1 and b2 are allocated, with local variables "in" and "out" initialized as in step 2504 of FIG. 25A to reference the two buffers b1 and b2. Again, as noted above, references to buffers, such as the local variables "in" and "out" and constants b1 and b2, are used in the flow diagrams similar to C-language, or C++-pointers. In step 2524, the read transfer is initialized, and a first data set is read from the tape. In each iteration of the while-loop of steps 2526-2529, data is extracted from a data set in one buffer, referenced by local variable "out," while data is read from the tape and placed into the other buffer, reference by local variable "in." When more data remains to be read, as determined in step 2528, the memory buffers referenced by local variables "in" and "out" are interchanged, in step 2529. Finally, in step 2530, data is extracted from the data set stored in the buffer referenced by local variable "in" and returned to the reading entity. Thus, in currently employed single-linear-sequence magnetic-tape formats, a simple double-buffering scheme can be used for both writing and reading data to and from the magnetic tape in a single-direction pass, or wrap.

Figure 26A:
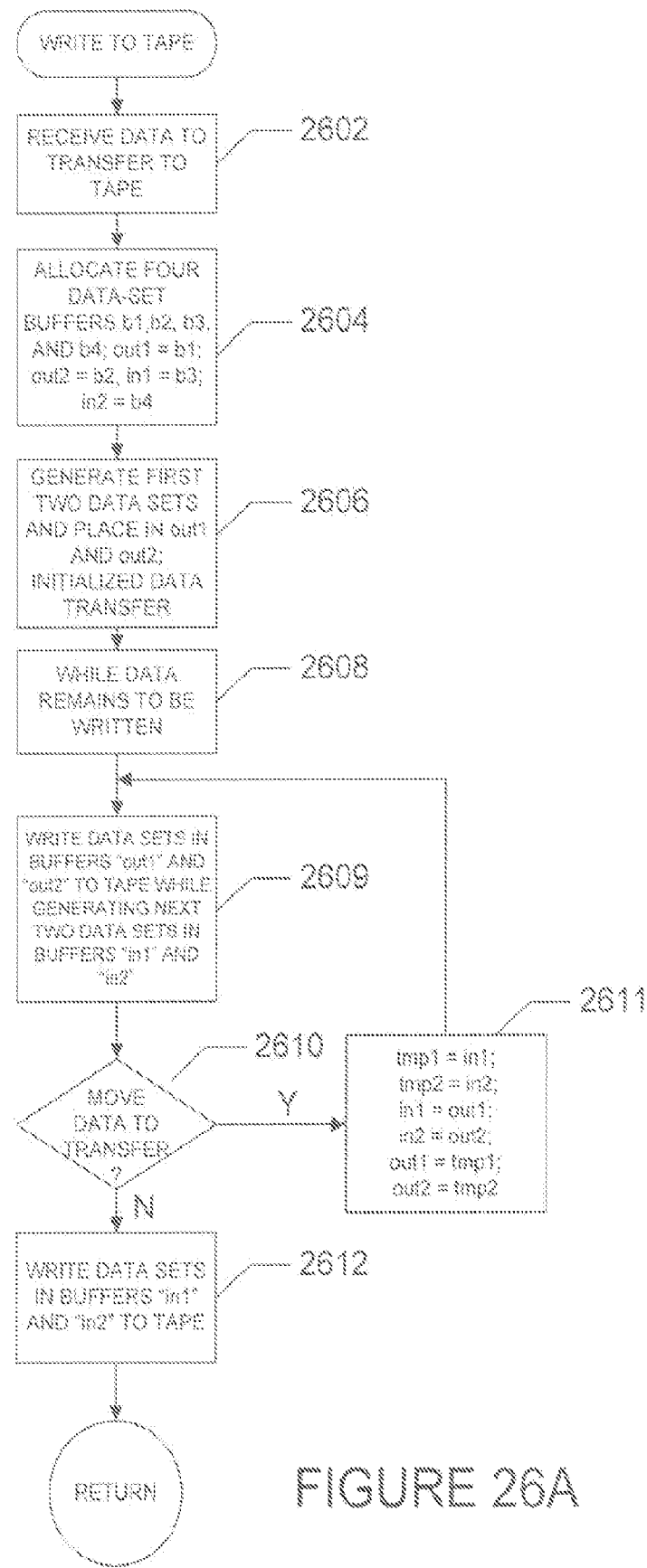
FIGS. 26A-B provide control-flow diagrams for writing and reading a data-set-multiplexing magnetic-tape format, according to one embodiment of the present invention, to and from magnetic tape.
Figure 26B:
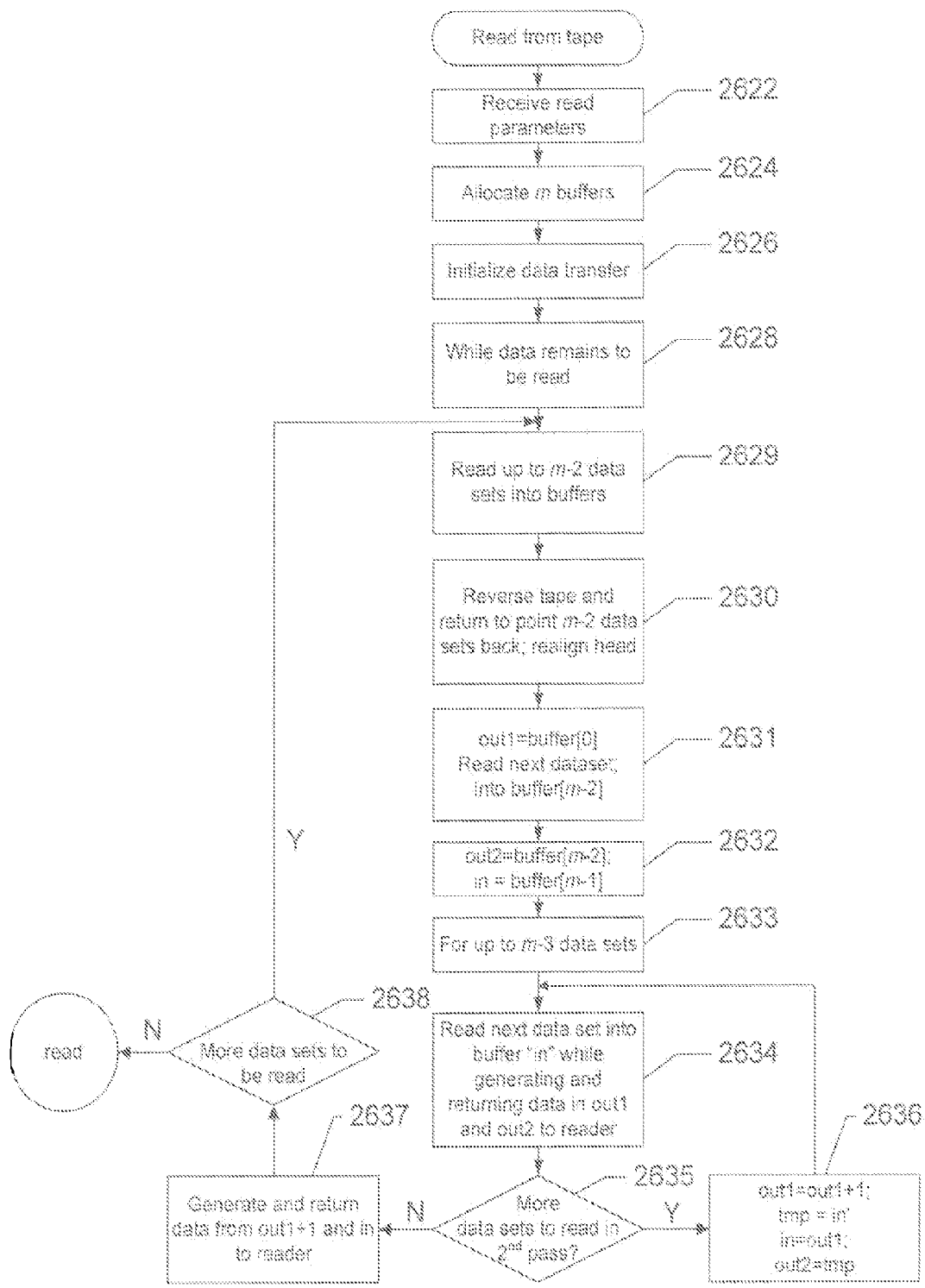

FIGS. 26A-B provide control-flow diagrams for writing and reading a data-set-multiplexing magnetic-tape format, according to one embodiment of the present invention, to and from magnetic tape. FIG. 26A illustrations writing of a data-set-multiplexing magnetic-tape format, discussed with reference to FIGS. 21A-B, by a 16-read/write-element tape head. The steps of this control-flow diagram are nearly identical with the steps of the control flow diagram shown in FIG. 25A. The only differences are that, in step 264, four memory buffers referenced by four local variables "out1" "out2," "in1," and "in2" are allocated, rather than two memory buffers in step 2504 of FIG. 25A, and pairs of data sets are generated and written in steps 2606, 2609, and 2612 in contrast to the single data sets generated and written in corresponding steps 2506, 2509, and 2512 of FIG. 25A. In other words, writing the data-set-multiplexing magnetic-tape format that represents one embodiment of the present invention by the 16-read/write-element tape head is nearly identical to writing a single-linear-sequence magnetic-tape format, with the exception that pairs of data-set buffers are used in a double-buffering scheme, rather than single data-set buffers. Reading of the data-set-multiplexing magnetic-tape format, by the 16-read/write-element tape head would be nearly identical to the read operation shown in FIG. 258, again with pairs of data sets read, in the ease of the data-set-multiplexing magnetic-tape format, where single data sets are read from a single-linear-sequence magnetic-tape format.

Reading of the data-set-multiplexing magnetic-tape format by an eight-read/write-element tape head is, however, substantially different, as discussed above with reference to FIGS. 23A-F. FIG. 26B provides a control-flow diagram for reading a two-parallel-sequence data-set-multiplexing magnetic-tape format, discussed above with reference to FIGS. 21A-B, by an eight-read/write-element tape head. In step 2622, the parameters for the read operation are received. In step 2624, m buffers are allocated for containing m data sets. In step 2626, the data-transfer operation is initialized. Then, in the while-loop of steps 2628-2638, the data is read from the tape using multiple sub-passes for each pass, or wrap. In step 2629, the next m−2 data sets are read from the first, parallel sequence of data sets into m−2 memory buffers. In step 2630, the tape is reversed and repositioned at the point at which the read operation carried out in 2629 started. In step 2631, the local variable "out1" is set to reference the first data-set butler and the first data set of the second parallel sequence of data sets is read into buffer [m−2]. In step 2632, local variable "out2" to set to reference memory buffer [m−2] and local variable "in" is set to reference memory buffer [m−1]. In the inner for-loop of steps 2633-2636, subsequent data sets are read from the second parallel sequence of data sets while two previously read data sets are processed to extract the data and return the data to the computational entity on behalf of which the data is being read. Once all the data in the second sub-pass has been read, data is extracted from the data sets in the final two data-set-containing buffers, in step 2637. When there remains more data to be read from the tape, as determined in step 2638, control returns in step 2629, the beginning of a next iteration of the outer while-loop. Thus, as shown in FIG. 26B, and as discussed above, reading of the data-set-multiplexing magnetic-tape format shown in FIGS. 21A-B involves two sub-passes within each sub-region of the data-encoding region of the magnetic tape to read the two parallel linear sequences of data sets. The number of tape reversals and repositionings is inversely proportional to the number of data-set buffers allocated in step 2624. The control-flow diagram shown in FIG. 26B assumes an even number of data sets are read from the data-set-multiplexing magnetic-tape format. A slightly more complex control-flow diagram would be necessary in the case that the number of data sets read from the magnetic tape may be even or odd. Writing of the data-set-multiplexing magnetic-tape format by an eight-read/write-element tape bead can also be carried out using multiple passes, including a first pass in which odd-numbered data sets are written in a first linear sequence and even-numbered data sets are written in second linear sequence.

Figure 27B:
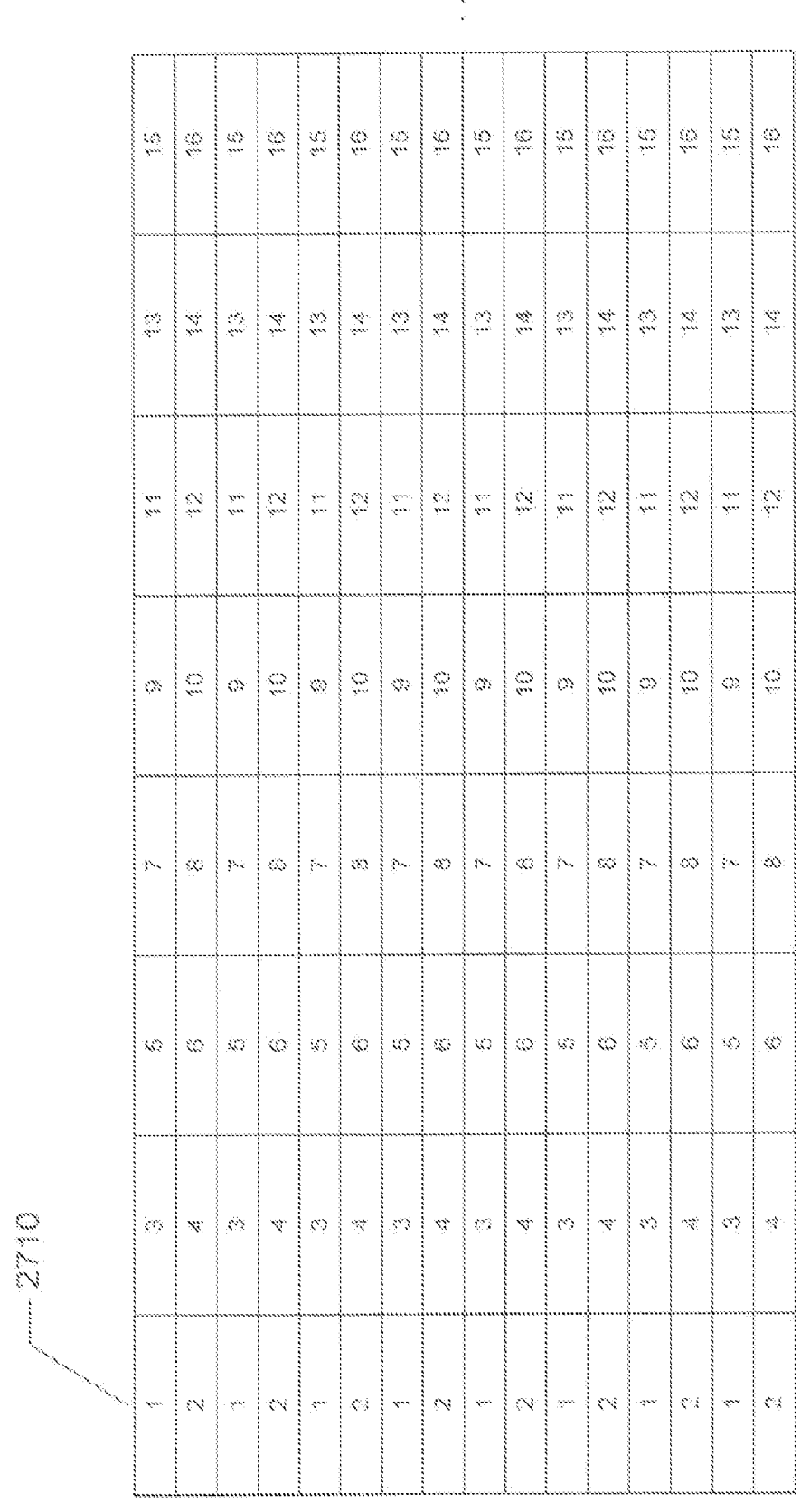
Figure 28:
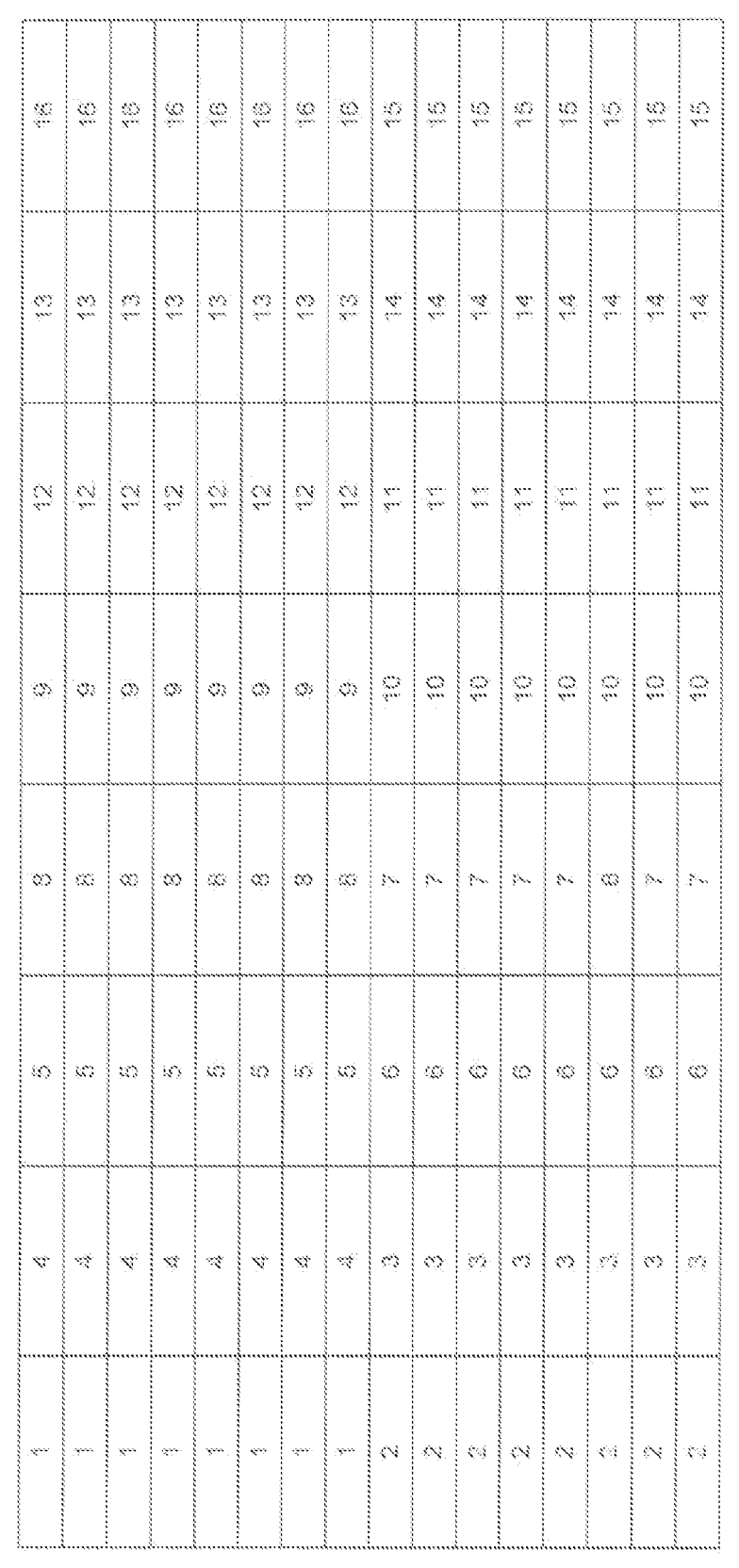
Figure 29B:
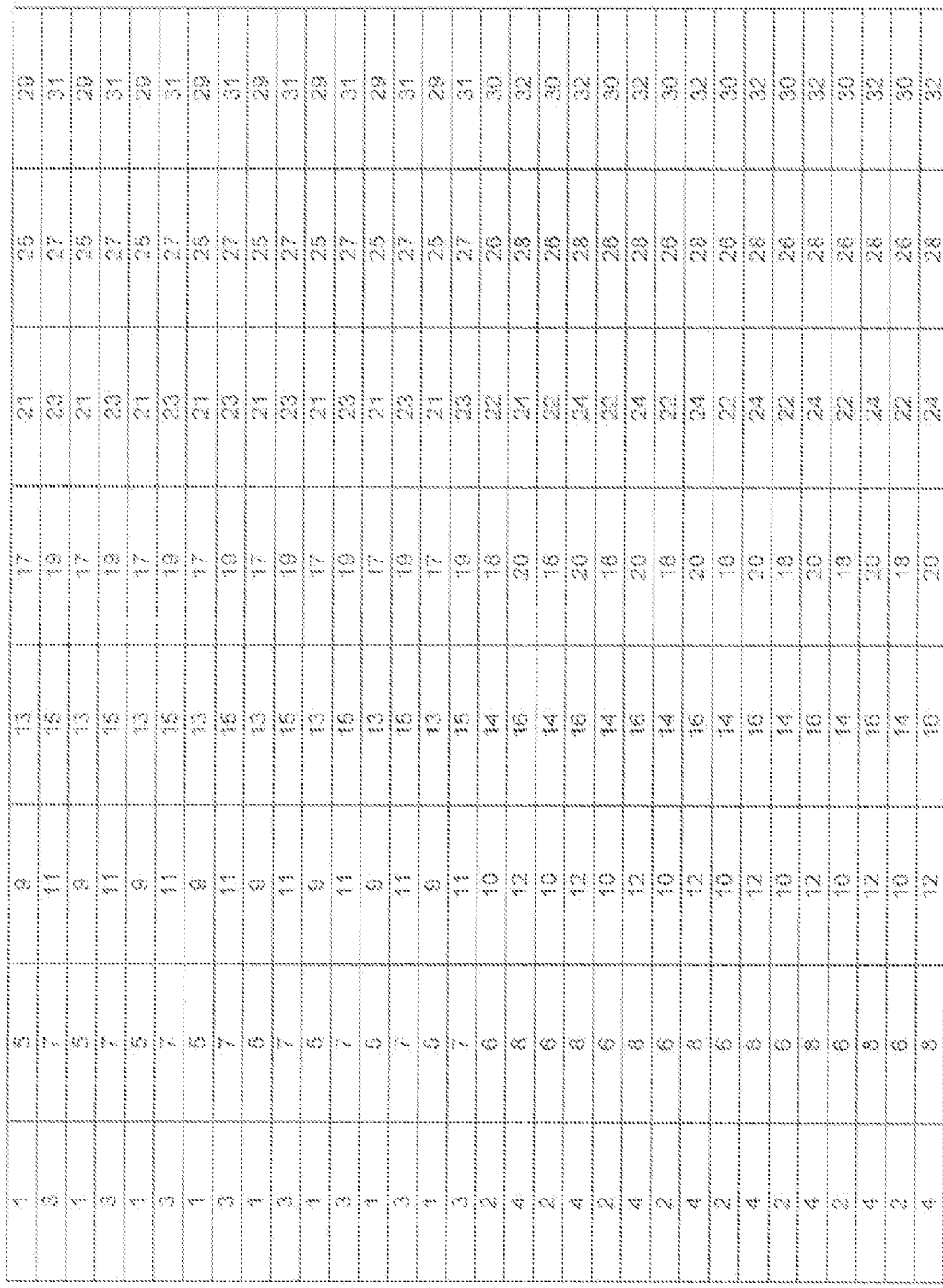
Figure 30A:
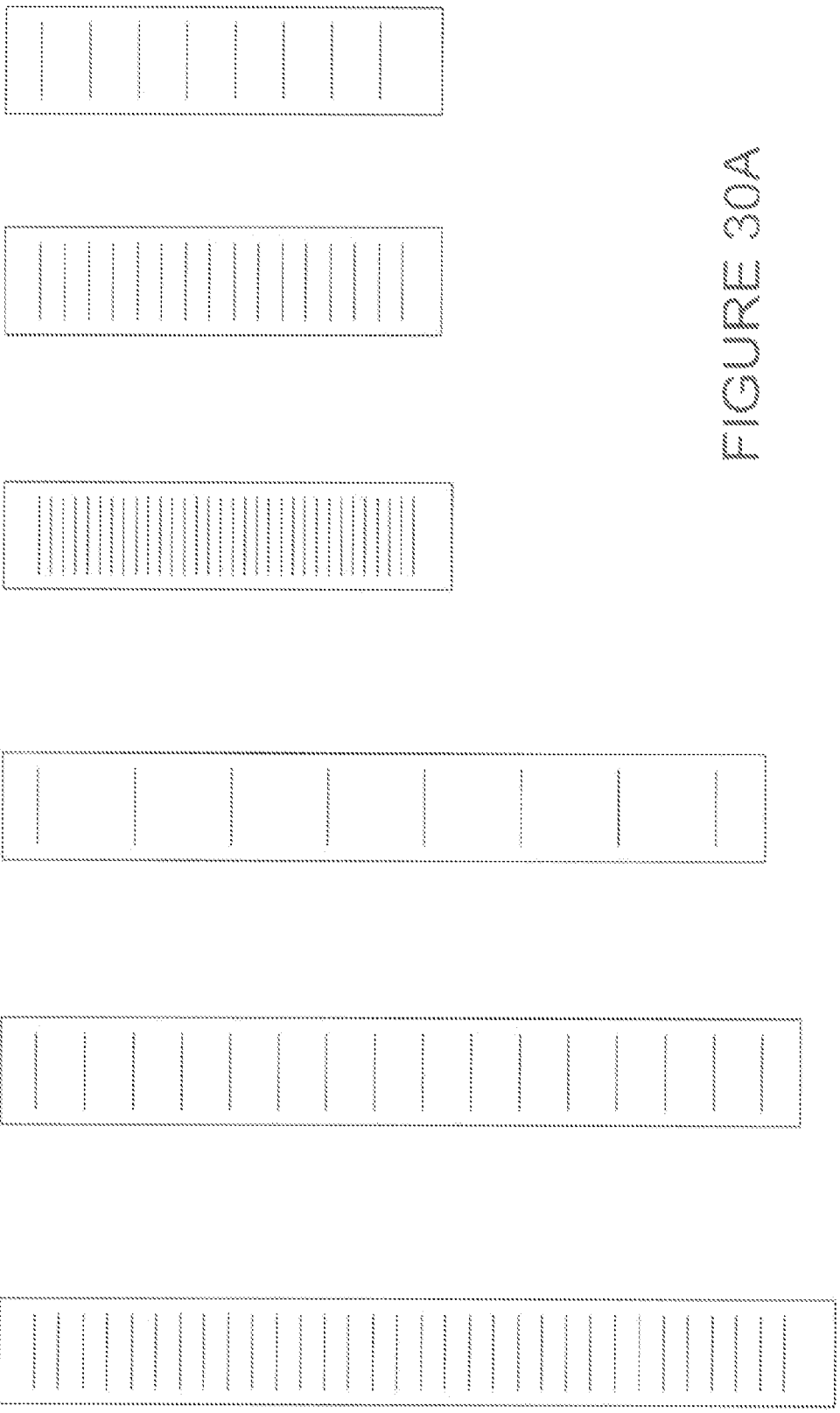
Figure 30B:
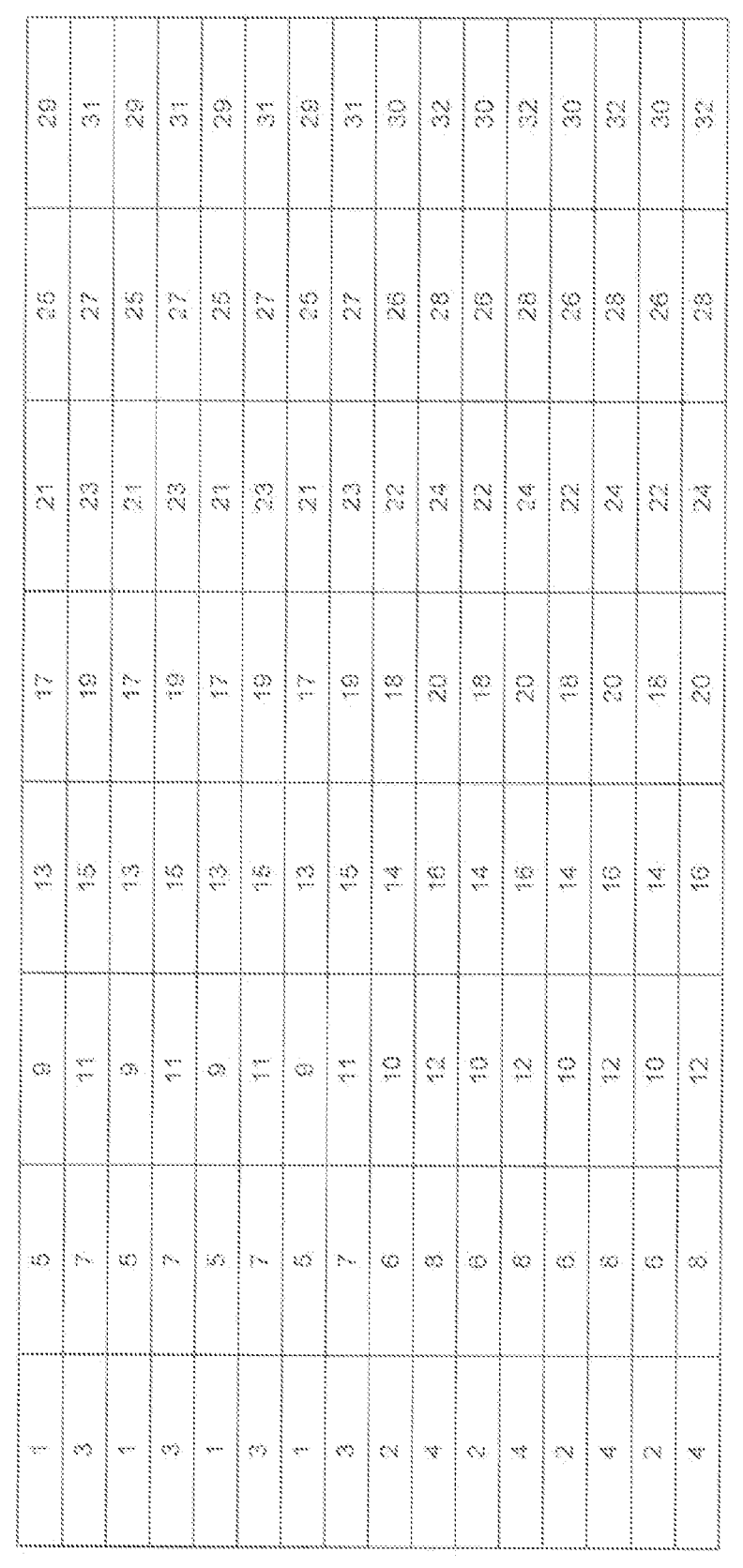

FIGS. 27A-B illustrate an alternative data-set-multiplexing format useful for providing compatibility between a 16-read/write-element tape head and an eight-read/write-element rape head of approximately equal dimensions, according to one embodiment of the present invention. FIG. 27A provides representations of the 16-read/write-element tape head 2702 and the eight-read/write-element tape head 2704. FIG. 27B provides a representation of the alternative data-set-multiplexing magnetic-tape format that provides compatibility between the two tape heads shown in FIG. 27A. In the alternative data-set-multiplexing magnetic-tape format, each column of CQs, such as column 2710, contains CQs of two data sets. However, in the alternative data-set-multiplexing data format, the two data sets are interleaved. This allows the eight-read/write-element tape head 2704 to read the odd-numbered dam sets in a first sub-pass and the even-numbered data sets in a second sub-pass, similar to the order in which data sets are read by the eight-read/write-element tape head 2404 shown in FIG. 24 from the data-set-multiplexing magnetic-tape format, shown in FIGS. 21A-B. FIG. 28 provides a different, alternative data-set-multiplexing magnetic-tape format that provides compatibility between the various tape heads shown in FIG. 24, according to one embodiment of the present invention, FIGS. 29A-B illustrate an additional 32-track data-set-multiplexing magnetic-tape format that provides reading compatibility among the four different tape heads shown in FIG. 29A, according to one embodiment of the present invention. In this case, the data-set-multiplexing magnetic-tape format is written by a 32-read/write-element tape head 2902 and is readable by all of the various 16-read/write-element tape heads and 32-read/write-element tapes heads shown in FIG. 29A. In this format, two odd numbered data sets are interleaved in the top 16 tracks of the 32 tracks, and two even-numbered data sets are interleaved in the bottom 16 tracks of the 32-track format at each position along the tape. A full-size 32-read/write-element tape head 2902 can read four data sets concurrently from each column, while the full-size 16-read/write-element tape head 2904 reads two data sets from each column in each of two sub-passes. The half-size 16-read/write-element tape head 2906 can read two data sets from each column in each of two sub-passes, and the half-height 32-read/write-element tape head 2908 uses every other read/write element to read the data sets in the same fashion as tape head 2906. FIGS. 30A-B illustrate, using the same illustration conventions used in FIGS. 29A-B and 27A-B, yet an additional data-set-multiplexing data format that provides read compatibility among six different tape-head configurations shown in FIG. 30A, according to one embodiment of the present invention.

Although the present invention has been described in terms of particular embodiments, it is not intended that the invention be limited to these embodiments. Modifications will be apparent to those skilled in the art. For example, in the various data-set-multiplexing magnetic-tape formats discussed above, the overhead involved with using multiple sub-passes for each region of the data-encoding portion of the magnetic tape is placed on the reading operations rather than the writing operations. In other words, when as tape head having a number of read/write elements equal to the number of data tracks the data-set-multiplexing magnetic-tape format is used to write the tape, the write operation can be carried out in a single linear pass using a double-buffering scheme involving buffers large enough to hold two or more data sets. However, when a tape head with fewer read/write elements than data tracks is used to read the tape, multiple sub-passes are needed for each region of the data-encoding portions of the magnetic tape. Alternative data-set-multiplexing magnetic-tape formats may place the harden for multiple sub-passes on the writing of the data-set-multiplexing magnetic-tape format, so that the writing operation requires multiple sub-passes, but reading can be carried out in a only a few sub-passes. In general, it is desirable for write operations to proceed as quickly as possible, and thus, in the above-discussed embodiments, the burdens associated with multiple sub-passes, reversals, and repositionings of the tape fall on the reading operations, rather than write operations. As discussed above, embodiments of the present invention include both any of the many different possible data-set-multiplexing magnetic-tape formats as well as magnetic-tape drives implemented to read and write these data-set-multiplexing magnetic-tape formats. The controllers, firmware, logic circuits, and other implementation details needed to produce magnetic-tapes drives that can read and write data-set-multiplexing magnetic-tape formats may vary, according to variations in many of the various different design and implementation parameters associated with design and manufacture of tape drives.

The foregoing description, for purposes of explanation, used specific nomenclature to provide a thorough understanding of the embodiments of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A magnetic tape that contains data formatted according to a data-set-multiplexing magnetic-tape format, the data-set-multiplexing magnetic-tape format including, for each multiple-track wrap within a band, two or more parallel sequences of data sets written to the multiple tracks of the multiple-track wrap.

2. The magnetic tape of claim 1 wherein each data set contains an are ordered set of bytes and wherein the magnetic tape includes a data-encoding region that contains a number n of parallel bands, each of the n parallel bands comprising m sub-bands, each sub-band including k tracks.

3. The magnetic tape of claim 2 wherein each of the k tracks within a sub-band are numerically labeled by position, and wherein a multi-track wrap comprises m identically numerically labeled tracks within m sub-bands of a band, wherein identically numerically labeled tracks in adjacent sub-bands are logically adjacent tracks.

4. The magnetic tape of claim 3 wherein the data-set-multiplexing magnetic-tape format further includes:
an integral number j, greater than or equal to 2, of parallel sequences of data sets encoded within each multi-track wrap, each position of which along the length of the data-encoding region of the magnetic tape includes encodings of j data sets.

5. The magnetic tape of claim 4 wherein each parallel sequence of data sets includes m/j logically adjacent tracks.

6. The magnetic tape of claim 4 wherein each parallel sequence of data sets includes m/j tracks, the tracks of the parallel sequences of data sets interleaved so that each group of j logically adjacent tracks includes one track corresponding to each of parallel sequences of data sets.

7. A magnetic-tape drive that reads data from, and/or writes data to a magnetic tape that contains data formatted according to a data-set-multiplexing magnetic-tape format, the data-set-multiplexing magnetic-tape format including, for each multiple-track wrap within a band, two or more parallel sequences of data sets written to the multiple tracks of the multiple-track wrap.

8. The magnetic-tape drive of claim 7 wherein each data set contains an ordered set of bytes and wherein the magnetic tape includes a data-encoding region that contains a number n of parallel bands, each of the n parallel bands comprising m sub-bands, each sub-band including k tracks.

9. The magnetic-tape drive of claim 8 wherein each of the k tracks within a sub-band are numerically labeled by position, and wherein a multi-truck wrap comprises m identically numerically labeled tracks within m sub-bands of a band, wherein identically numerically labeled tracks in adjacent sub-bands are logically adjacent tracks.

10. The magnetic-tape drive of claim 9 wherein the data-set-multiplexing magnetic-tape format further includes:
an integral number j, greater than or equal to 2, of parallel sequences of data sets encoded within each multi-track wrap, each position of which along the length of the data-encoding region at the magnetic tape includes encodings of j data sets.

11. The magnetic-tape drive of claim 10 wherein each parallel sequence of data sets includes m/j logically adjacent tracks.

12. The magnetic-tape drive of claim 11 wherein each parallel sequence of data sets includes m/j tracks, the tracks of the parallel sequences of data sets interleaved so that each group of j logically adjacent tracks includes one track corresponding to each of the j parallel sequences or data sets.

13. A method by which a magnetic-tape drive accesses, for reading or writing data, a magnetic tape that contains data formatted according to a data-set-multiplexing magnetic-tape format, the data-set-multiplexing magnetic-tape format including, for each multiple-track wrap within a band, two or more parallel sequences of data sets written to the multiple tracks of the multiple-track wrap, the method comprising:
when a tape head within the magnetic-tape drive includes as many read/write elements as the number of tracks in the multiple-track wrap,
accessing the multiple-track wrap in a single pass; and
when a tape head within the magnetic-tape drive includes fewer read/write elements than the number of tracks in the multiple-track wrap,
accessing the multiple-track wrap in multiple sub-passes.

14. The method of claim 13
wherein each data set contains an ordered set of bytes;
wherein the magnetic tape includes a data-encoding region that contains a number n of parallel bands, each of the n parallel bands comprising m sub-bands, each sub-band including k tracks;
wherein each of the k tracks within a sub-band are numerically labeled by position, and wherein a multi-track wrap comprises m identically numerically labeled tracks within m sub-bands of a band, wherein identically numerically labeled tracks in adjacent sub-bands are logically adjacent tracks; and
wherein the data-set-multiplexing magnetic-tape format further includes an integral number j, greater than or equal to 2, of parallel sequences of data sets encoded within each multi-track wrap, each position of which along the length of the data-encoding region of the magnetic tape includes encodings of j data sets.

15. The method of claim 14 wherein reading the multiple-track wrap in multiple sub-passes further comprises:
reading data sets of a first sub-pass into memory; and
reading data sets of a second sub-pass into memory while extracting data from a memory-resident data set read during the first sub-pass and a memory-resident data set previously read during the second sub-pass.

16. The method of claim 14 wherein odd numbered data sets are read during odd-numbered sub-passes and even-numbered data sets are read during even-numbered sub-passes.

17. The method of claim 14 wherein even numbered data sets are read during odd-numbered sub-passes and odd-numbered data sets are read during even-numbered sub-passes.

18. The method of claim 14 wherein s sub-passes are made to read each multi-track wrap and wherein odd numbered data sets are read during the first s/2 sub-passes and even-numbered data sets are read during the following s/2 sub-passes.

19. The method of claim 14 wherein s sub-passes are made to read each multi-track wrap and wherein even numbered data sets are read during the first s/2 sub-passes and odd-numbered data sets are read during the following s/2 sub-passes.

20. The method of claim 14 wherein writing the multiple-track wrap in multiple sub-passes further comprises;

writing data sets for multiple passes into memory; and writing odd-numbered data sets from memory to a first parallel sequence of data sets in a first sub-pass and writing even-numbered data sets from memory to a second parallel sequence of data sets.

* * * * *

UNITED STATES PATENT AND TRADEMARK OFFICE
CERTIFICATE OF CORRECTION

| | | |
|---|---|---|
| PATENT NO. | : 8,724,251 B2 | Page 1 of 1 |
| APPLICATION NO. | : 13/579481 | |
| DATED | : May 13, 2014 | |
| INVENTOR(S) | : Carl R. Hoerger et al. | |

It is certified that error appears in the above-identified patent and that said Letters Patent is hereby corrected as shown below:

In the Claims:

In column 17, line 24, in Claim 2, delete "an are" and insert -- an --, therefor.

In column 17, line 47, in Claim 6, after "each of" insert -- the j --.

In column 17, line 49, in Claim 7, delete "to" and insert -- to, --, therefor.

In column 17, line 62, in Claim 9, delete "multi-truck" and insert -- multi-track --, therefor.

In column 17, line 63, in Claim 9, delete "within in" and insert -- within m --, therefor.

In column 18, line 4, in Claim 10, delete "at" and insert -- of --, therefor.

In column 18, line 13, in Claim 12, delete "or" and insert -- of --, therefor.

In column 19, line 5, in Claim 20, delete "comprises;" and insert -- comprises: --, therefor.

Signed and Sealed this
Ninth Day of September, 2014

Michelle K. Lee
*Deputy Director of the United States Patent and Trademark Office*